US011196951B2

(12) United States Patent
Watanabe et al.

(10) Patent No.: US 11,196,951 B2
(45) Date of Patent: Dec. 7, 2021

(54) IMAGING DEVICE AND IMAGING METHOD

(71) Applicant: c/o Olympus Corporation, Hachioji (JP)

(72) Inventors: Yasuto Watanabe, Tama (JP); Takeshi Kawawa, Hachioji (JP); Satoshi Miyazaki, Tokyo (JP); Takeshi Suzuki, Akiruno (JP); Keiji Kunishige, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 17/224,073

(22) Filed: Apr. 6, 2021

(65) Prior Publication Data
US 2021/0329184 A1 Oct. 21, 2021

(30) Foreign Application Priority Data

Apr. 17, 2020 (JP) .............. JP2020-074382

(51) Int. Cl.
H04N 5/225 (2006.01)
H04N 5/365 (2011.01)
H04N 5/911 (2006.01)
H04N 5/341 (2011.01)
H04N 5/353 (2011.01)
H04N 5/361 (2011.01)
H04N 5/378 (2011.01)

(52) U.S. Cl.
CPC .......... H04N 5/365 (2013.01); H04N 5/341 (2013.01); H04N 5/353 (2013.01); H04N 5/361 (2013.01); H04N 5/378 (2013.01); H04N 5/911 (2013.01)

(58) Field of Classification Search
CPC ...... H04N 5/361; H04N 5/365; H04N 5/2355; H04N 5/2356
See application file for complete search history.

(56) References Cited

U.S. PATENT DOCUMENTS

| 9,549,132 | B2 | 1/2017 | Iwasaki et al. | |
|---|---|---|---|---|
| 9,769,403 | B2 | 9/2017 | Iwasaki et al. | |
| 2002/0176013 | A1* | 11/2002 | Itoh ................. | H04N 5/367 348/243 |
| 2005/0259166 | A1* | 11/2005 | Tsuda ............... | H04N 5/361 348/241 |
| 2006/0082675 | A1* | 4/2006 | McGarvey ........ | H04N 5/361 348/362 |
| 2008/0231725 | A1* | 9/2008 | Sakamoto ......... | H04N 5/367 348/222.1 |

(Continued)

FOREIGN PATENT DOCUMENTS

JP 2015-159353 9/2015

Primary Examiner — Twyler L Haskins
Assistant Examiner — Dwight Alex C Tejano
(74) Attorney, Agent, or Firm — John C. Pokotylo; Pokotylo Patent Services

(57) ABSTRACT

An imaging device acquires first dark image data in a state where an image sensor has been light shielded, acquires second dark image data in a state where the image sensor has been light shielded, based on completion of exposure, corrects fixed pattern noise of a reference combined image data based on at least one of the first dark image data and the second dark image data, and stores the reference combined image data that has been subjected to correction.

20 Claims, 34 Drawing Sheets

(56) References Cited

U.S. PATENT DOCUMENTS

2013/0093909 A1* 4/2013 Uchida .............. H04N 5/23232
   348/221.1
2016/0182840 A1* 6/2016 Iwasaki ................. H04N 5/365
   348/243

* cited by examiner

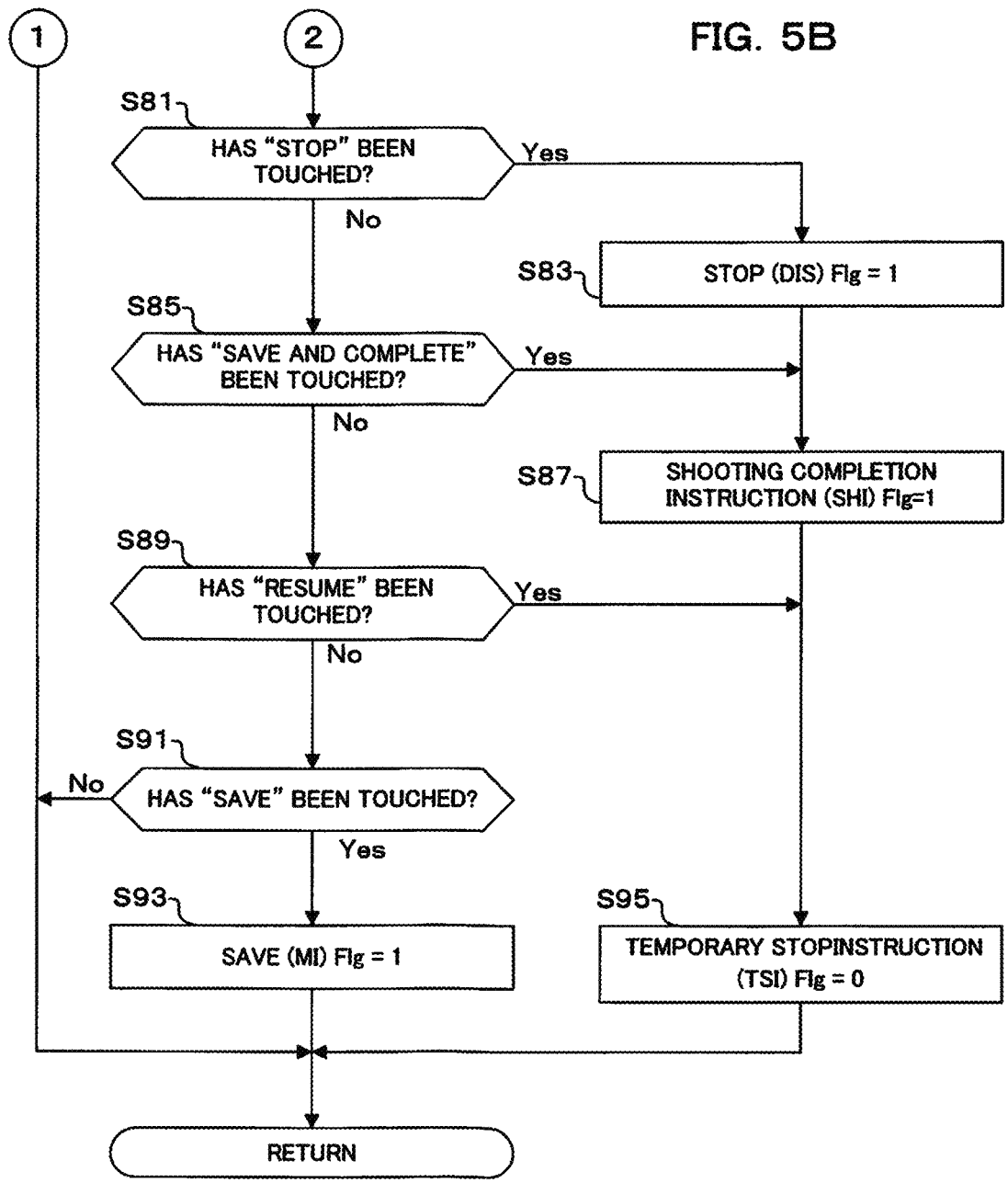

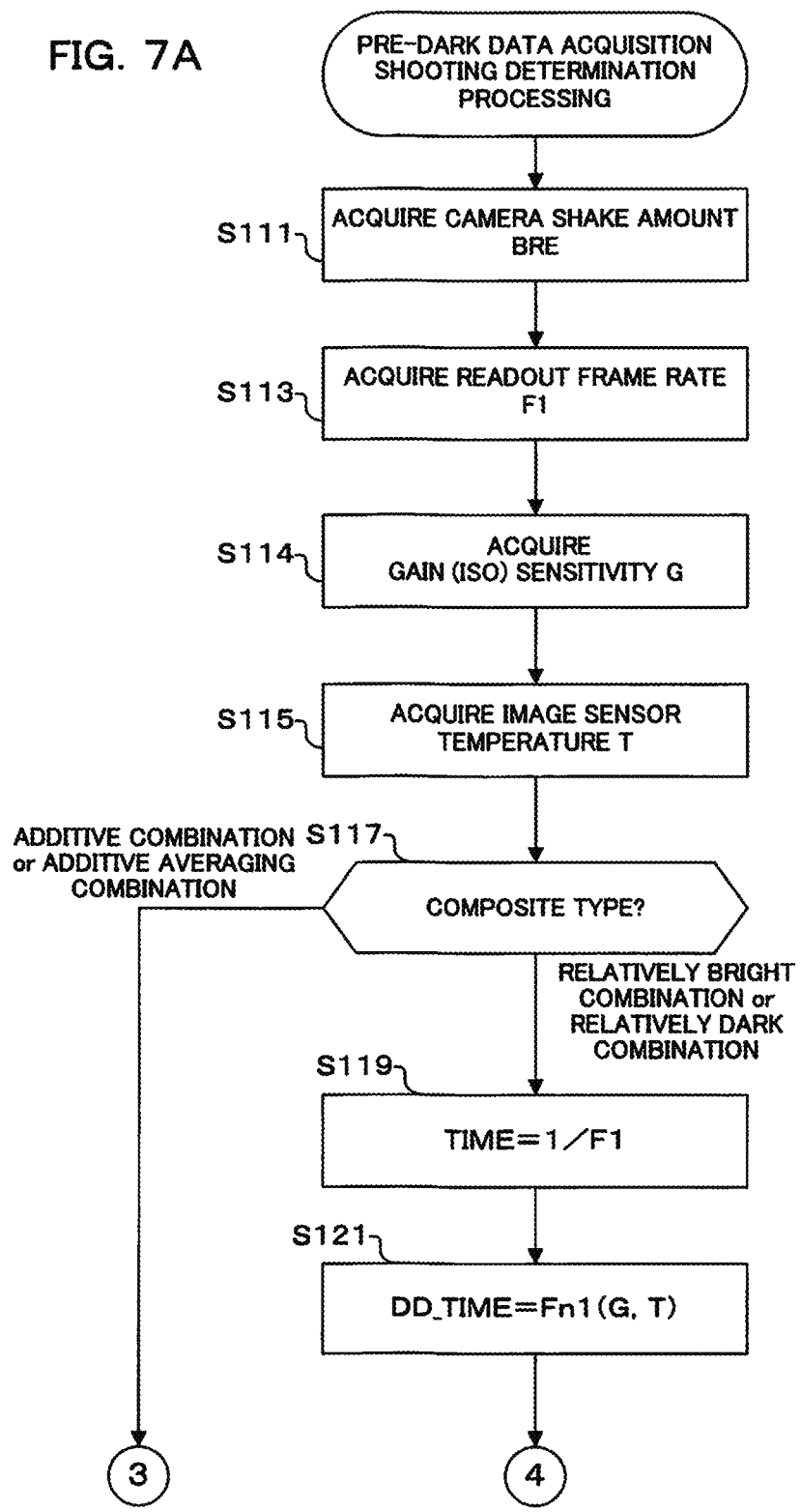

FIG. 27

| FLAG NAME | FLAG CONDITION | FUNCTION | ABBREVIATION |
|---|---|---|---|
| LIVE COMPOSITE Flg | 1 | "LIVE COMPOSITE SHOOTING" = ON | LCP_Flg |
| | 0 | "LIVE COMPOSITE SHOOTING" = OFF | |
| LIVE COMPOSITE COMMENCEMENT PERMITTED Flg | 1 | COMMENCEMENT OF "LIVE COMPOSITE SHOOTING" IN RESPONSE TO 2ND IS PERMITTED | LCPSA_Flg |
| | 0 | NOT PERMITTED | |
| PRE-DARK DATA ACQUISITION SHOOTING INSTRUCTION Flg | 1 | INSTRUCTION OF SHOOTING FOR "PRE-DARK DATA ACQUISITION SHOOTING" | BDASI_Flg |
| | 0 | NOT INSTRUCTED | |
| POST-DARK DATA ACQUISITION SHOOTING INSTRUCTION Flg | 1 | INSTRUCTION OF SHOOTING FOR "POST-DARK DATA ACQUISITION SHOOTING" | ADASI_Flg |
| | 0 | NOT INSTRUCTED | |
| PRE-DARK DATA USAGE Flg | 1 | WHEN SUBTRACTING DARK DATA FROM A COMBINED IMAGE JUDGMENT OF WHETHER TO. ①USE PRE-DARK DATA SHOOTING, ②USE POST-DARK DATA SHOOTING, OR ③ USE BOTH PRE-DARK DATA AND POST-DARK DATA. ①②③ ARE CHANGED DEPENDING ON THE SHOOTING SETTING AND COMPOSITE TYPE | BDDU_Flg |
| | 0 | | |
| POST-DARK DATA USAGE Flg | 1 | | ADDU_Flg |
| | 0 | | |
| SHOOTING IN PROGRESS Flg | 1 | LIVE COMPOSITE SHOOTING IS IN PROGRESS | SHD_Flg |
| | 0 | SHOOTING IS NOT IN PROGRESS | |
| STOP Flg | 1 | STOP SHOOTING | DIS_Flg |
| | 0 | DO NOT PERFORM | |
| AUTOMATIC STOP EFFECTIVE Flg | 1 | AUTOMATIC STOP FUNCTION IS VALID | ASE_Flg |
| | 0 | INVALID | |
| AUTOMATIC STOP INSTRUCTION Flg | 1 | INSTRUCT AUTOMATICALLY STOPPING OF LIVE COMPOSITE SHOOTING | ASI_Flg |
| | 0 | NOT INSTRUCTED | |
| TEMPORARY STOP INSTRUCTION Flg | 1 | INSTRUCT PAUSING OF LIVE COMPOSITE SHOOTING | TSI_Flg |
| | 0 | NOT INSTRUCTED | |
| IMMEDIATELY AFTER TEMPORARY STOP Flg | 1 | INSTRUCTION TO STORE AND SAVE DARK IMAGE DATA IMMEDIATELY AFTER TEMPORARY STOP | TSMI_Flg |
| | 0 | NOT INSTRUCTED | |
| TEMPORARILY STOPPED LIVE VIEW Flg | 1 | INSTRUCTION TO PERFORM LIVE VIEW DISPLAY WITH MECHANICAL SHUTTER OPEN WHILE TEMPORARILY STOPPED | TSL_Flg |
| | 0 | DO NOT PERFORM LIVE VIEW DISPLAY WHILE TEMPORARILY STOPPED | |
| SAVE Flg | 1 | SAVE INSTRUCTION HAS BEEN ISSUED WITH TOUCH SCREEN WHILE TEMPORARILY STOPPED | MI_Flg |
| | 0 | NO INSTRUCTION | |
| SHOOTING COMPLETION INSTRUCTION Flg | 1 | INSTRUCT COMPLETION OF LIVE COMPOSITE SHOOTING | SHI_Flg |
| | 0 | NOT INSTRUCTED | |

IMAGING DEVICE AND IMAGING METHOD

CROSS-REFERENCE TO RELATED APPLICATIONS

Benefit is claimed, under 35 U.S.C. § 119, to the filing date of prior Japanese Patent Application No. 2020-074382 filed on Apr. 17, 2020. This application is expressly incorporated herein by reference. The scope of the present invention is not limited to any requirements of the specific embodiments described in the application.

BACKGROUND OF THE INVENTION

1. Field of the Invention

The present invention relates to an imaging device and an imaging method that generate long exposure images by combining dark image data and a plurality of taken image data.

2. Description of the Related Art

In recent years has it has become possible to perform long exposure shooting in a more casual manner than with conventional bulb shooting, using the high performs and multi-functionality of digital cameras. In particular, it has become possible to easily perform optimal long exposures shooting while gradually confirming an exposure state during shooting, due to the introduction of live composite shooting that performs image combination processing, such as bright combination, dark combination, additive combination etc. on image data that has been continuously read out from an image sensor during long exposure.

This live composite shooting differs from conventional bulb shooting in that exposure of a background and exposure of the main subject are separated, which means that it is possible to easily set optimal exposure for the main subject and the background without the background being blown out as a result of performing exposure for the main subject over a long time. Because of this, live composite shooting is heavily used, instead of conventional bulb shooting, in long exposure shooting for celestial body shooting and the shooting of starry skies and fireworks etc., and in long exposure shooting for photographing the appearance of a main subject moving over a long time, using an ND filter.

However, with this type of long-time shooting, normally dark image data is acquired, and fixed pattern noise within image data is corrected using this dark image data. With conventional bulb shooting, acquisition of dark image data is usually performed at the time of shooting completion. However, in the case of live composite shooting (bright combination), dark image data for higher image sensor temperature, namely larger dark image data, is acquired either before or after shooting, and fixed pattern noise is corrected, as disclosed in Japanese patent No. 5952975 (hereafter referred to as "patent publication 1"). Conversely, in the case of live composite shooting (dark combination), lower image sensor temperature data, namely small dark image data, is acquired, and fixed pattern noise is corrected using this dark image data.

Normally with live composite shooting, together with shooting commencement, temperature of the image sensor is uniformly lowered, but it is possible that the opposite will also be true depending on a relationship between temperature of the shooting environment and temperature of the image sensor at the time of shooting commencement. Dark image data typically consists of dark current of an image sensor and offset of a differential detection circuit. While dark current increases in proportion to temperature, whether or not offset of a differential detection circuit increases in proportion to temperature differs depending on the structure of that differential detection circuit. Since most differential detection circuits are constructed with a tendency to counteract dark current, the magnitude of dark image data is not always consistent with a relationship before and after shooting and whether temperature is high or low. Also, even if a temperature coefficient for an offset is the same, magnitude of temperature before and after shooting is not uniquely decided by a relationship between time that has elapsed after the camera has been powered on, and environmental temperature in which the camera is operated.

Therefore, in the vast majority of cases dark image data is also required either before or after shooting, as disclosed in Japanese patent laid open No. 2016-116166 (hereafter referred to as "patent publication 2"), and for this reason, with shooting where there are a lots of shooting opportunities continuously over a comparatively short period time, such as when shooting fireworks etc., some of those shooting opportunities could be lost during acquisition of dark image data before shooting or after shooting.

Also, with this type of long exposure shooting a camera is generally fixed to a tripod, so that the camera does not shake. However, in an extremely dark environment the photographer may be unexpectedly disturbed by such occurrences as the photographer carelessly knocking the tripod with something to cause swaying, another photographer setting off a flash during shooting, or light from the headlamps of passing vehicles being projected into the photographing screen etc.

As a result, there may be problems such as still pictures or movies that have been taken over a long time being ruined due to image blur caused by disturbance during shooting, or the image being blown out due to a high brightness subject. To deal with these issues, a method a performing combination of image data by automatically detecting disturbances that have occurred during this type of long exposure shooting, and removing image data for time sections where the disturbances occurred, is disclosed in Japanese patent laid open No. 2015-159353 (hereafter referred to as "patent publication 3").

However, with this technology, in a case of shooting where there is a high possibility that brightness will certainly change significantly between frames, such as when shooting the glow from fireflies that are flying towards the camera, or shooting fireworks, it is possible that essential frames will be removed from a composite image. Also, besides this problem, there may be a problem such as it not being possible to use shooting techniques that are commonly used in long exposure shooting such as causing a close up subject within a screen to be highlighted using lights or a flash unit. Camera shake is also included in the disturbances mentioned in patent publication 3. A detection threshold level for disturbance caused by this camera shake is clear in the case of tripod shooting, but in the case of handheld photography it is difficult to define without making over prevention likely. This means that the method for automatically removing disturbances before looking at composition results in patent publication 3 has a problem in that application to shooting is extremely difficult in practice.

With conventional live composite shooting like this, shooting opportunities could be lost during acquisition of dark image data before shooting or after shooting. There was also a risk of shooting failing due to disturbances occurring during shooting.

SUMMARY OF THE INVENTION

The present invention provides an imaging device and an imaging method that can prevent shooting opportunities being missed because of acquiring dark image data when performing live composite shooting, and without shooting failing due to disturbances that arise during shooting.

An imaging device of a first aspect of the present invention comprises an image sensor for imaging a subject, a shooting commencement signal generating circuit for instructing shooting commencement, a shooting completion signal generating circuit for instructing shooting completion, an exposure control circuit for commencing exposure of the image sensor based on instruction of the shooting commencement, and completion exposure of the image sensor based on instruction of the shooting completion, an image data readout circuit for repeatedly reading out image data at a first frame rate while the image sensor is being exposed, an image data combining circuit for repeatedly combining a plurality of the image data that have been read out and outputting reference combined image data, a display for displaying an image based on the reference combined image data that has been combined, a memory for cyclically retaining a specified number of the reference combined image data read out at a second frame rate, a first dark image data acquisition circuit for acquiring first dark image data in a state where the image sensor has been shielded, before commencement of the exposure, a second dark image data acquisition circuit for acquiring second dark image data in a state where the image sensor has been shielded, based on completion of the exposure, a fixed pattern noise correction circuit that corrects fixed pattern noise of the reference combined image data based on at least one of the first dark image data and the second dark image data, a dark image data correction prohibition circuit for prohibiting processing to acquire first dark image data and/or second dark image data, or processing for correction by the fixed pattern noise correction circuit, and storage media for storing reference combined image data that has been corrected by the fixed pattern noise correction circuit.

An imaging method of a second aspect of the present invention, for an imaging device having an image sensor for imaging a subject, comprises instructing shooting commencement, instructing shooting completion, commencing exposure of the image sensor based on instruction of the shooting commencement, completing exposure of the image sensor based on instruction of the shooting completion, repeatedly reading out image data at a first frame rate while the image sensor is being exposed, repeatedly combining a plurality of the image data that have been read out and outputting reference combined image data, displaying an image on a display based on the reference combined image data that has been combined, cyclically retaining a specified number of the reference combined image data read out at a second frame rate, acquiring first dark image data in a state where the image sensor has been shielded, before commencement of the exposure, acquiring second dark image data in a state where the image sensor has been shielded, based on completion of the exposure, correcting fixed pattern noise of the reference combined image data based on the first dark image data and/or the second dark image data, prohibiting processing to acquire at least one of the first dark image data and the second dark image data, or correction processing for the fixed pattern noise, and storing reference combined image data that has been corrected by the fixed pattern noise correction circuit in storage media.

A non-transitory computer-readable medium of a third aspect of the present invention, storing a processor executable code, which when executed by at least one processor that is provided in an imaging device having an image sensor for imaging a subject, performs an imaging method, the imaging method comprising instructing shooting commencement, instructing shooting completion, commencing exposure of the image sensor based on instruction of the shooting commencement, completing exposure of the image sensor based on instruction of the shooting completion, repeatedly reading out image data at a first frame rate while the image sensor is being exposed, repeatedly combining a plurality of the image data that have been read out and outputting reference combined image data, displaying an image on a display based on the reference combined image data that has been combined, cyclically retaining a specified number of the reference combined image data read out at a second frame rate, acquiring first dark image data in a state where the image sensor has been shielded, before commencement of the exposure, acquiring second dark image data in a state where the image sensor has been shielded, based on completion of the exposure, correcting fixed pattern noise of the reference combined image data based on the first dark image data and/or the second dark image data, prohibiting processing to acquire at least one of the first dark image data and the second dark image data, or correction processing for the fixed pattern noise, and storing reference combined image data that has been corrected by the fixed pattern noise correction circuit in storage media.

BRIEF DESCRIPTION OF THE DRAWINGS

FIG. 5A and FIG. 5B are flowcharts showing operation of touch processing of the camera of one embodiment of the present invention.

FIG. 7A and FIG. 7B are flowcharts showing operation of dark data acquisition before shooting determination processing for the camera of one embodiment of the present invention.

FIG. 27 is a table for describing flags that are used within the flowcharts, in the camera of one embodiment of the present invention.

DETAILED DESCRIPTION OF THE PREFERRED EMBODIMENTS

Figure 1A:
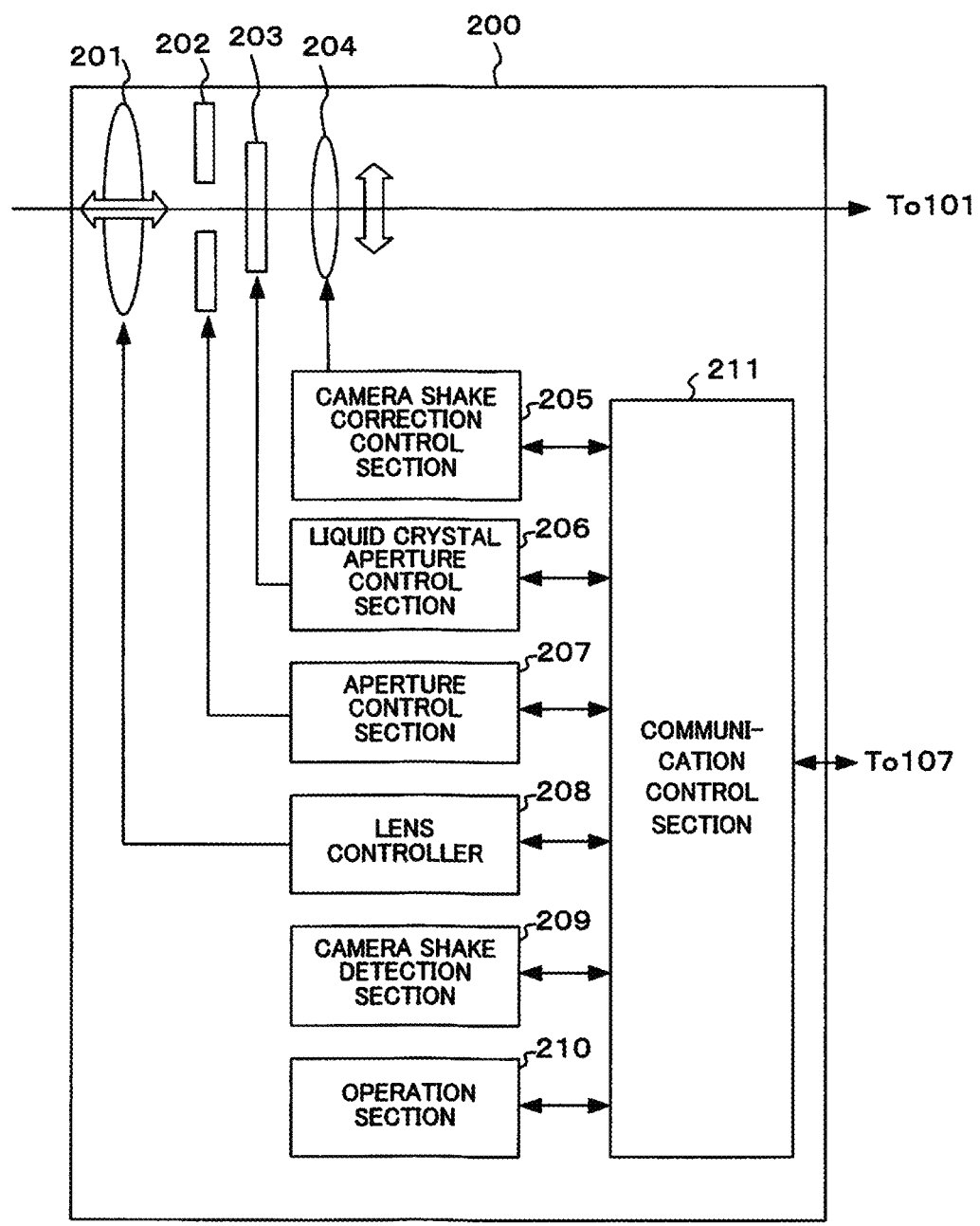
FIG. 1A is a block diagram mainly showing the electrical structure at an interchangeable lens side of a digital camera (hereafter referred to as "camera") of one embodiment of the present invention.

In the following, description will be given of an example where the present invention has been applied to a camera, as one embodiment of an imaging device of the present invention. It should be noted that the present invention is not limited by this embodiment, and may also be generally applied to an imaging device for shooting a subject image. Also, in the descriptions of the drawings, the same reference numerals are affixed to the same or corresponding elements, as appropriate. Also, the drawings are schematic drawings, and dimensional relationships of respective elements, ratios of respective elements etc. may be different from those in reality. Interactions between drawings may also include parts that have different mutual dimensional relationships and ratios.

An overview of this camera will be given in the following. This camera has an imaging section, with a subject image being converted to image data by this imaging section, and the subject image being subjected to live view display on a display section arranged on the rear surface of the camera body based on this converted image data. A photographer determines composition and photo opportunity by looking at the live view display. At the time of a release operation image data is stored in a storage medium. Image data that has been stored in the storage medium can be subjected to playback display on the display section if playback mode is selected.

Also, this camera can perform setting of live composite shooting mode in order to perform relatively bright combination, relatively dark combination, additive combination, additive averaging combination, etc. In the event that live composite shooting mode has been set, then dark image data of the image sensor is acquired before and after shooting (refer, for example, to S143 in FIG. 8A, S195 and S203 in FIG. 9, S179 in FIG. 8B, S377 in FIG. 24A, and S399 in FIG. 24B), and dark correction processing to remove fixed pattern noise that is superimposed on combined image data is performed using this dark image data (refer, for example, to S417 in FIG. 25A, and steps S439 to S445 in FIG. 25B).

Figure 7B:
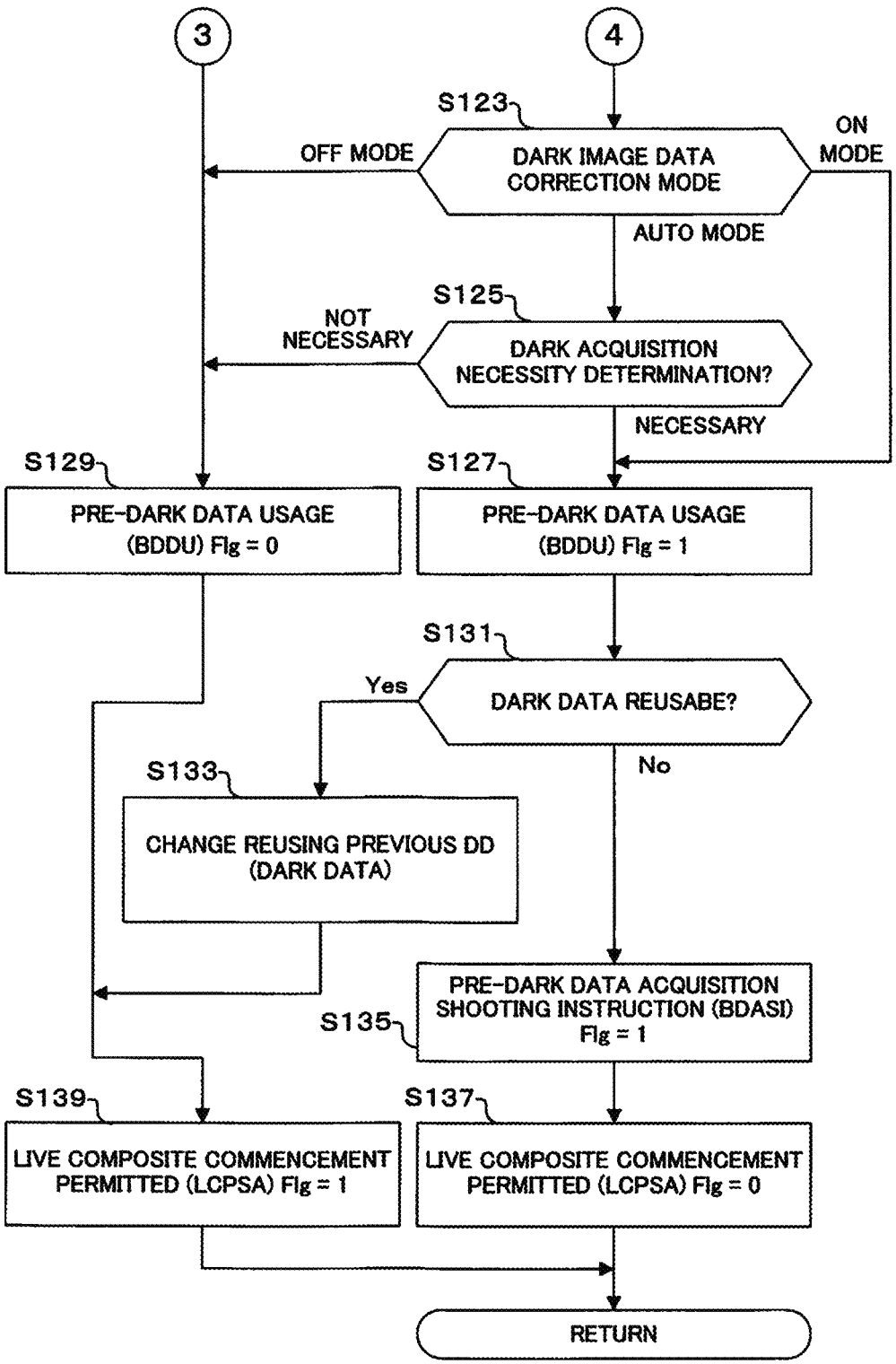
Figure 23A:
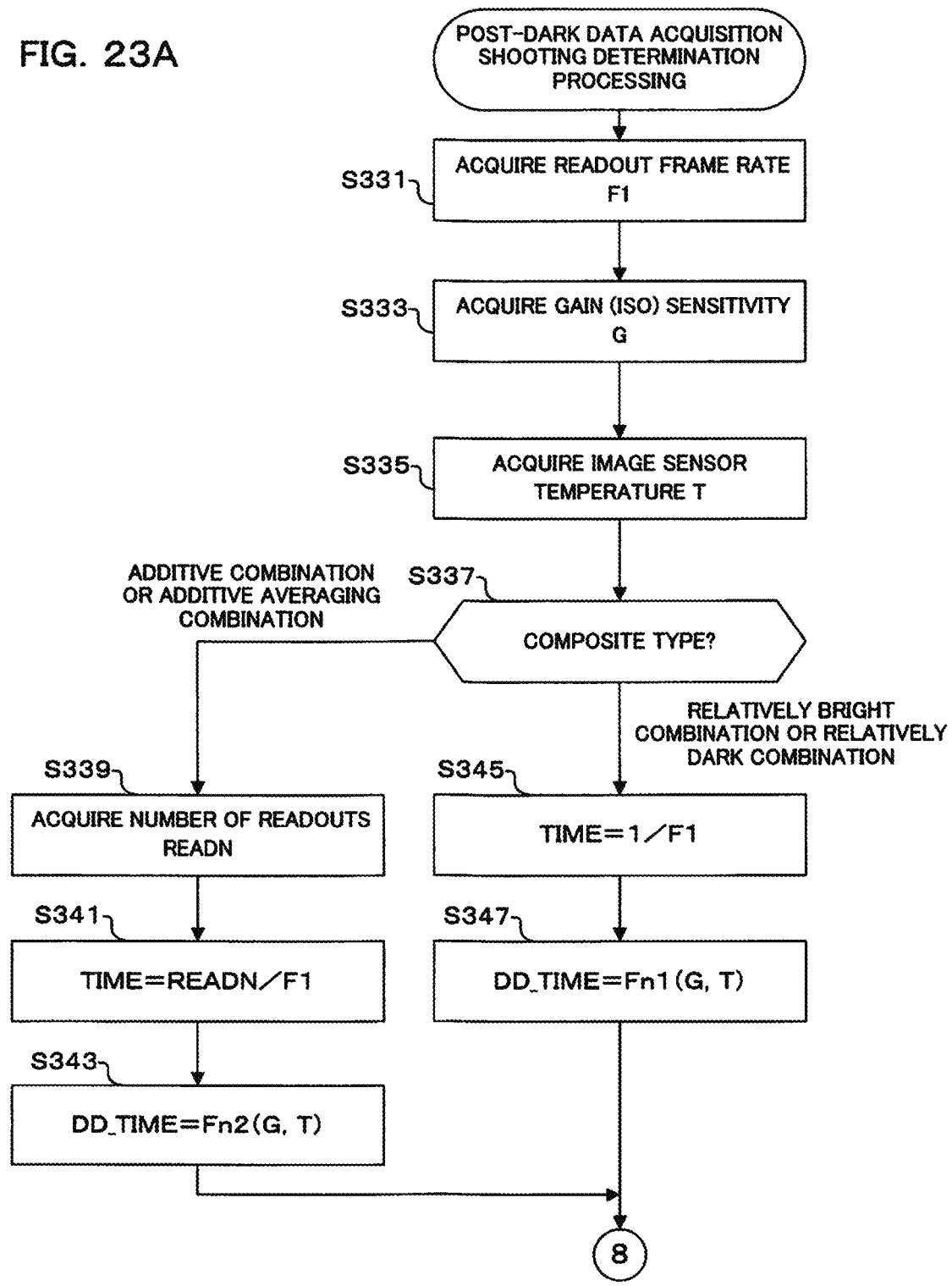
FIG. 23A and FIG. 23B are flowcharts showing operation of dark data acquisition after shooting determination processing of the camera of one embodiment of the present invention.
Figure 23B:
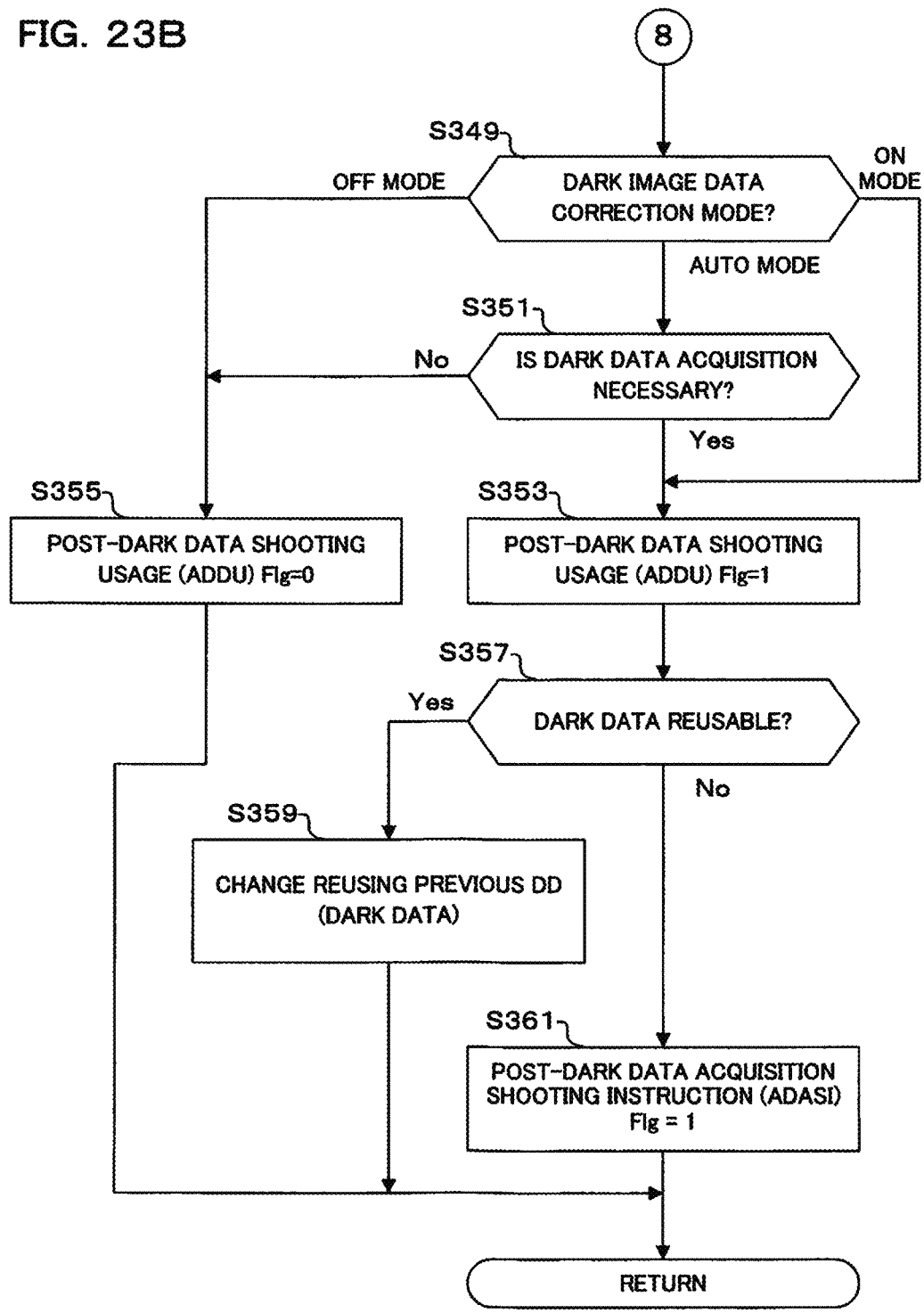

Also, in a case where this camera performs dark correction processing using dark image data, it is determined whether or not it is necessary to perform acquisition operations for first and second dark image data (refer, for example, to S125 in FIG. 7B and S351 in FIG. 23B), and if acquisition of this dark image data is not necessary that dark image data is not used (refer, for example, to S129 in FIG. 7B and S355 in FIG. 23B). Specifically, dark image data acquisition operations or correction operations are prohibited. Depending on shooting conditions, in a case where dark image data is not necessary, and since acquisition or correction has been prohibited, it is possible to avoid missing a shooting opportunity.

Figure 8A:
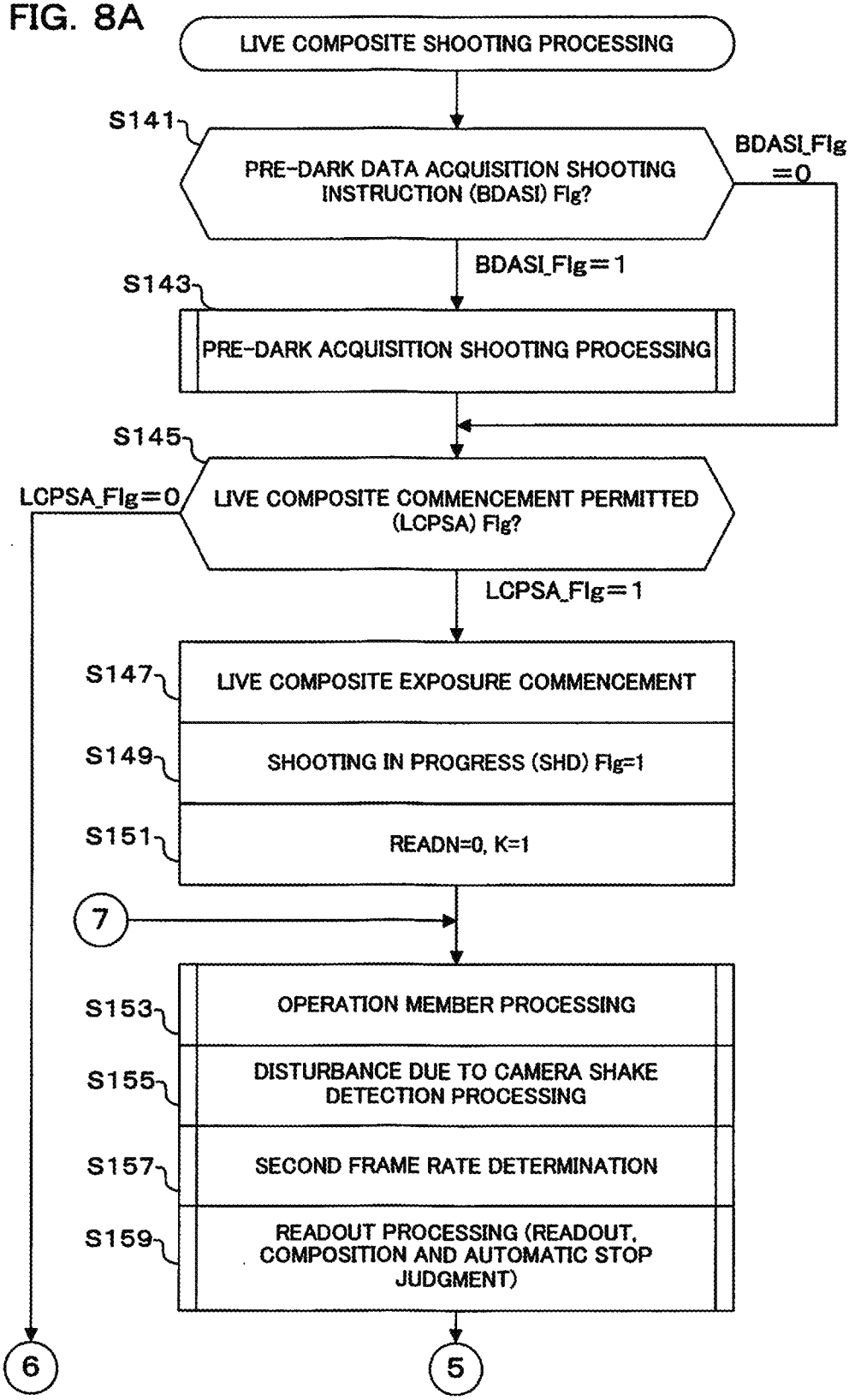
FIG. 8A and FIG. 8B are flowcharts showing operation for live composite shooting processing of the camera of one embodiment of the present invention.
Figure 12:
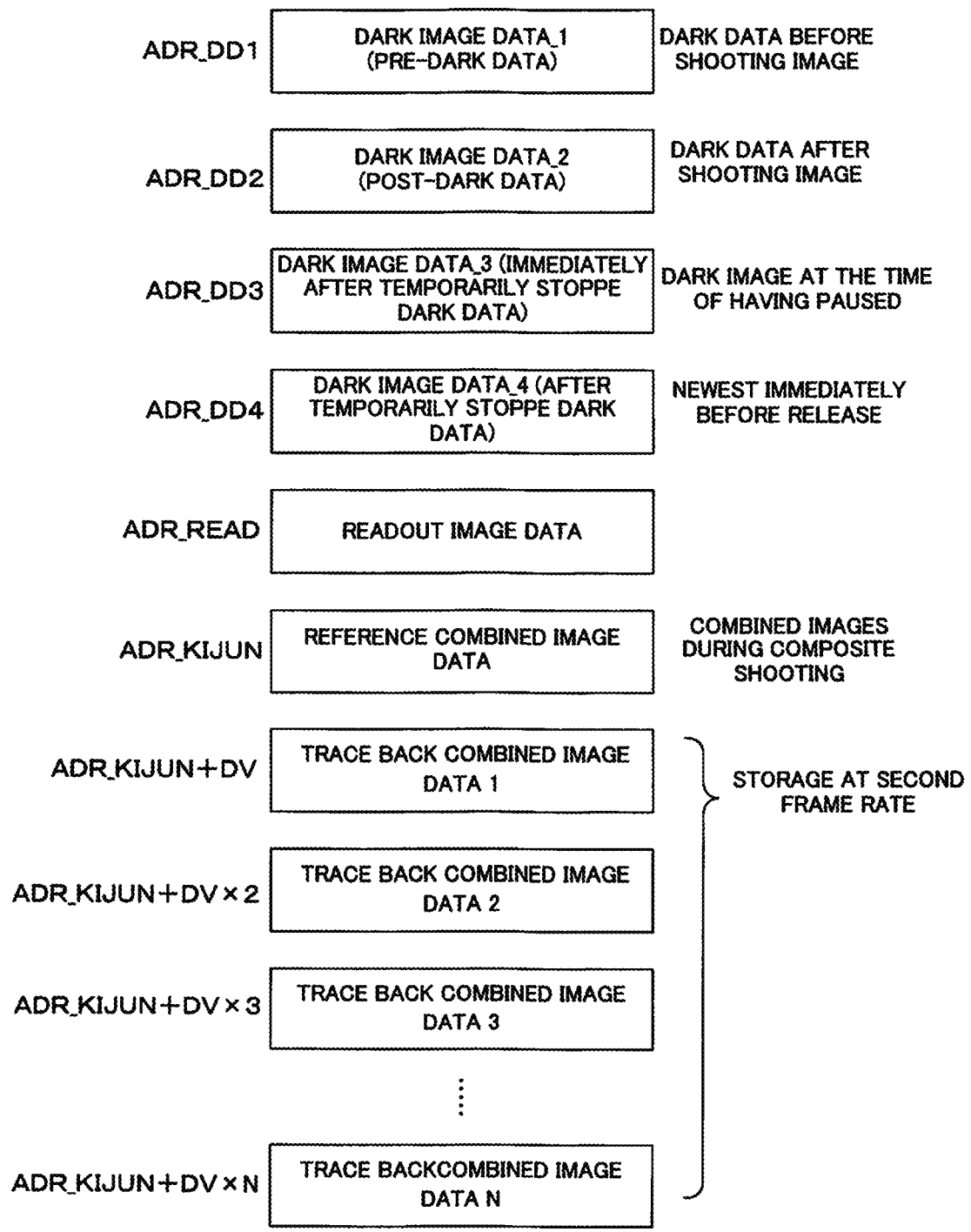
FIG. 12 is a drawing showing a memory map of reference combined image data and trace back combined image data, in the camera of one embodiment of the present invention.
Figure 13A:
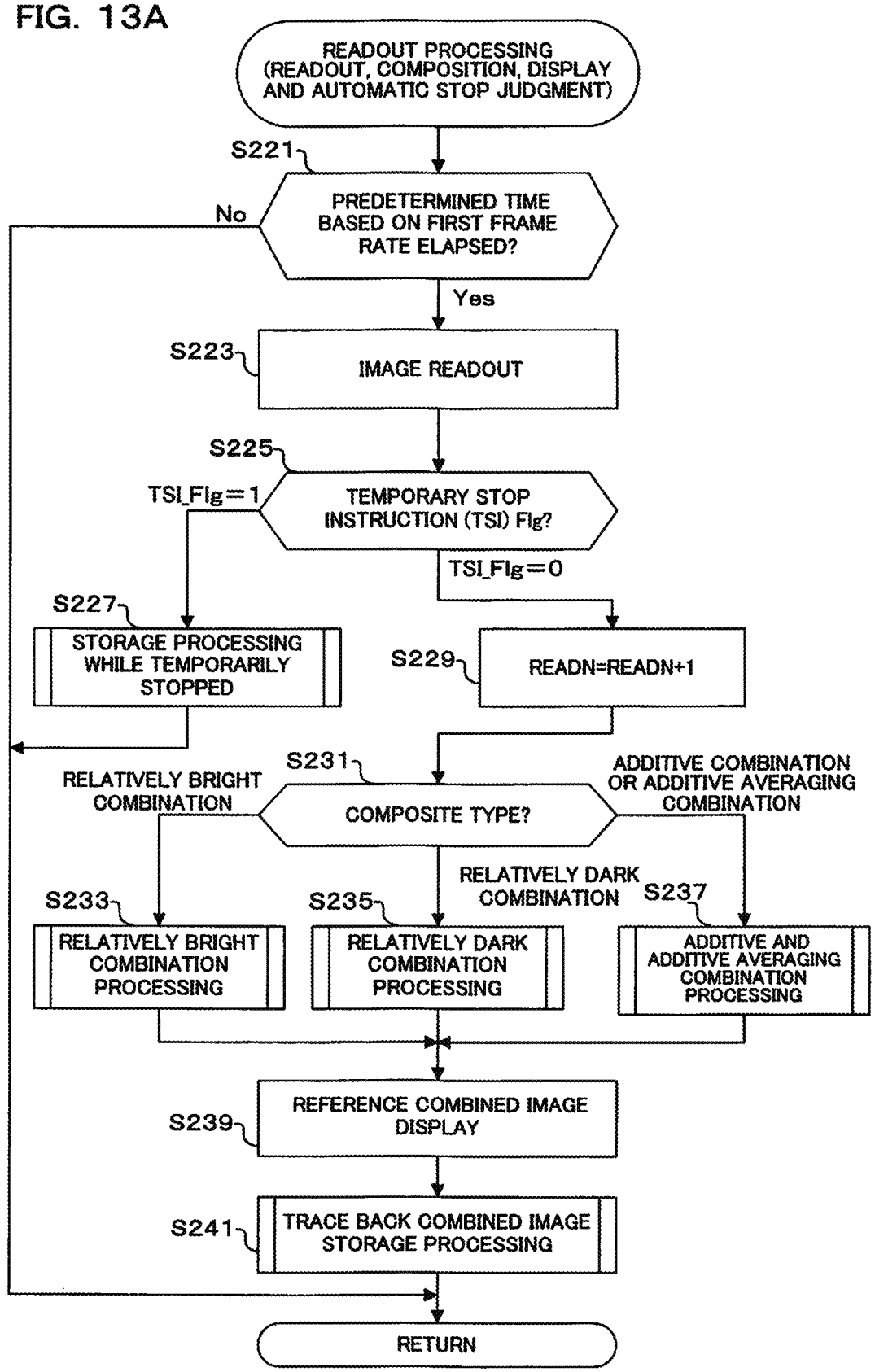
FIG. 13A is a flowchart showing readout processing operation of the camera of one embodiment of the present invention.

Also, with this camera, shooting is commenced, image data is read out, and every time combination processing, such as relatively bright combination, is performed, that combined image data is stored in memory (refer, for example, to S159 in FIG. 8A, the trace back combined image data in FIG. 12, and S241 in FIG. 13A). Since combined image data at the time point of each combination is stored in memory, then even if a disturbance has occurred, image data for the disturbance is stored as trace back image data, and it is possible to restore a combined state to before the disturbance, without damaging long exposure time data that has been performed up to now.

Figure 1B:
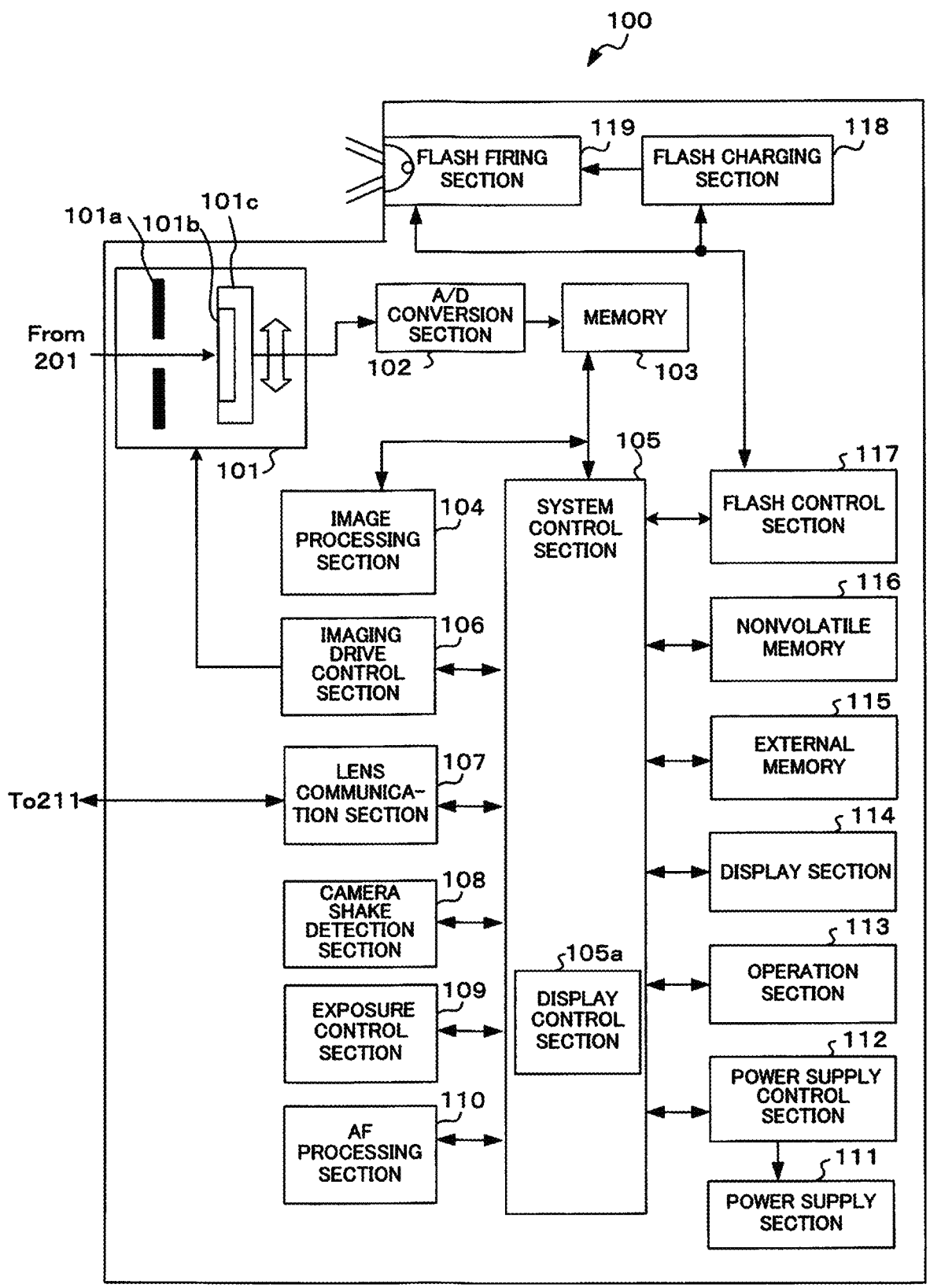
FIG. 1B is a block diagram mainly showing the electrical structure at a body side of a camera of one embodiment of the present invention.

FIG. 1A and FIG. 1B are block diagrams mainly showing the electrical structure of a camera of one embodiment of the present invention. This camera will be described as a single lens camera (mirror less camera) having a camera body 100 and an interchangeable lens 200. However, the camera may also be a fixed lens type camera in which the camera body 100 and the interchangeable lens 200 are integrated, and may also be a single lens reflex camera.

Operation of the interchangeable lens 200 is realized using various arithmetic circuits, such as an ASIC (Application specific Integrated Circuit), that includes a CPU (Central Processing Unit) etc., and an FPGA (Field Programmable Gate Array), and a storage device such as a memory. Each block that performs control of the interchangeable lens 200 may also be realized using a program that is executed by an arithmetic circuit. Specifically, the interchangeable lens 200 functions as a camera shake correction control section 205, a liquid crystal diaphragm control section 206, a mechanical diaphragm control section 207, a lens control section 208, and a communication control section 211, by means of executing this program. Obviously, each of these blocks may also be constructed using only hardware circuits, and the functions of these blocks may also be realized using hardware circuits and programs.

A photographing lens 201 is provided within the interchangeable lens 200, and an aperture mechanism 202, liquid crystal aperture 203, and camera shake correction lens 204 are provided on the optical axis of this photographing lens 201. The photographing lens 201 is an optical system for forming a subject image. The photographing lens 201 may also include a zoom optical system and a focus adjustment system.

The aperture mechanism 202 changes opening diameter by driving the aperture control section 207, and the result of this is change in subject light amount that passes through the photographing lens 201. The liquid crystal aperture 203 can have concentration of the liquid crystal changed by the liquid crystal diaphragm control section 206, and as a result the subject light amount that passes through the photographing lens 201 is changed.

The camera shake correction lens 204 is moved within a plane that is orthogonal to the optical axis of the photographing lens 201 by drive of the camera shake correction control section 205. As a result of moving the camera shake correction lens 204, movement caused by camera shake etc. that has occurred in the camera body 100 is canceled out.

A camera shake detection section 209 has sensors such as an acceleration sensor, angular velocity sensor, angle sensor, gyro etc., and detection circuits, and detects amount and direction of camera shake that is applied to the interchangeable lens 200 and the camera body 100. The camera shake detection section 209 functions as a disturbance detection circuit that detects disturbances that occur during shooting. The camera shake correction control section 205 controls movement of the camera shake correction lens 204 in a direction that is orthogonal to the optical axis in accordance with camera shake amount that has been detected by the camera shake detection section 209. The liquid crystal diaphragm control section 206 controls transmissivity of the liquid crystal aperture 203 in accordance with instruction from the camera body 100, and adjusts incident amount for the subject light flux.

The aperture control section 207 controls opening amount of the aperture mechanism 202 in accordance with instruction from the camera body 100, and adjusts incident amount for the subject light flux. However, since the aperture mechanism 202 generates drive noise, during movie shooting light amount is adjusted by the liquid crystal aperture 203, which is silent. The lens control section 208 moves specified lenses within the photographing lens 201 in accordance with instructions for zoom drive and focus adjustment from the camera body 100.

An operation section 210 is provided in the interchangeable lens 200, and is an input interface for the user to issue various instructions to the camera. Specifically, the operation section 210 is, for example, a manual adjustment ring for focus, a zoom ring, and AF (autofocus) start button, and IS (image stabilization) start button, etc. The communication control section 211 has a communication circuit, and controls communication between the interchangeable lens 200 and the camera body 100. Also, the communication control section 211 has an internal storage section (memory), and stores various lens information and various control information.

As shown in FIG. 1B, the camera body 100 comprises a system control section 105, an imaging section 101, A/D conversion section 102, memory 103, image processing section 104, imaging drive control section 106, lens communication section 107, camera shake detection section 108, exposure control section 109, AF processing section 110, power supply section 111, power supply control section 112, operation section 113, display section 114 external memory 115, nonvolatile memory 116, flash control section 117, flash charging section 118, and flash firing section 119.

Operation of the camera body 100 is realized using various arithmetic circuits such as ASICs that contain a CPU etc., and FPGAs etc., and storage devices such as memory. Each block that performs control of the camera body 100 may also be realized using a program that is executed by an arithmetic circuit. specifically, the camera body 100 may function as the system control section 105, imaging drive control section 106, exposure control section 109, AF processing section 110, power supply control section 112 and flash control section 117 by means of execution of this program. Obviously, each of these blocks may also be constructed using only hardware circuits, and the functions of these blocks may also be realized using hardware circuits and programs.

The imaging section 101 has a mechanical shutter 101a, image sensor 101b, and camera shake correction drive section 101c. The image sensor 101b is arranged on the optical axis of the photographing lens 201, close to a position where a subject image is formed, and the mechanical shutter 101a is arranged between the image sensor 101b and the photographing lens 201.

The mechanical shutter 101a adjusts exposure time of the image sensor 101b. The mechanical shutter 101a is for performing opening and closing for light flux of a subject image formed by the photographing lens 201, and employs a well-known lens shutter or focal plane shutter etc. It should be noted that an adjustment function for exposure time is not limited to the mechanical shutter 101a, and the electronic shutter of the image sensor 101b may also have the exposure time adjustment function. The exposure time adjustment function may also be performed by a hybrid of the mechanical shutter 101a and the electronic shutter.

The image sensor 101b forms an image of the subject, and acquires an optical image of the subject. The image sensor 101b is a two-dimensional solid image sensor such as a CMOS (Complementary Metal-Oxide-Semiconductor) image sensor or a CCD (Charge Coupled Device) image sensor. The image sensor 101b has Bayer array color filters arranged on a front surface of an imaging surface, and photoelectric conversion elements such as photodiodes arranged in correspondence with the color filters. An image region is constituted by pixel groups made up of each color filter and each of its corresponding photoelectric conversion elements. The image sensor 101b receives light that has been condensed by the photographing lens 201 at each pixel, and converts to a photoelectric current. The image sensor 101b accumulates photoelectric current that has been converted in a capacitor for every pixel, and outputs to the A/D conversion section 102 as an analog signal (image signal).

The camera shake correction drive section 101c holds the image sensor 101b, and comprises a drive mechanism for moving within a plane orthogonal to the photographing lens 201, a drive actuator, and a drive circuit. The camera shake correction drive section 101c corrects camera shake by moving the image sensor 101b in a direction that cancels camera shake that has occurred at the camera body 100.

The A/D conversion section 102 subjects an image signal that was subjected to photoelectric conversion by the image sensor 101b to AD conversion. The A/D conversion section 102 outputs the image signal that has been subjected to AD conversion to the memory 103 as image data.

The memory 103 is an electrically rewritable memory, and is constructed using frame memory and buffer memory, such as the VRAM (Video Random Access Memory), and DRAM (Dynamic Random Access memory). The memory 103 temporarily stores various data, such as image data that has been converted in the A/D conversion section 102, and image data that has been subjected to processing in the image processing section 104. As image data, dark image data, read out image data, reference combined image data, trace back combined image data, etc., is temporarily stored in the memory 103, as shown in the memory map shown in FIG. 12. Also, the flags shown in FIG. 27 are temporarily stored in this memory 103 during live composite shooting.

The memory 103 temporarily stores read out image data that has been readout from the image sensor at a first frame rate, and stores reference combined image data that has been updated based on this read-out image data. Further, combined reference data before update is cyclically stored and held at a second frame rate, as a specified number of trace back combined image data. Specifically, the memory 103 functions as memory for reading out reference combined image data at a second frame rate, and cyclically storing and holding a specified number of these data (refer, for example, to FIG. 12, S241 in FIG. 13A, and FIG. 13C). In addition to reference combined image data, the memory also stores and holds image data besides reference combined image data (for example, in FIG. 12, dark image data other than read-out image data, reference combined image data and trace back combined image data).

The image processing section 104 has an image processing circuit, and uses a GPU (Graphics Processing Unit) and FPGA (Field Programmable Gate Array). The image processing section 104 reads out image data that has been temporarily stored in the memory 103, and performs image processing such as white balance correction processing, demosaicing processing and color conversion processing on this image data. Further, the image processing section 104 performs image compression at the time of storage in the external memory 115, which will be described later, and expansion of compressed image data that has been read out from the external memory 115.

The image processing section 104 also performs combination processing such as relatively bright combination, relatively dark combination, additive combination, and additive averaging combination using image data that has been acquired from the image sensor 101b (refer to S231 to S237 in FIG. 13A). The image processing section 104 performs dark correction processing on combined images that have been generated by the combination processing, such as relatively bright combination, using dark image data. This dark correction processing is image processing for correcting fixed pattern noise that has been generated by the image sensor 101b even when the shutter is shielded, using dark image data.

The image processing section 104 functions as an image data combination circuit that repeatedly combines a plurality of image data that have been read out, and outputs reference combined image data (refer, for example, to S233 to S237 in FIG. 13A). The image processing section 104 functions as a fixed pattern noise correction circuit that corrects fixed pattern noise of reference combined image data based on either first dark image data or second dark image data.

The imaging drive control section 106 has an imaging drive circuit, and performs various operational control and drive control for the imaging section 101. The imaging drive control section 106 has a pixel readout drive section, a pixel shift drive section, a camera shake correction control section, and an imaging drive control section. The pixel readout drive section off the imaging drive control section 106 functions as an image data readout circuit that repeatedly reads out image data at a first frame rate during exposure of the image sensor (refer, for example, S101 in FIG. 6, S223 in FIG. 13A, etc.). As will be described later, reading out of image data is performed repeatedly every time a predetermined time elapses, based on the first frame rate (refer, for example, to S221 in FIG. 13A).

Also, the pixel shift drive section of the imaging drive control section 106 performs pixel shift operations. This pixel shift operation is shifting a positional relationship between the subject and the image sensor 101b in units of a pixel pitch or less (for example, a 0.5 pixel pitch, or a single pixel pitch). The camera shake correction control section performs camera shake correction to correct a positional relationship between the subject and the image sensor 101b depending on camera shift amount (also including camera shift direction) that has been detected by the camera shake detection section 209 and the camera shake detection section 108. As a result of this camera shake correction it is possible to remove or reduce movement based on camera shake etc. that has been applied to the camera body 100.

The camera shake detection section 108 has sensors such as an acceleration sensor, angular velocity sensor, angle sensor, gyro etc., and detection circuits, and detects movement, for example, amount and direction of camera shake, that has been applied to the camera body 100. Result of this detection is output to the imaging drive control section 106, as was described previously. The camera shake detection section 108 also functions as a disturbance detection circuit that detects mechanical disturbances to the camera that occur during shooting.

The lens communication section 107 has a communication circuit, and communicates with the communication control section 211 within the interchangeable lens 200. The lens communication section 107 controls data communication between the camera body 100 and the interchangeable lens 200.

The exposure control section 109 has an exposure control circuit, and calculates subject brightness using image data that has been temporarily stored in the memory 103. It should be noted that besides calculating subject brightness using image data, subject brightness may also be calculated using a dedicated photometric sensor.

The AF processing section 110 has an AF processing circuit, extracts high-frequency components that are contained in image data that has been temporarily stored in the memory 103, and detects in-focus position of a focus lens using a contrast value. This in-focus position information that has been detected is transmitted to the lens control section 208, and the lens control section 208 moves the focus lens to the in-focus position. It should be noted that in a case where phase difference detection pixels are embedded in the image sensor 101b, a defocus amount is calculated based on output signals of the phase difference detection pixels, and in-focus position may be calculated based this ranging calculation result.

The power supply section 111 is a power supply for driving the entire camera, and is provided with a power supply battery such as a secondary battery. The power supply control section 112 controls voltage of the power supply section 111 to a specified voltage, and supplies power to respective sections. The power supply control section 112 performs detection of voltage and remaining capacity of the power supply battery within the power supply section 111.

The operation section 113 is an input interface for inputting the photographer's instructions. The operation section 113 has various operation buttons, an operation dial and operation ring, and has a touch panel provided on a front surface of the display section 114. The operation section 113 detects operating states of these various operation buttons etc. and outputs results of detection to the system control section 105. The various operation members of the operation section 113 will be described later using FIG. 2.

The display section 114 has a display such as a rear screen monitor (refer to 114b in FIG. 2) or an electronic viewfinder EVF (refer to 114a in FIG. 2), and performs live view display and playback display of taken images that have been stored in the external memory 115, and further performs display of exposure control values etc. and display of menu screens for settings such as shooting mode. Further, at the time of live composite shooting display of combined images is also performed (refer, for example, to FIG. 5C, FIG. 5D, and S239 in FIG. 13A). The display of the display section 114 is, for example, a liquid crystal monitor, but may also be a display such as organic EL. Trace back combined images are displayed on subscreens 114b1 to 114b4 of the display section 114 when live composite shooting has been temporarily stopped or at the time of shooting completion (refer to FIG. 5C and FIG. 5D). It is also possible to optionally set to a display state or a non-display state by flicking 114a in FIG. 5C, as illustrated in FIG. 5D.

The display section 114 functions as a display for displaying live view images at the time of shooting standby. (refer to S3 and S5 in FIG. 3). In the case of live composite shooting standby, the display section 114 displays live view for live composite shooting. In the case of normal shooting, the display section 114 performs live view display processing for normal shooting. A difference between live view display processing for live composite shooting and normal live view display processing is that the need for pre-shooting for acquisition of dark data before shooting commencement is determined, and if it is deemed necessary a prompt display is performed (refer to S103 to S107 in FIG. 6). The display section 114 functions as a display that displays images based on combined reference image data that has been combined (refer to S239 in FIG. 13A). The display is display of images, based on image data other than combined reference image data, held in memory (for example, sub screens 114b1 to 114b4 in FIG. 5C).

The external memory 115 is electrically rewritable non-volatile memory, and is, for example, a storage medium that can be loaded into and taken out of the camera body 100. The external memory 115 stores image data that has been compressed in the image processing section 104, audio data, and data accompanying the audio data. The audio data is stored in synchronism with taken images as a movie and voice. Combined images generated at the time of live composite shooting and that have been subjected to processing by the dark correction processing are also stored in the external memory. These combined images that are stored are not limited to combined images generated at the time of shooting completion, and trace back combined images that have been given a check mark by the photographer are also stored (refer to S65 and S67 in FIG. 5A, FIG. 5C, and S415 and S421 in FIG. 25A). It should be noted that a storage medium for storing image data and audio data etc. is not limited to the external memory 115, and a storage medium such as a hard drive built into the camera body 100 may also be provided.

Also, combined image data at the time of live composite shooting that have been generated in the image processing section 104 are stored in the external memory 115 together with various associated parameters such as image sensor temperature T at the time of acquisition of dark image data, gain (ISO sensitivity) G, time T1, imaging frame frequency F1 etc. The external memory 115 stores dark image data that will be fed to the fixed pattern noise correction circuit. The external memory 115 functions as storage media for storing combined reference image data that has been corrected by the fixed pattern noise correction circuit (refer, for example, to S181 in FIG. 8B, and S421 in FIG. 25A).

The nonvolatile memory 116 is electrically rewritable non-volatile memory. Various parameters required for camera operation, and control programs that are executed in the system control section 105, are stored in the nonvolatile memory 116. It should be noted that the flag types that are listed in FIG. 27 are temporarily held in the memory 103 during live composite shooting, but after shooting completion flags that are also required after the power supply is turned off are stored in the nonvolatile memory 116. Further, dark image data are retrieved and saved together with various associated parameters in order to be reused immediately after the power supply is turned on.

The flash firing section 119 irradiates light such as flash light to a photographed object, and is provided with, for example, a luminous tube such as a xenon (Xe) tube, a reflective umbrella, and a firing circuit etc. The flash firing section 119 emits light using energy that has been stored in a capacitor within the flash charging section 118 if a firing instruction has been received from the flash control section 117.

The flash charging section 118 has a charging circuit, and accumulates energy required to perform firing of the flash firing section 119. The flash charging section 118 has a booster circuit for boosting voltage, and a capacitor for accumulating energy using the voltage that has been boosted. The flash control section 117 controls charging operation in the flash charging section 118 and the flash firing operation in the flash firing section 119.

The system control section 105 has a system controller (processor) that includes a CPU and peripheral circuitry for the CPU, this system controller can control each section within the camera, and the system control section 105 performs unified control of the interchangeable lens 200 and the camera body 100. The system control section 105 reads in specified control programs stored in the nonvolatile memory 116, which will be described later, and executes various sequences. Also, if a photographer operates any of the operations members of the operation section 113, the system control section 105 executes various sequences according to the photographer's operation. The various sequences will be described later using the flowcharts shown in FIG. 3 etc.

Figure 3:
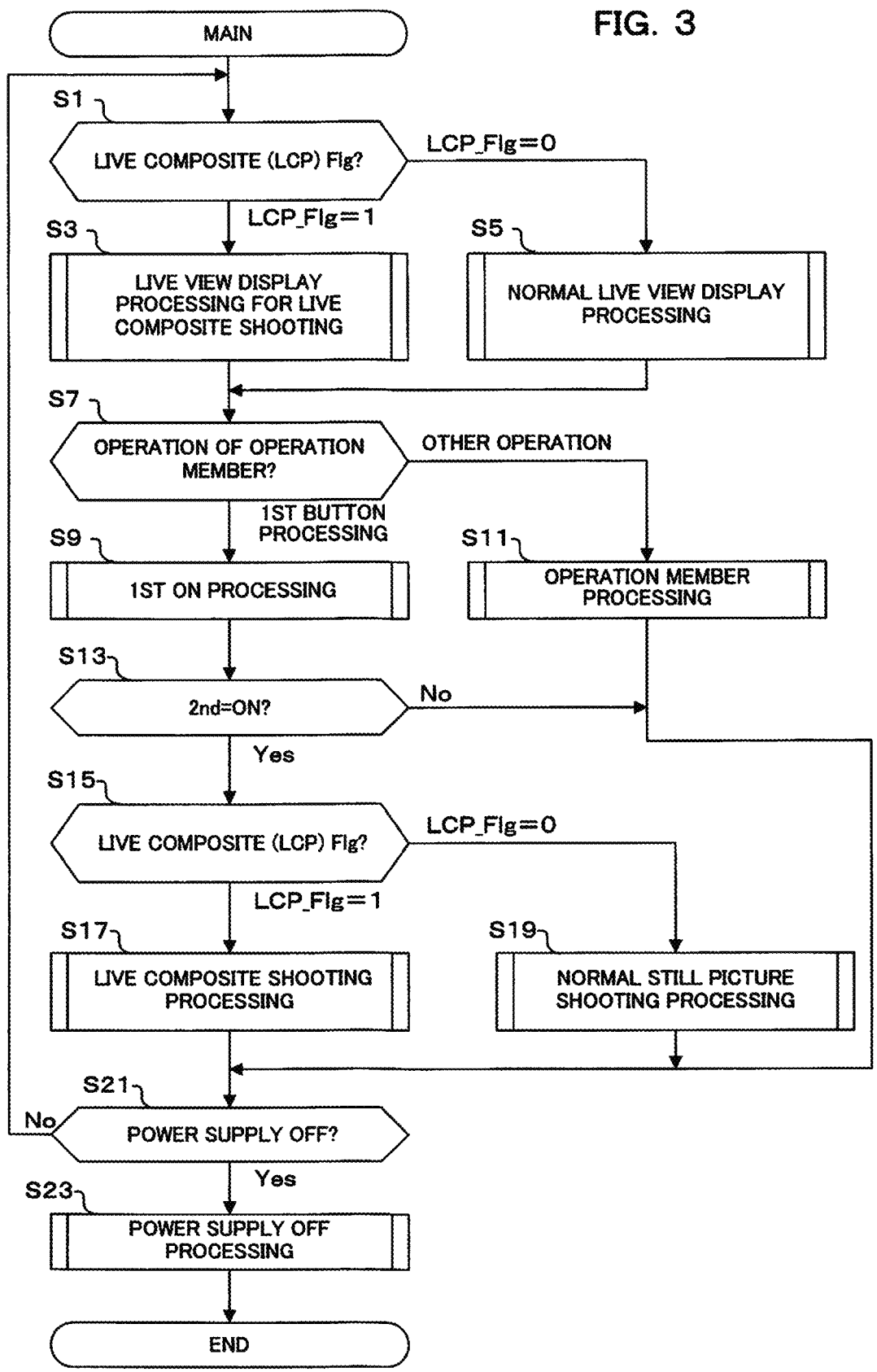
FIG. 3 is a flowchart showing main operation of the camera of one embodiment of the present invention.
Figure 4:
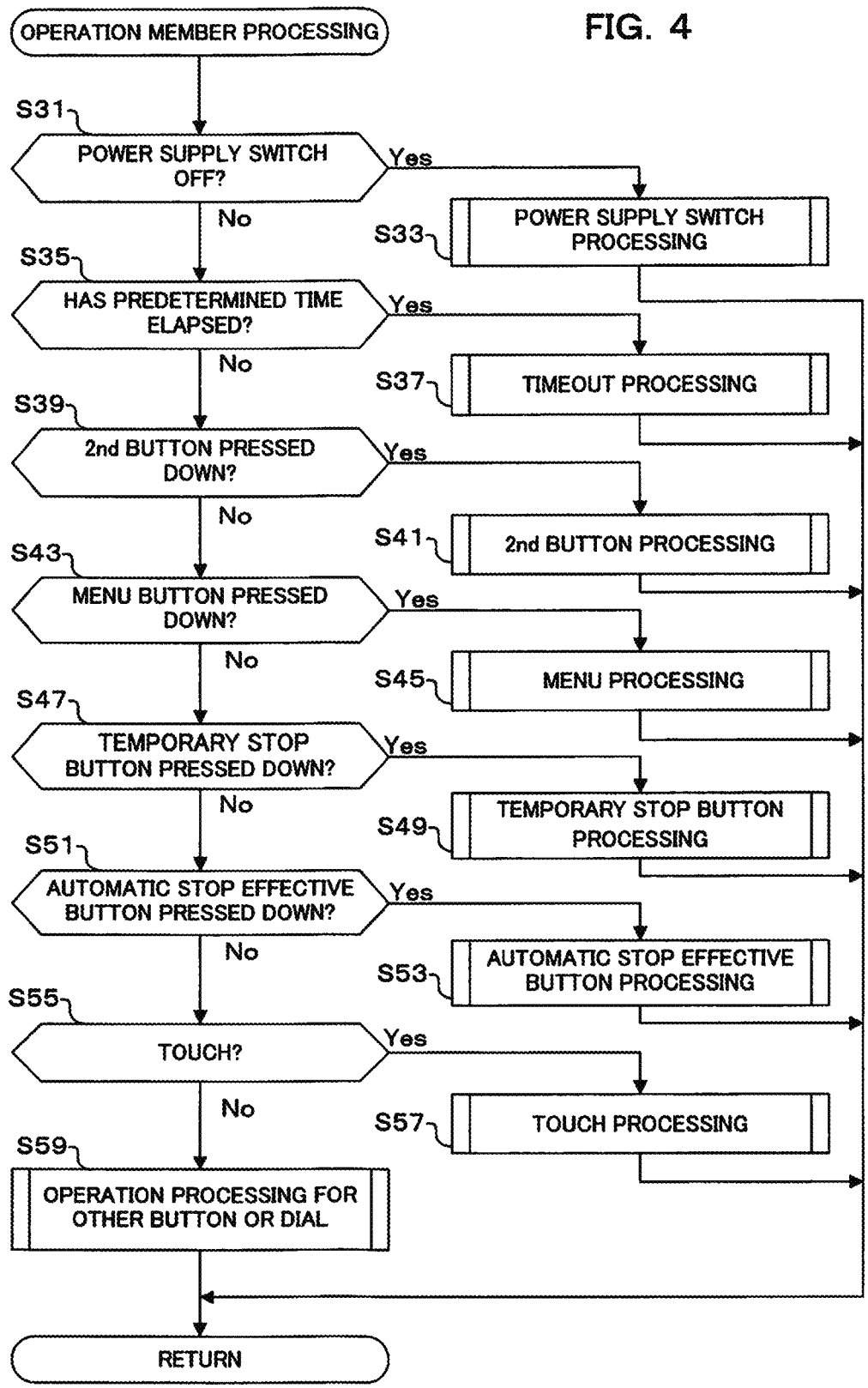
FIG. 4 is a flowchart showing operation member processing operation of the camera of one embodiment of the present invention.

The system control section 105 functions as a shooting commencement signal generating circuit for instructing shooting commencement (refer, for example, to S13 in FIG. 3, and S39 and S41 in FIG. 4). The system control section 105 functions as a shooting completion signal generating circuit for instructing shooting completion (refer, for example, to S81 and S87 in FIG. 5B, and S173 in FIG. 8B etc.). The system control section 105 functions as an exposure control circuit that commences exposure of the image sensor based on a shooting commencement instruction, and completes the exposure of the image sensor based on a shooting completion instruction (refer, for example, to S147 in FIG. 8A, and S175 in FIG. 8B).

Figure 8B:
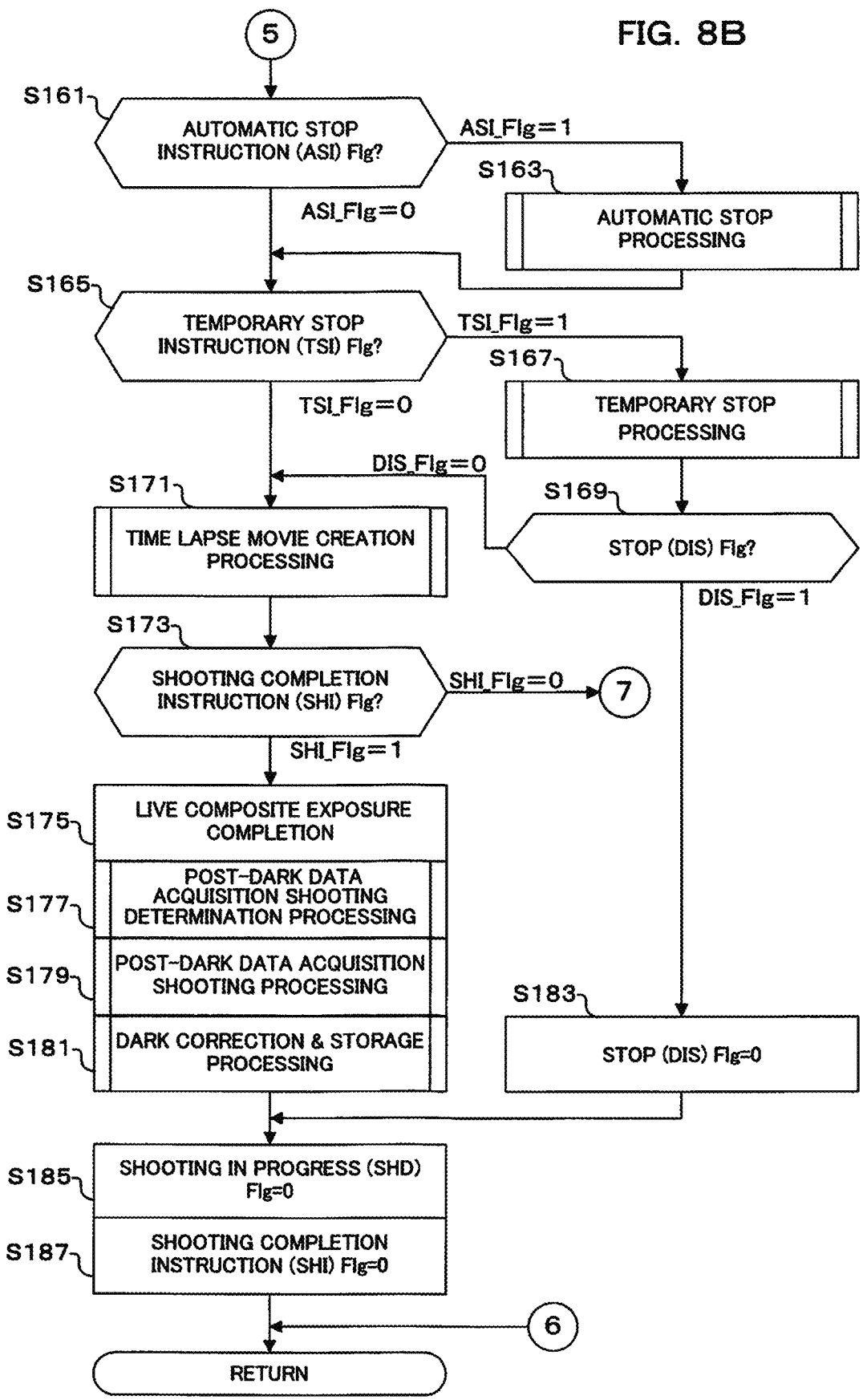
Figure 9:
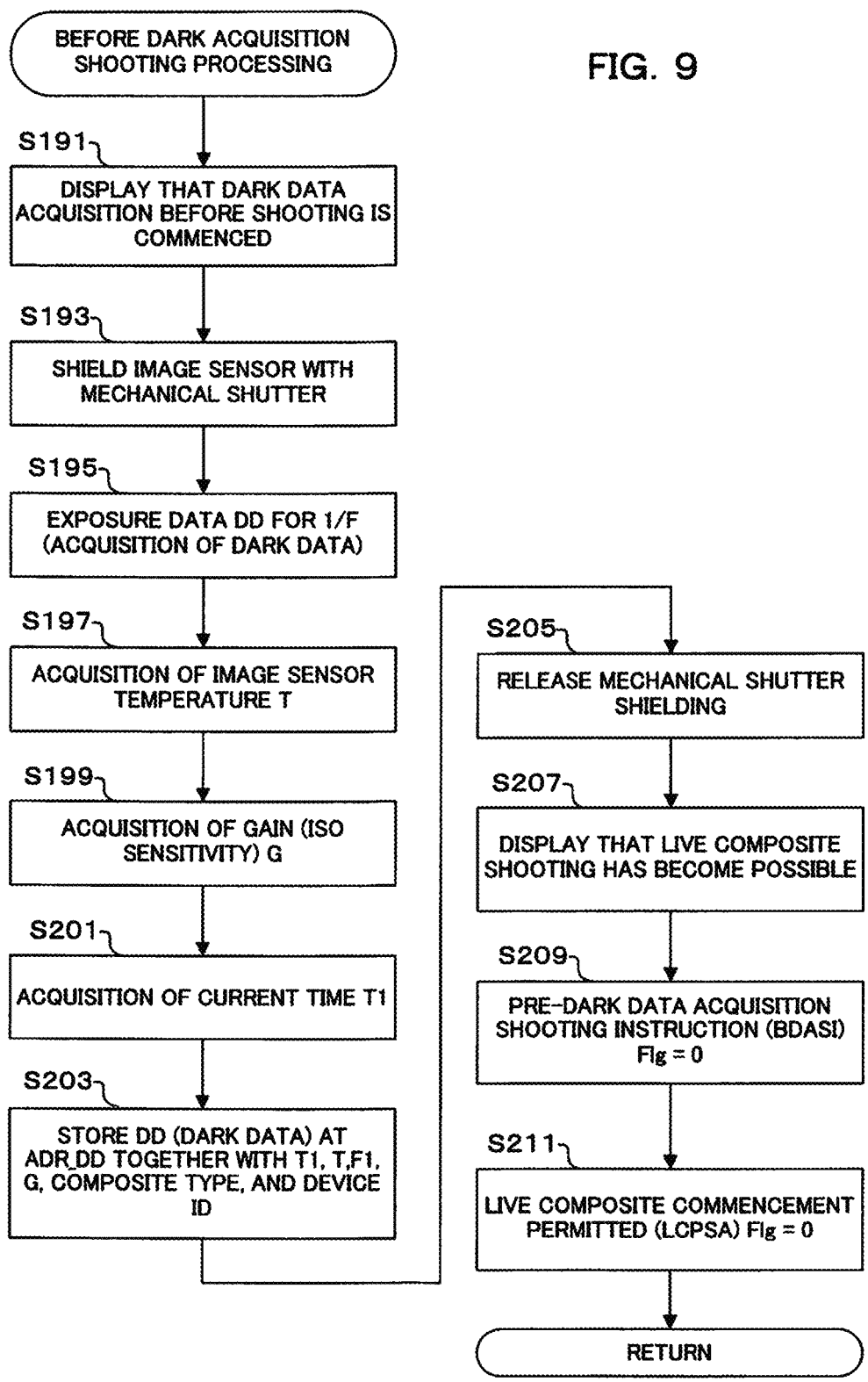
FIG. 9 is a flowchart showing operation of dark data acquisition before shooting processing of the camera of one embodiment of the present invention.

The system control section 105 functions as a first dark image data acquisition circuit that acquires dark image data in a state where the image sensor has been shielded, before commencing exposure (refer, for example, to S143 in FIG. 8A, and to FIG. 9). The system control section 105 functions as a second dark image data acquisition circuit that acquires dark image data in a state where the image sensor has been shielded based on completion of exposure (refer, for example, to S179 in FIG. 8B, and to FIG. 24A and FIG. 24B).

The system control section 105 functions as a dark image data correction prohibiting circuit that prohibits processing to acquire either first dark image data or second dark image data, or processing for correction by the fixed pattern noise correction section. For example, in the dark data acquisition before shooting determination processing of FIG. 7A and FIG. 7B, unnecessary first dark image data is not acquired (in other words acquisition is prohibited), in dark data acquisition after shooting determination processing of FIG. 23A and FIG. 23B unnecessary second dark image data is not acquired (in other words acquisition is prohibited), and in the dark correction processing of FIG. 25B correction using fixed pattern noise, using unnecessary first dark image data or second dark image data (refer, for example, to S439 to S445), is not performed (in other words, correction is prohibited).

Figure 25A:
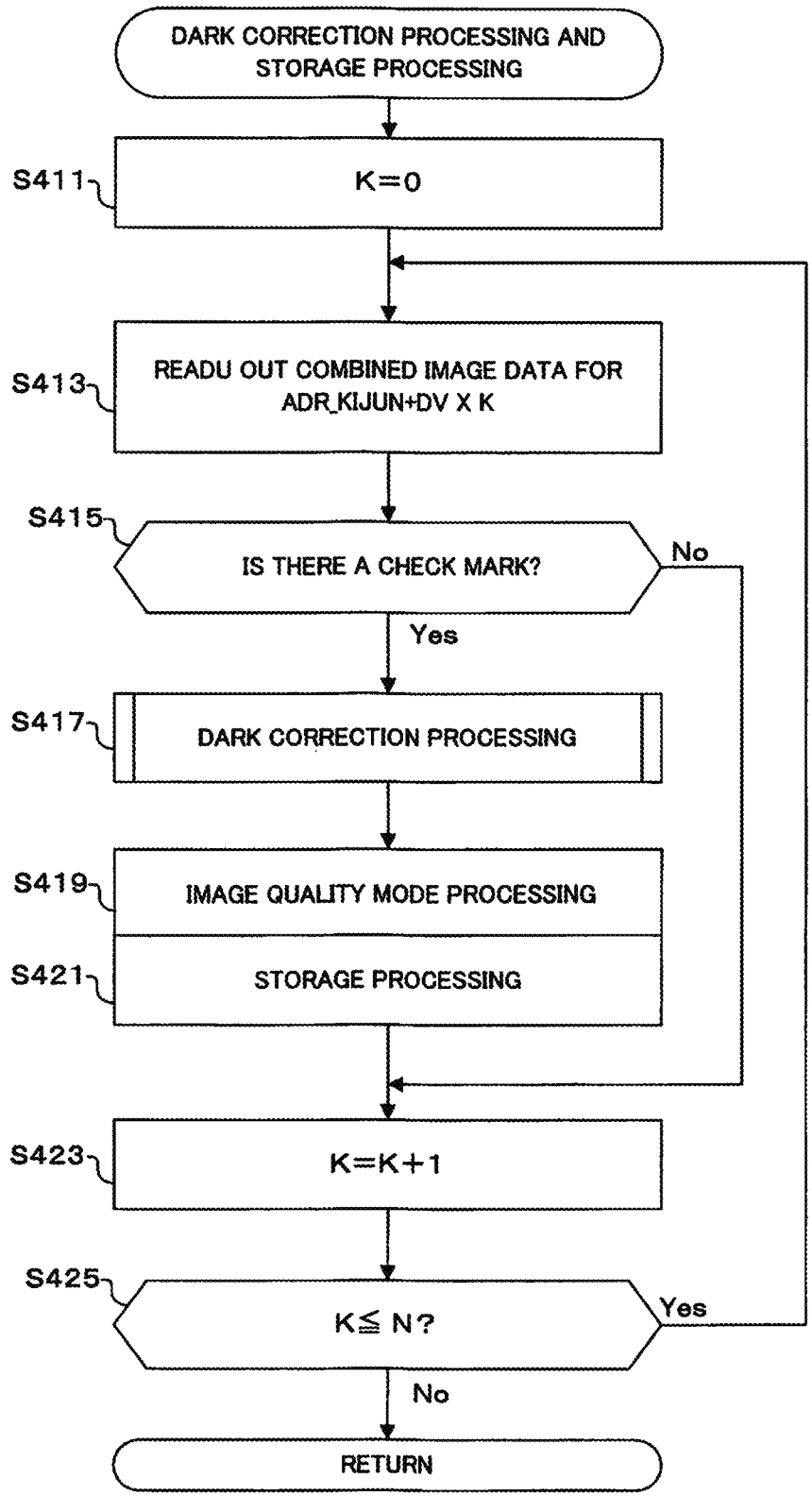
FIG. 25A and FIG. 25B are flowcharts showing operation of dark correction processing and storage processing of the camera of one embodiment of the present invention.
Figure 25B:
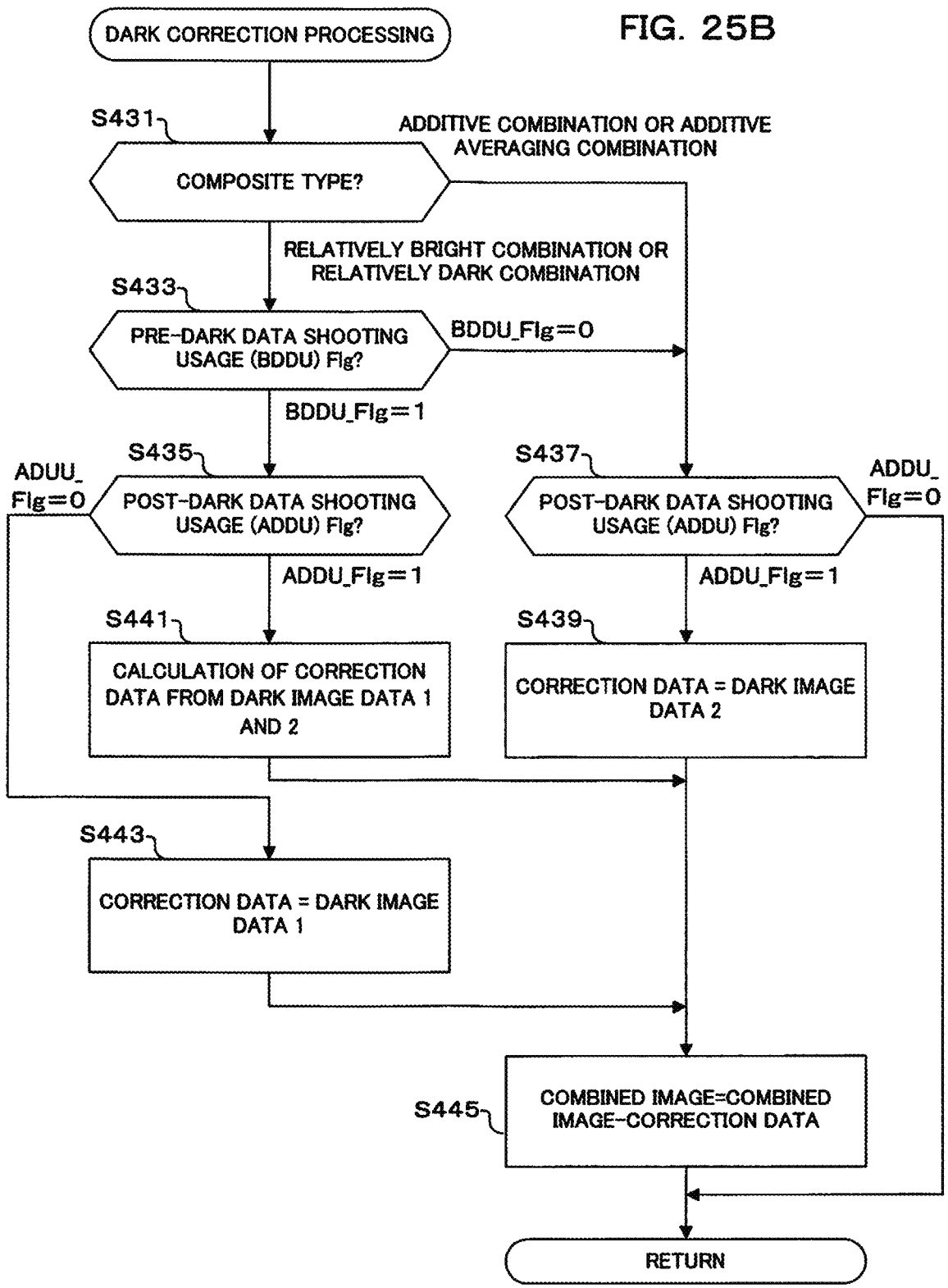

The system control section 105 functions as a dark image data correction prohibiting circuit that prohibits acquisition operations for dark image data or correction operations in the fixed pattern noise correction circuit, based on a first frame rate (readout time interval while exposure of the image sensor is in progress) (refer, for example, to S125 in FIG. 7B, S351 in FIG. 23B, and S433 to S445 in FIG. 25B). The system control section 105 functions as a dark image data correction prohibiting circuit that prohibits acquisition operations for dark image data or correction operations in the fixed pattern noise correction circuit, based on a first frame rate (readout time interval while exposure of the image sensor is in progress), temperature of the image sensor, and/or a gain value (refer, for example, to S125 in FIG. 7B, S351 in FIG. 23B, and S433 to S445 in FIG. 25B).

Figure 26A:
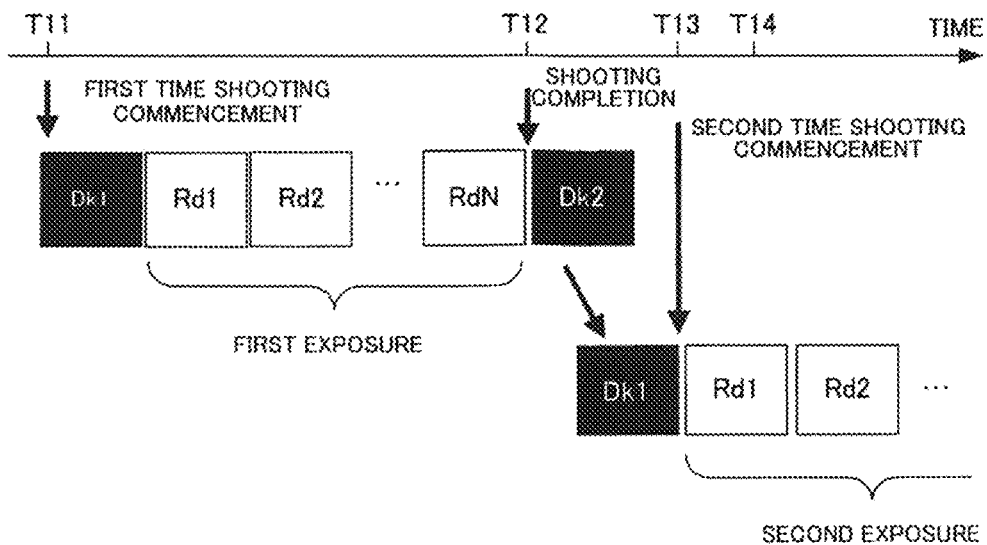
FIG. 26A and FIG. 26B are drawings for describing acquisition of dark image data in a case of performing live composite shooting a second time after having completed live composite shooting a first time, in the camera of one embodiment of the present invention.
Figure 26B:
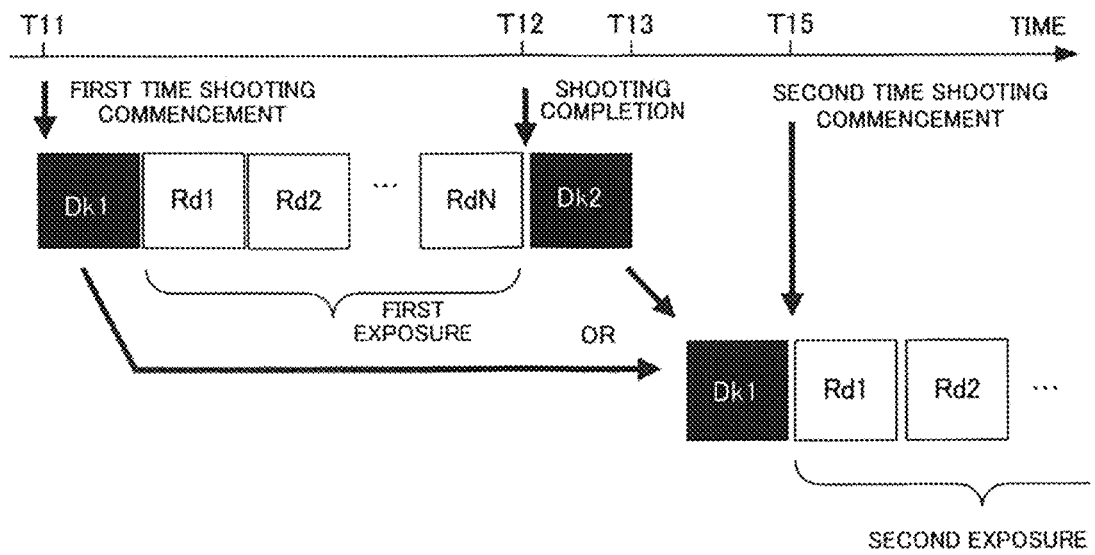

In a case where there is most recent dark image data, the dark image data correction prohibiting circuit prohibits acquisition and shooting operations for first dark image data, and makes data based on the most recent first and/or second dark image data the first dark image data (refer, for example, to FIG. 26A and FIG. 26B). The dark image data correction prohibiting circuit prohibits acquisition and shooting operations for dark image data when there is dark image data that can be reused (refer, for example, to FIG. 26A and FIG. 26B). It should be noted that in S125 in FIG. 7B, and in FIG. 23B, determination for dark acquisition is performed, but in this case, determination may also be based on whether or not there is reusable dark image data.

Figure 14:
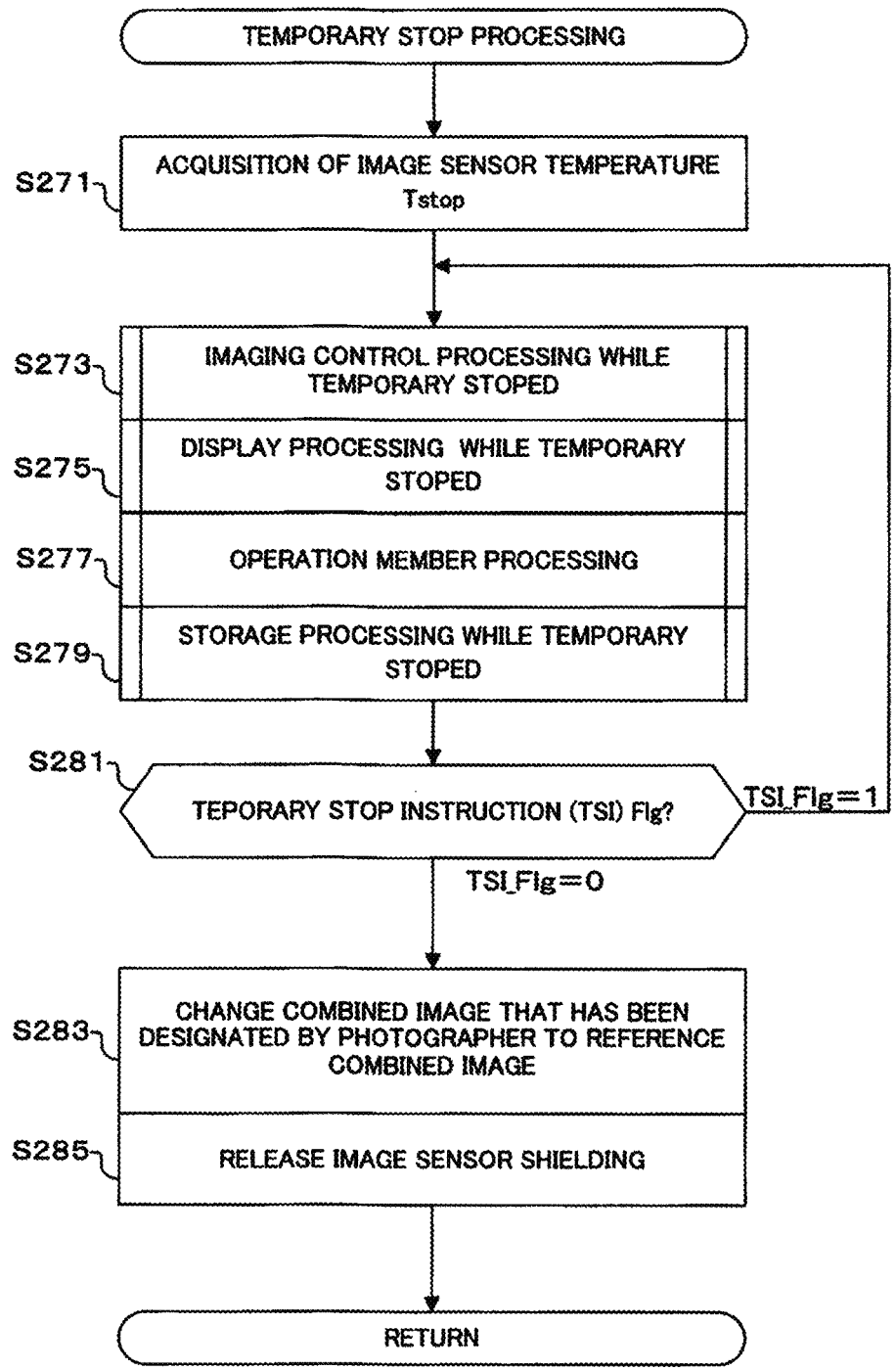
FIG. 14 is a flowchart showing temporary stop processing operation of the camera of one embodiment of the present invention.

The system control section 105 functions as a shooting temporary stop circuit for instructing temporary stop of shooting (refer, for example, to S47 and S49 in FIGS. 4, S165 and S167 in FIG. 8B, and to FIG. 14). In the event that temporary stop has been instructed, change of the first frame rate is prohibited during temporary stop (refer, for example, to S273 in FIG. 14, and S287 in FIG. 15). In the event that temporary stop has been instructed, the first frame rate is changed based on temperature of the image sensor (refer, for example, to S273 in FIG. 14, and S291 to S297 in FIG. 17). The first frame rate is changed so that temperature of the image sensor while temporarily stopped becomes substantially constant (refer, for example, to FIG. 18). The first frame rate is controlled so that temperature of the image sensor while temporarily stopped falls within a temperature range of the image sensor at the time of shooting commencement and at the time of shooting completion (refer, for example, to S273 in FIG. 14, S301 to S311 in FIG. 19, and to FIG. 20). In either case, the control section 105 controls the temporarily stopped readout frame rate such that a temperature relationship between combined images and dark image data can still be maintained. Specifically, it is desirable to perform control so that dark components of combined images at the time of resuming after temporary stop, and upon completion, fall between dark image data 1 and dark image data 2, with needless readout being stopped while temporarily stopped, and live view for a high-speed frame rate not being restored.

The system control section 105 functions as an automatic stop circuit for instructing temporary stop in response to a disturbance being detected by the disturbance detection circuit (refer, for example, to S155 in FIG. 8A, and S161 and S163 in FIG. 8B). The automatic stop circuit can switch between valid and invalid during shooting (refer, for example, to S153 in FIG. 8A, S51 and S53 in FIG. 4, and S163 in FIG. 8B).

Also, after having performed combination processing in accordance with composite type, the system control section 105 displays reference combined images resulting from this combination on the display section 114, together with cyclically storing previously generated reference combined images in memory 105 as trace back combined images (refer to S231 to S241 in FIG. 13A). At this time frame rate for storage of the trace back combined images is referred to as the second frame rate. It should be noted that the first frame rate is a readout time interval during exposure of the image sensor.

Figure 10:
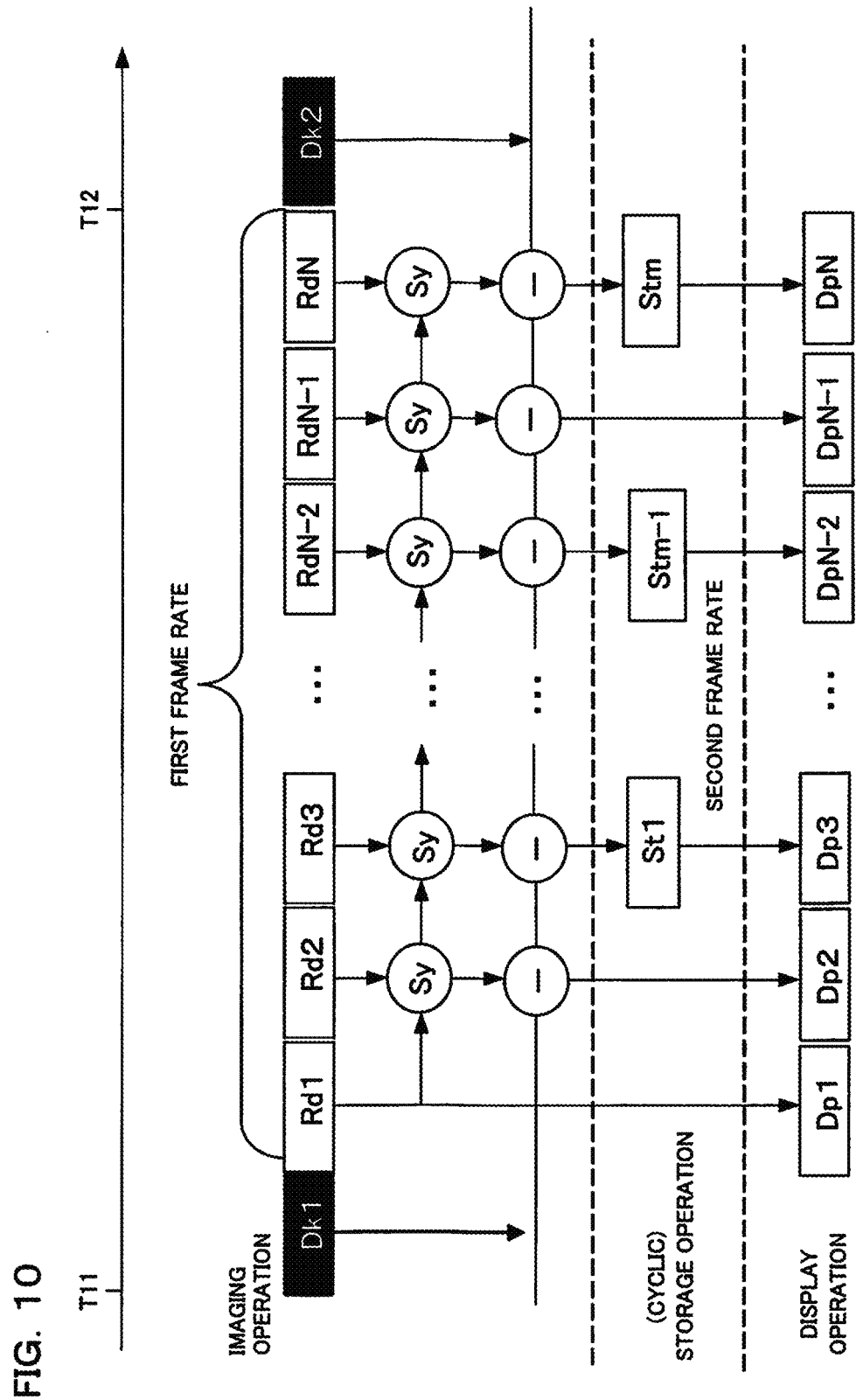
FIG. 10 is a drawing showing a relationship between a first frame rate and a second frame rate, in the camera of one embodiment of the present invention.

This second frame rate is lower than the first frame rate (refer, for example, to S157 in FIG. 8A, and to FIG. 10). Also, the second frame rate is changed based on the first frame rate (refer, for example, to S157 in FIG. 8A, FIG. 11A, S241 in FIG. 13A, and S261 in FIG. 13C). Also, the second frame rate is changed based on progress of exposure time. (refer, for example, to S157 in FIG. 8A, FIG. 11B, S241 in FIG. 13A, and S261 in FIG. 13C). The second frame rate is also restricted to an optimum frame range from the viewpoint of disturbance elimination responsiveness, in a time required for a single memory cycle, and in a time between reference combined images (refer to S157 in FIG. 8A, and to FIG. 12).

Also, the system control section 105 has a display control section 105a, and this display control section 105a has a display control circuit. The display control section 105a controls display on the display section 114. If the photographer touches any one of the trace back combined images that have been displayed on the sub screens 114b1 to 114b4 of the display section 114, the display control section 105a changes to display with which the subscreen that has been touched can be identified (refer, for example, to S69 and S71 in FIG. 5A, and to FIG. 5C).

The display control section 105a functions as a reference combined image data change circuit that replaces image data other than combined reference image data that has been retained in memory (for example, trace back combined image data), with reference combined image data (refer, for example, to S283 in FIG. 14). The display control section 105a functions as an image selection circuit that selects an image that has been displayed on the display (refer, for example, to S283 in FIG. 14). The display control section 105a functions as a reference combined image data change circuit that changes image data of an image that has been selected by the image selection circuit to reference combined image data (refer, for example, to S283 in FIG. 14).

Figure 2:
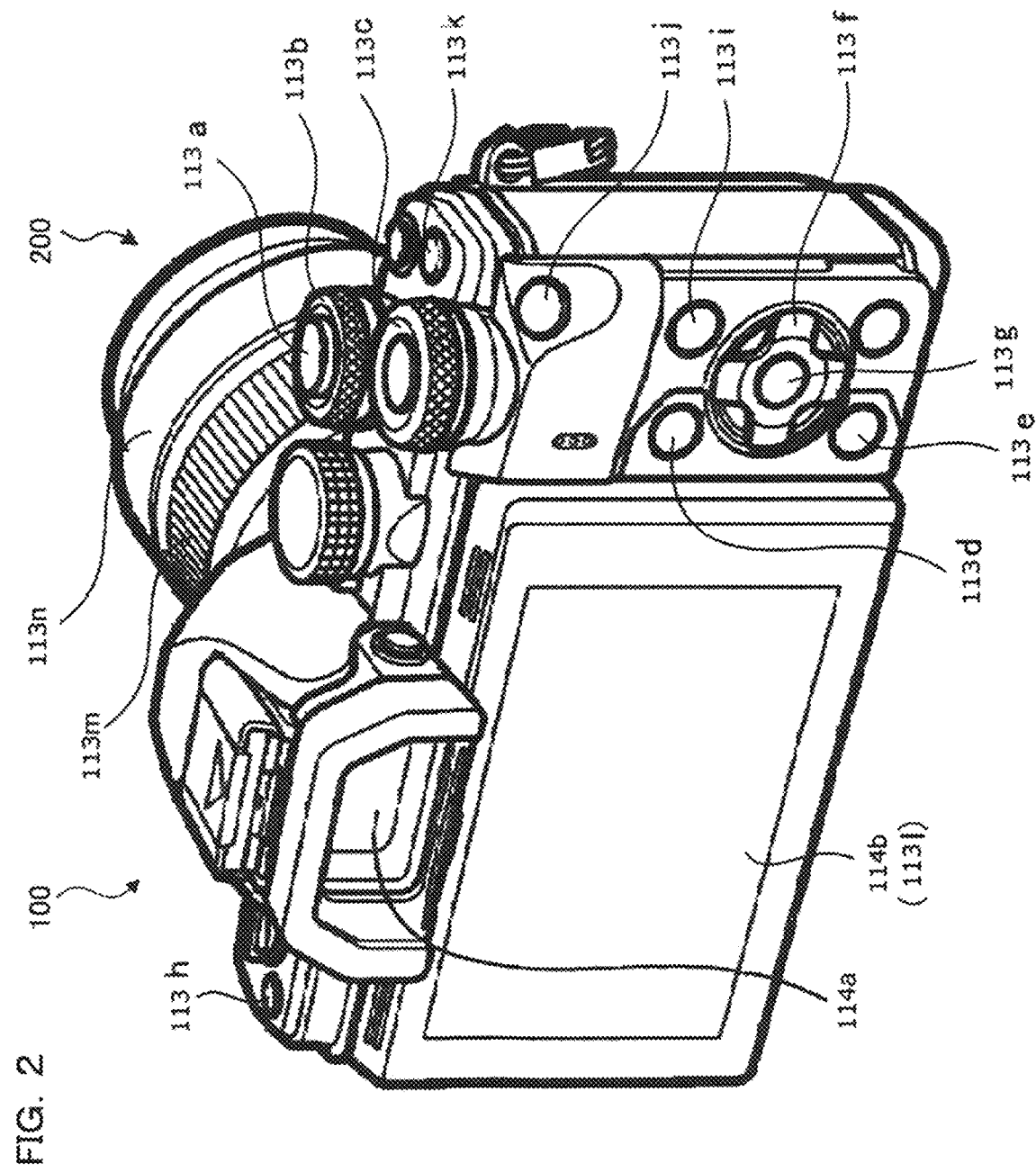
FIG. 2 is an external perspective view looking from a rear surface of the camera of one embodiment of the present invention.

Next, specific operation members in the operation section 113 will be described using FIG. 2. FIG. 2 is an external perspective view looking at the camera from a rear surface side, and the camera has the interchangeable lens 100 and the camera body 200. The operation section 113 has a release button 113a, an F (front) dial 113b, an R (rear) dial 113c, an INFO button 113d, a MENU button 113d, a select button 113f, and OK (set) button 113g, a drive button 113i, an automatic stop effective button 113j, a temporary stop button 113k, a touch panel 113l, a zoom ring 113m, and a focus ring 113n.

Next, basic operation of the camera of this embodiment will be described using the flowchart shown in FIG. 3. This flow (the same also applies to FIG. 4 to FIG. 5B, FIG. 6 to FIG. 9, FIG. 13A to FIG. 13C, FIG. 14 to FIG. 15, FIG. 17, FIG. 19, FIG. 21, and FIG. 23A to FIG. 25B, which will be described later) is realized by the CPU within the system control section 105 controlling each section etc. within the camera body 100 and the interchangeable lens in accordance with programs that have been stored within the nonvolatile memory 116. It should be noted that flags that are used within each flow are shown as a list in FIG. 27.

If operation of the main flow shown in FIG. 3 is commenced, first, determination is performed regarding a live composite flag (LCP_Flg) (S1). The live composite flag is 0 if live composite shooting is not performed (OFF), while the flag is 1 if live composite shooting is performed (ON). The photographer can perform setting for live composite shooting on a menu screen, and this flag is set to "0" or "1" depending on the setting operation.

If the result of determination in step S1 is that the LCP_Flg=1, namely that live composite shooting is on, then live view display processing for live composite shooting is performed (S3). Here, the system control section 105 performs live view display processing based on image data that has been read out from the image sensor 101b, and further, in the event that composite shooting mode has been set performs determination as to whether or not shooting for dark data acquisition before shooting is required in advance. Detailed operation of this live view display processing for live composite shooting will be described using FIG. 6.

If the result of determination in step S1 is that the LCP_Flg=0, namely that live composite shooting is off, then normal live view display processing is performed (S5). Here, the system control section 105 performs live view display processing based on image data that has been read out from the image sensor 101b start. It should be noted that every time a time of a specified frame rate elapses, image data is acquired from the image sensor 101b and live view display is updated.

Differing from a conventional single lens reflex camera, in the case of a mirrorless single lens camera power is fed to the image sensor and a shooting circuit system at the same time as the power supply is turned on, and a live view image is displayed. This means that together with turning the power supply on temperature of the imaging system (image sensor and imaging circuit system) rises (refer to temperature of the image sensor before shooting commencement in FIG. 16, FIG. 18, and FIG. 20). Temperature of the image sensor and speed of temperature rise mainly depend on readout frame rate of the image sensor, and temperature becomes higher rapidly as frame rate increases.

Also, various "live view modes" are displayed on menu screens, and the photographer can appropriately select from among these modes. "live view modes" are made up of different combinations of display frame rate, exposure simulation, image processing, HDR control, backlight level etc., in accordance with various shooting applications.

If live view display processing is performed in steps S3 or S5, next, determination is performed regarding operating state of the operation members (S7). The release button 113a has a 1st switch (called a 1st button) that is turned on in accordance with a half press operation, and a 2nd switch (called a 2nd button) that is turned on in accordance with a full press operation. In this step the system control section 105 determines whether a half press operation (1st button operation) of the release button 113a, among the operation members of the operation section 113, has been performed, or if an operation other than the first button operation has been performed. In a case where the photographer has performed preparation operations for shooting the release button 113a is pressed down halfway, and in response to this the camera executes AF processing and AE processing.

If the result of determination in step S7 is not 1st button processing, namely that there is another operation, operation member processing is performed (S11). Here, the system control section 105 performs processing in accordance with operating states of operation members such as buttons, dials, and levers other than the 1st switch that is linked to the release button 113a. Specifically, setting of various flags etc. is performed in accordance with an operation. Within the loop of the main routine, processing corresponding to flags that have been set is performed. Detailed operation of this operation member processing will be described later using FIG. 4. If operation member processing is complete, processing returns to step S1 if the result of determination in step S21 is that the power supply is on.

On the other hand, if the result of determination in step S7 is 1st button processing, 1st on processing is executed (S9). Here, the system control section 105 executes AF processing to achieve a focused state on a subject, and executes AE processing to determine exposure control values that will give appropriate exposure for the subject.

If 1st on processing has been performed in step S9, it is next determined whether or not the 2nd switch is on (S13). If the photographer has determined composition and there is a good shooting opportunity, they press the release button 113a down fully in order to execute shooting. Here, the system control section 105 performs determination based on state of the 2nd switch that is linked to the release button 113a. If the result of this determination is that the 2nd button has not been operated the determination in step S21 is performed, and if the result of determination is that the power supply is on, processing returns to step S1.

On the other hand, if the result of determination in step S13 is that the 2nd switch is on, then similarly to step S1 determination is performed for the live composite flag (LCP_Flg) (S15). If the result of determination in step S15 is that the LCP_Flg=0, namely that live composite shooting is off, then live view display processing for live composite shooting is not performed and normal still picture shooting processing is executed (S19). Here, the system control section 105 acquires image data of one frame from the image sensor 101b, and after having applied image processing for still picture stores the image data in the external memory 115. If normal still picture shooting processing is performed, the determination of step S21 is performed, and if the result of determination is that the power supply is on processing returns to step S1.

If the result of determination in step S15 is that the LCP_Flg=1, namely that live composite shooting is on, then live composite shooting processing is performed (S17). Here, the system control section 105 executes shooting in accordance with the type of live composite shooting that has been set on a menu screen (for example, bright combination, dark combination, additive combination, additive averaging combination, etc.). Detailed operation of this live composite shooting processing will be described later using FIG. 8A and FIG. 8B.

If live composite shooting has been performed, it is next determined whether or not the power supply is off (S21). Here, the system control section 105 performs determination based on operating state of the power supply button within the operation section 113. If the result of this determination is that the power supply is not off (namely that the power supply is on) processing returns to step S1.

On the other hand, if the result of determination in step S21 is that the power supply is off, power supply off processing is executed (S23). Once power supply off processing has been performed, various flags and shooting settings, and dark image data etc. are saved to the nonvolatile memory 116, and the main flow is terminated. If the photographer operates the power supply button again and turns the power supply on, the various data that was saved by the power supply off processing is loaded into memory 103, and processing resumes from step S1.

Next, operation of the operation member processing in step S11 (refer to FIG. 3) will be described using the flowchart shown in FIG. 4. If the flow for operation member processing is commenced, it is first determined whether or not the power supply switch is off (S31). Here, the system control section 105 performs determination based on operating state of the power supply button within the operation section 113. If the result of this determination is that the power supply switch is off, power supply switch processing is performed (S33). Here, the system control section 105 performs processing in order to turn the power supply off. The power supply switch processing determines whether a shooting in progress flag (SHD_Flg) is 1 or 0, and if this flag is 1, namely shooting is in progress, then the shooting completion instruction flag (SHI_Flg) is set to 1 and completion of shooting is instructed. On the other hand, if the flag is 0, namely live view is in progress, the routine returns without doing anything.

If the result of determination in step S31 is that the power supply switch is not off, it is determined whether or not a predetermined time has elapsed (S35). There will be cases where a specified restriction time has elapsed from commencement of live composite shooting. Also, there will be cases where the photographer has not performed any operation etc. for a predetermined time. The system control section 105 commences a clocking operation using an internal timer if a specified operation has been commenced or a non-operating state is entered, and so in this step it is determined whether or not a clocked time of the timer has reached the predetermined time.

If the result of determination in step S35 is that a predetermined time has elapsed, timeout processing is performed (S37). Here, the system control section 105 determines whether or not a limit time has elapsed if shooting is in progress, such as live composite for example, and terminates shooting if the limited time has elapsed, while continuing shooting if the limit time has not elapsed. On the other hand, if live view is in progress the system control section 105 performs sleep processing if a specified non-operation time has elapsed, and continues the live view without change if the specified non-operation time has not elapsed. It should be noted that the limit time can be set by the photographer on a menu screen etc.

If the result of determination in step S35 is that the predetermined time has not elapsed, it is determined whether or not the 2nd button has been pressed down (S41). If the release button 113a has been pressed down fully, live composite shooting is commenced (refer to S13 in FIG. 3). After this live composite shooting has been commenced, there will be cases where the release button 113a press down fully (2nd press) in order to finish live composite shooting. In this step, it is determined whether or not these full press operations have been performed.

If the result of determination in step S39 is that a 2nd press has been performed, 2nd button processing is performed (S41). Here it is determined whether the shooting in progress flag (SHD_Flg) is 1 or 0. If the result of this determination is that the shooting in progress flag is 0 (live view in progress), the shooting completion instruction flag (SHI_Flg) is set to 0, while if the shooting progress flag is 1 (shooting in progress) the shooting completion instruction flag (SHI_Flg) is set to 1. Specifically, in the event that the release button has been pressed down fully while shooting is in progress, a shooting completion instruction is issued before setting the shooting completion instruction flag.

If the result of determination in step S39 was that there was not a 2nd press, it is next determined whether or not the menu button has been pressed down (S43). If the photographer wants to set items on a menu screen, the menu button 113e is operated. Here, the system control section 105 perform determination based on the state of the menu button 113e.

If the result of determination in step S43 is that the menu button has been pressed down, menu processing is performed (S45). Here, the system control section 105 displays a menu screen on the display section 114. The photographer determines items by moving an item display for selection by operating the select button 113f while looking at the menu screens, and operating the OK button 113g.

If the result of determination in step S43 was that the menu button was not pressed down, it is next determined whether or not the temporary stop button has been pressed down (S47). If the photographer wants to temporarily stop shooting while live composite shooting is in progress, the temporary stop button 113k is operated. For example, when a disturbance such as lights of the car has occurred during shooting, there may be cases where it results in a combined image that is not desired, and so the photographer operates the temporary stop button 113k. The system control section 105 performs determination based on operating state of the temporary stop button 113k.

If the result of determination in step S47 is that the temporary stop button has been pressed down, next, temporary stop button processing is performed (S49). The system control section 105 performs toggle switching of the temporary stop instruction flag (TSI_Flg) if the temporary stop button 113k has been pressed down. Specifically, if shooting is temporarily stopped, temporary stop is released. On the other hand if shooting is not temporarily stopped a temporary stop is instructed. Also, an immediately after temporary stop flag (TSMI_Flg) for instructing storage of dark image data immediately after temporary stop is set together with the flag for instructing temporary stop (TSI_Flg). It should be noted that if a resume icon 114j on the display section 114 is touched while temporarily stopped, the temporary stop instruction flag (TSI_Flg) is reset to 0 (refer to S89 and S95 in FIG. 5B, and to FIG. 5C), and the temporary stop is removed.

If the result of determination in step S47 was not that the temporary stop button was pressed down, it is next determined whether or not the automatic stop effective button has been pressed down (S51). With this embodiment, an automatic stop function, to automatically stop shooting if a disturbance occurs during live composite shooting, is provided. However, depending on shooting conditions (such as a case where a flash is been fired), there may be cases where this automatic stop function is inappropriate. It is therefore made possible to set whether or not the automatic stop function is valid or invalid in advance using the automatic stop effective button 113j.

If the result of determination in step S51 is that the automatic stop effective button has been pressed down, automatic stop effective button processing is performed (S53). The system control section 105 performs toggle switching of the automatic stop effective flag (ASE_Flg) if the automatic stop effective button 113j has been pressed down. Specifically, if the automatic stop effective flag is not valid (ASE_Flg=0) automatic stop is made valid, while if the automatic stop effective flag is valid (ASE_Flg=1) automatic stop is made invalid.

If the result of determination in step S51 is that the automatic stop effective button has not been pressed down, it is next determined whether or not a touch operation has been performed (S55). The touch panel 1131 is provided on the front surface of the display section 114. Here, the system control section 105 performs determination as to whether or not this touch panel 1131 has been subject to a touch operation.

If the result of determination in step S55 is that there has been a touch operation, touch processing is performed (S57). Here, the system control section 105 performs processing in accordance with a touched state of the touch panel 1131. For example, in a case where temporary stop has been issued during live composite shooting, trace back combined images are displayed, and if the photographer touches these combined images processing is executed in accordance with a touch position. Detailed operation of this touch processing will be described later using FIG. 5A to FIG. 5D.

If the result of determination in step S55 is that touch has not been performed, other button or dial operation processing is performed (S59). Here the system control section 105 determines whether or not an operation has been performed for other than the above described buttons etc., and executes processing in accordance with the result of this determination.

If processing has been performed in steps S33, S37, S41, S45, S49, S53, S57 or S59, the originating flow is returned to.

Next, operation of the touch processing of step S57 (refer to FIG. 4) will be described using the flowcharts shown in FIG. 5A and FIG. 5B, and using FIG. 5C and FIG. 5D.

If the flow for touch processing is commenced, determination is first performed for the shooting in progress flag (SHD_Flg) (S61). The shooting in progress flag (SHD_Flg) is 1 if live composite shooting is in progress, and is 0 if live view is in progress, as was described previously. In this step the system control section 105 performs determination based on the shooting in progress flag (SHD_Flg).

If the result of determination in step S61 is that the shooting in progress flag (SHD_Flg) is 0, namely that there is live view, normal touch processing is performed (S63). In this case, processing is executed based on the type of touch and position of touch etc., based on detection signals from the touch panel 113. Once normal touch processing has been performed, the originating flow is returned to.

On the other hand, if the result of determination in step S61 is that the shooting in progress flag (SHD_Flg) is 1, namely that live composite shooting is in progress, it is next determined whether or not a checkbox has been touched (S65). At the time of live composite shooting, combined images are generated using a combination method that has been set by the photographer (relatively bright combination, relatively dark combination, additive combination, additive averaging combination). Finally generated combined images are stored in the external memory 115, but there may be cases where combined images generated before that are images that are more in line with what the photographer intends. With this embodiment therefore, trace back combined images are stored in the memory 103 (refer to FIG. 12 and to S241 in FIG. 13A), and trace back combined images to which the photographer has assigned a check-mark (displayed on the sub-screens shown in FIG. 5C) are also stored in the external memory 115 (refer to S415 and S421 in FIG. 25A).

These check boxes will be described using FIG. 5C and FIG. 5D. At the time that a temporary stop has been issued during live composite shooting mode, or at the time of completion of live composite shooting, combined images during live composite shooting are displayed. That is, a background image 114a is displayed in a large size on the display section 114, and combined images are displayed on sub screens on the right side of this background image. Specifically, the background image 114a is a combined image that was generated by combination processing using image data that was acquired by means of live composite shooting. Sub screens 114b1 to 114b4 are displayed on the right side of this background image 114a, and trace back combined images are displayed on the sub screens. Further, checkboxes 114c1 to 114c4 are respectively displayed in the lower right corners of each sub screen. Also, a scroll icon 114d, is displayed at the bottom of the sub screen 114b1, and an icon for retrieval display 114e is displayed substantially in the middle of the column of sub screens. Further, a stop icon 114f, a save and exit icon 114g, a save icon 114h, and a resume icon 114j are displayed below the background image 114a.

In step S65 it is determined whether or not any of the checkboxes 114c1 to 114c4 have been touched. If the result of this determination is that a checkbox has been touched, display of the checkboxes is changed (S67). Here, the system control section 105 performs toggle switching of check display of those checkboxes, among the checkboxes 114c1 to 114c4, that have been touched. That is, if a check mark is displayed on a checkbox, display is changed to non-display of a check mark, while if a check mark is not displayed on a checkbox it is switched to display a check mark. It should be noted that for images that have had the checkbox checked, dark correction processing is performed (refer to S415 and S417 in FIG. 25A), as will be described later, and this image is stored in the external memory 115.

If display for the checkboxes has been changed in step S67, or if the result of determination in step S65 was that a check mark was not displayed on a checkbox, it is next determined whether or not a subscreen has been touched (S69). Here, the system control section 105 determines whether or not any of the subscreens 114b1 to 114b4 have been touched by the photographer, based on detection output from the touch panel 1131.

If the result of determination in step S69 is that a subscreen has been touched, there is a change to display to enable identification of an "subscreen" that has been touched (S71). Here, the system control section 105 changes a display method so that a subscreen that has been touched can be discriminated from another subscreen. With the example shown in FIG. 5C the subscreen 114b4 has been touched, and so the color of a border surrounding that subscreen is changed. Besides the color of the border, display may also be changed in order to enable identification, for example, color of the whole of the subscreen may be changed (for example, making the redness of the whole of the subscreen stronger), and flashing display may also be performed. If a subscreen has been touched, an image that has been touched is changed to a reference combined image. The camera of this embodiment has a reference combined image data change section that changes content of a combined images holding section.

The subscreens 114b1 to 114b4 display combined images being held in the combined images holding section (refer to the reference combined image data and the trace back combined image data 1 to N in FIG. 12, which will be described later) when live composite shooting is temporarily stopped, or at the time of shooting completion, as was described previously. Similarly to FIG. 5C, FIG. 5D shows one example of display on the display section 114 during live composite shooting. Display image 114A is an image that has been ruined by light of a vehicle's headlamps entering at the lower right of the image. If a combined image is generated using this type of image, there will be cases that result in a combined image that is not as the photographer intended. The photographer therefore looks at the subscreens 114b of the display screen 114B, and designates reference images used in combined images by means of touch operations (refer to S283 in FIG. 14). It is possible to generate combined images by removing images in which disturbances have occurred, by means of arbitrarily designated images before the disturbance occurred. This combination processing is performed during the combination processing in steps S233 to S237 in FIG. 13A. The camera of this embodiment has a saved content selection section (refer to S71 in FIG. 5A) that displays and selects content of the combined images holding section (refer to FIG. 12).

If the display of step S71 has been performed, or if the result of determination in step S69 is that a subscreen has not been touched, it is next determined whether or not a down arrow has been touched (S73). Here, the system control section 105 determines whether or not a scroll icon 114d, which is in the shape of a down arrow, has been touched by the photographer based on detection output from the touch panel 1131.

If the result of determination in step S73 is that the down arrow has been touched, the subscreens are scrolled (S75). Here, the system control section 105 perform scroll display of composite images (combined images) that are stored in the trace back combined image storage section (refer to the trace back combined images in FIG. 12). With the example shown in FIG. 5C four subscreens are being displayed. If five or more trace back combined images are stored, scroll display is performed by touching the scroll icon 114d. It should be noted that although only a downward scroll icon is described in FIG. 5C, when scroll down has been performed an upward scroll icon may also be displayed, so as to go back up.

If the scroll display of step S75 has been performed, or if the result of determination in step S73 is that the down arrow has not been touched, it is next determined whether or not a left arrow has been touched (S77). Here, the system control section 105 determines whether or not a retrieval display icon 114e, which is in the shape of a left arrow, has been touched by the photographer based on detection output from the touch panel 1131.

If the result of determination in step S77 is that the left arrow has been touched, the subscreens are shunted off the display screen (S79). The system control section 105 moves the subscreens 114b that had been displayed up to now off the display screen of the display section 114 (refer to the display section 114 shown in the left side of FIG. 5D). As a result of this operation the background image 114a is displayed on the entire screen. It should be noted that in a case where the subscreens are retracted from the display screen and a left arrow is then touched, the subscreens may be moved on to the display screen and icons for display may be displayed (refer to FIG. 5D).

If the subscreens have been retracted from the screen in step S79, or if the result of determination in step S77 is that the left arrow has not been touched, it is next determined whether or not stop has been touched (S81). Here, the system control section 105 determines whether or not a stop icon 114f has been touched by the photographer based on detection output from the touch panel 1131.

If the result of determination in step S81 is that the stop icon has been touched, a stop flag (DIS_Flg) is set to (S83). If, while composite shooting is in progress, the photographer wants to stop the shooting, they touch the stop icon 114f. The system control section 105 therefore sets the stop flag (DIS_Flg) to 1 in order to stop the shooting (refer to S169 in FIG. 8B).

If the result of determination in step S81 is that the stop icon has not been touched, it is next determined whether or not save and complete has been touched (S85). If, while the composite shooting is temporarily stopped, the photographer wishes to save the combined images that have been acquired as a result of this shooting and terminate the composite shooting, they touch the save and exit icon 114g. Here, the system control section 105 determines whether or not the save and exit icon 114g has been touched by the photographer based on detection output from the touch panel 1131.

If the result of determination in step S85 is that save and complete has been touched, or if the stop flag in (DIS_Flg) has been set to 1 in step S83, next the shooting completion instruction flag (SHI_Flg) is set to 1 (S87). If stop has been touched in step S81, and save and complete has been touched in step S85, shooting is terminated. In this step therefore, the system control section 105 sets the shooting completion instruction flag (SHI_Flg) to 1.

If the result of determination in step S85 is that the save and complete icon has not been touched, it is next determined whether or not resume has been touched (S89). In a case where the photographer has temporarily stopped shooting during composite shooting (refer to S47 and S49 in FIG. 4, and S167 in FIG. 8B), there may be cases where the photographer wishes to resume shooting. In this case, the photographer touches the resume icon 114j within the photographing screen. Here, the system control section 105 determines whether or not the resume icon 114j has been touched by the photographer based on detection output from the touch panel 1131.

If the result of determination in step S89 is that the resume icon has been touched, or if the shooting completion instruction flag (SHI_Flg) has been set to 1 in step S87, next, the temporary stop instruction flag (TSI_Flg) is reset to 0 (S95). In a case where the temporary stop instruction flag has been set to 1, if pausing of the live composite shooting is instructed, if the temporary stop instruction flag is set to 0 it means that this instruction will not be issued (refer to S165 in FIG. 8B, and S281 in FIG. 14). If the temporary stop instruction flag becomes 0 the live composite shooting is resumed.

If the result of determination in step S89 is that the resume icon has not been touched, it is next determined whether or not save has been touched (S91). In a case where the photographer wants to save images that have been combined in the composition shooting up to the current point in time in external memory (115 in FIG. 1b), they touch the save icon 114h. Here, the system control section 105 determines whether or not the save icon 114h has been touched by the photographer based on detection output from the touch panel 1131.

If the result of determination in step S91 is that save has been touched, the save flag (MI_Flg) is set to 1 (S93). Here, the system control section 105 sets the save flag (MI_Flg) to 1. If the save flag has been set to 1, then dark data acquisition after shooting determination, shooting for dark data acquisition after shooting processing, and dark correction storage processing (these processes are the same in FIG. 23A to FIG. 24B) are performed in step S279 of FIG. 14, which will be described later, and combined images for when shooting was temporarily stopped are saved in external memory 115.

If normal touch processing has been performed in step S63, or if the result of determination in step S91 is that save has not been touched, or if the save flag has been set to 1 in step S93, or if the temporary stop instruction flag has been set to 0 in step S95, this flow is terminated and the originating flow is returned to.

Next, operation of the live view display processing for live composite shooting in step S3 (refer to FIG. 3) will be described using the flowchart shown in FIG. 6. This flow performs normal live view display (refer to S101 will be described later), but in addition to this live view display it is also determined whether or not acquisition of dark data before shooting is required (refer to S103, which will be described later).

That is, with this embodiment, if the photographer presses the release button 113a fully (also called a 2nd release), acquisition of "(before) dark image data" (also referred to as "dark data before shooting")" is performed in response to this operation (refer, for example, to S141 and S143 in FIG. 8A). It should be noted that the "(before) dark image data" means dark image data that is acquired before performing composite shooting. If this (before) dark image data has been acquired, a live composite start permitted flag (LCPSA_Flg) becomes 1, and so-called live composite shooting is commenced in response to a second 2nd release after that (refer, for example, to S145 in FIG. 8A). That is, the live composite shooting is not commenced immediately in response to the first 2nd release, but (before) dark image data is acquired with the first 2nd release, and live composite shooting is commenced in response to a second 2nd release.

However, depending on conditions, at the time of the first 2nd release there may be cases where it is not necessary to acquire (before) dark image data, and there may be cases where dark image data that can be reused has already been acquired. In this type of situation the live composite shooting is performed immediately in response to the first 2nd release. In live view display processing for this live composite shooting, in step S103 it is determined whether acquisition of (before) dark image data is necessary.

It should be noted that acquisition of (before) dark image data is performed by shooting a number of exposure data DD (dark data) that is the reciprocal of a first frame rate (1/F1), after the image sensor 101b has been spieled by the mechanical shutter 101a, or by reusing reusable "dark image data" that was acquired previously.

Figure 6:
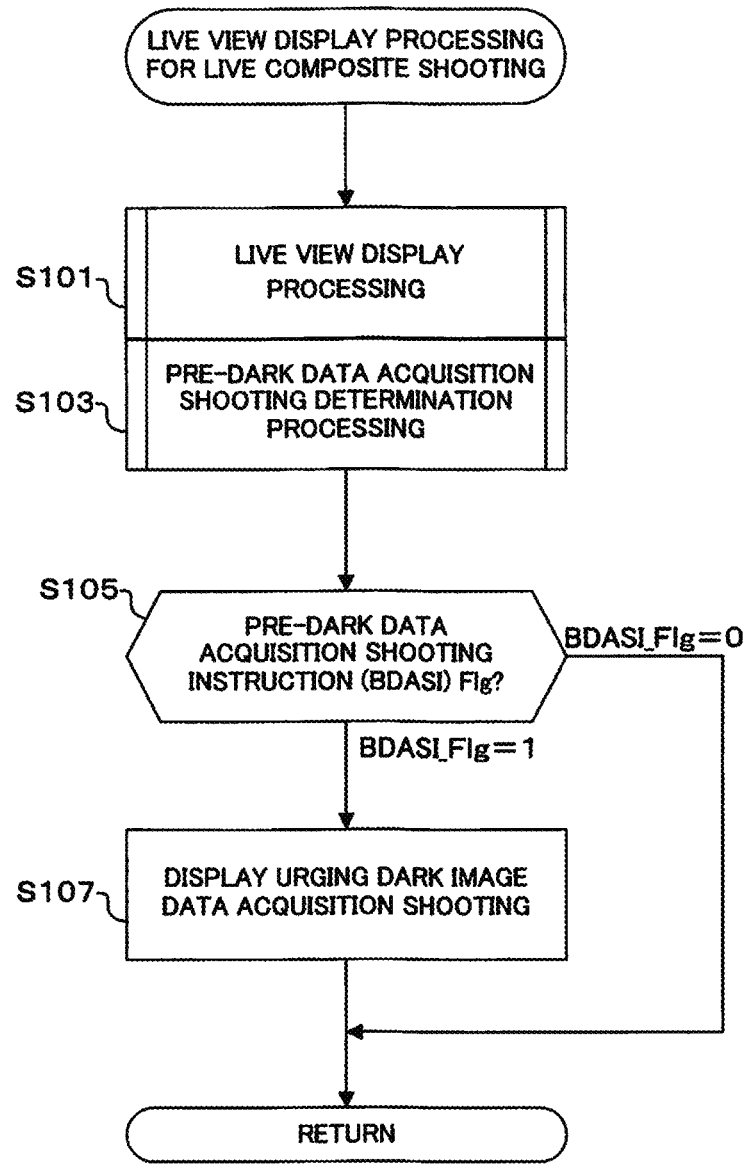
FIG. 6 is a flowchart showing operation for live view display processing for live composite shooting of the camera of one embodiment of the present invention.

If the live view display processing for live composite shooting of FIG. 6 has been commenced, first, live view display processing is performed (S101). Similarly to the normal live view display, this involves the system control section 105 acquiring image data from the image sensor 101b and performing live view display processing based on this image data that has been acquired. It should be noted that every time a time of a specified frame rate elapses, image data is acquired from the image sensor 101b and live view display is updated.

Once the live view display processing has been performed, next, dark data acquisition before shooting determination is performed (S103). As was described previously, at the time of a first 2nd release acquisition of (before) dark image data is performed, but in this step it is determined whether or not it is necessary to acquire the (before) dark image data before live composite shooting, during live view display (refer to S125 in FIG. 7B, which will be described later). If such acquisition is not necessary the "live composite shooting start permitted" flag (LCPSA_Flg) is set to 1 (refer to S139 in FIG. 7B), and this processing is escaped from. On the other hand, if acquisition of the dark image data before shooting is required it is determined whether or not there is reusable "dark image data" (refer to S131 in FIG. 7B), and if there is reusable "dark image data" then this is reused (refer to S133 in FIG. 7B), the "live composite shooting start permitted" flag (LCPSA_Flg) is set to 1, and this processing is escaped from. If there is not reusable "dark image data", then the "pre-dark data acquisition shooting instruction" flag (BDASI_Flg) is set to 1 (refer to S135 in FIG. 7B), and this processing is escaped from. Detailed operation of this dark data acquisition before shooting determination will be described later using FIG. 7A and FIG. 7B.

Once the dark data acquisition before shooting determination has been performed, then next the pre-dark data acquisition shooting instruction flag (BDASI_Flg) is determined (S105). As was described previously, in the dark data acquisition before shooting determination processing it is determined whether or not acquisition of (before) dark image data is required (S125 in FIG. 7B, and if the result of determination is that this acquisition is required, and further if dark data cannot be reused (refer to S127 and S131 in FIG. 7B), then the pre-dark data acquisition shooting instruction flag (BDASI_Flg) is set to 1 (refer to S135 in FIG. 7B). In this step, the system control section 105 performs determination based on the pre-dark data acquisition shooting instruction flag (BDASI_Flg) that is stored in memory.

If the result of determination in step S105 is that the pre-dark data acquisition shooting instruction flag (BDASI_Flg) has been set to 1, next, display to urge dark image data acquisition shooting is performed (S107). Here, the system control section 105 performs display to urge acquisition of dark image data on the display section 114, for example, display such as "Images for noise reduction will be acquired if the shutter button is pressed.".

Once display has been performed in step S107, or if the result of determination in step S105 was that the pre-dark data acquisition shooting instruction flag (BDASI_Flg) was set to 0, the flow for live composite shooting live view display processing is terminated and the previous flow is returned to.

Next, operation of the dark data acquisition before shooting determination processing of step S103 (refer to FIG. 6) will be described using the flowcharts shown in FIG. 7A and FIG. 7B. As was described previously, "dark data acquisition before shooting determination processing" is a preparation processing routine at a step before commencing "live composite shooting". In this "dark data acquisition before shooting determination processing" it is determined whether or not acquisition of dark data before shooting is necessary.

If the flow for dark data acquisition before shooting determination processing is commenced, first, camera shake amount BRE is acquired (S111). Here, the system control section 105 acquires camera shake detection amount BRE from the camera shake detection section 209 within the interchangeable lens 200 or the camera shake detection section 108 within the camera body 100.

Next, a readout frame rate F1 is acquired (S113). The readout frame rate F1 is the reciprocal of a time interval for the reading out image data for one frame from the image sensor 101b by the imaging drive control section 106. In the live composite shooting, image data is read out once in a few seconds to a few minutes or tens of minutes. The system control section 105 acquires a frame rate F1 that has been set, from the imaging drive control section 106. Next, gain (ISO sensitivity) G is acquired (S114). Gain (ISO sensitivity) G is the sum of sensitivity of the image sensor 101b at the time of exposure control, multiplication factor of an amplifier, and digital multiplication factor. The system control section 105 acquires gain G that has been set from the exposure control section 109.

Next, image sensor temperature T is acquired (S115). Image sensor temperature T is acquired based on measurement values that are temperature dependent, such as dark current of semiconductor elements in the vicinity of the image sensor 101b. It should be noted that a temperature measurement sensor may be arranged in the vicinity of the image sensor 101b and image sensor temperature T measured in this way.

If image sensor temperature T has been acquired, then next a composite type is determined (S117). With this embodiment there are four types of image combination, namely "relatively bright combination", "relatively dark combination", "additive combination", and "additive averaging combination". Relatively bright combination is image combination in which for two image data, pixel values for corresponding pixel positions are compared, and a pixel value set to the brightest value. Also, relatively dark combination is image combination in which for two image data, pixel values for corresponding pixel positions are compared, and pixel value is set to the darkest value. Additive combination is image combination in which for two image data, pixel values for corresponding pixel positions are added, and a pixel value for that pixel position is made this added value. Additive averaging combination is image combination in which for two image data, an additive average value is calculated for pixel values for corresponding pixel positions, and pixel value for that pixel position is made this additive average value.

These composite types can be set by the photographer on menu screens. In step S117 the system control section 105 performs determination based on a composite type that has been set by the photographer.

If the result of determination in step S117 is that the composite type is relatively bright combination or relatively dark combination, next, TIME=1/F1 is set (S119). As was described previously, F1 is frame rate, and the reciprocal of the frame rate corresponds to an exposure time for a single frame. In this step the system control section 105 sets the reciprocal of the frame rate in TIME.

Next, DD_TIME=Fn1 (G,T) is set (S121). A determined reference time DD_TIME is the time required for dark data acquisition, and is the readout frame rate time of the image sensor 101b. Frame rate time DD_TIME is calculated from gain (ISO sensitivity) G and image sensor temperature T. A function Fn1 (G, T) results in DD_TIME being a small value as gain (ISO sensitivity) G becomes high and as image sensor temperature T becomes high.

Next, dark image data correction mode is determined (S123). The photographer sets the dark image data correction mode on a menu screen. There are three types of dark image data correction mode, mainly auto mode which is performed automatically in a case where it is necessary to perform dark image data correction, off mode in which dark image data correction is not performed, and on mode in which dark image data correction is performed normally. The system control section 105 performs determination based on a mode that is been set on a menu screen.

If the result of determination in step S123 is that it is auto mode, is next determined whether or not it is necessary to acquire dark image data (S125). Here, the system control section 105 uses TIME that was calculated in step S119 and DD_TIME that was calculated in step S121 to determine that acquisition of dark image data is not necessary if a reciprocal TIME of the readout frame rate is less that DD_TIME, namely if TIME is a shorter time than DD_TIME.

The processing in step S125 functions as a dark image data correction prohibiting section that prohibits acquisition operations for first dark image data. It should be noted that prohibition judgment by this prohibiting section is not limited to the processing in step S125, and in the event that a standby state has been detected by shake detection, then it may be judged that it is not long exposure shooting, temperature change of the image sensor is also small, and acquisition of a dark frame prohibited.

If the result of determination in step S125 is that it has been judged that acquisition of dark data is necessary, or if the result of determination in step S123 is that the dark image data correction mode is on mode, next, the pre-dark data usage flag (BDDU_Flg) is set to 1 (S127). If this before dark data usage flag is 1, it indicates that dark data before shooting is required in the case of dark correction of combined image data.

On the other hand, if it is been determined in step S125 data acquisition of dark data is not necessary, or if it has been determined in step S123 that the dark image data correction mode is off mode, or if it was determined in step S117 that the composite type was additive combination or additive averaging combination, the pre-dark data usage flag (BDDU_Flg) is set to 0 (S129). If this before dark data usage flag is 0, it indicates that dark data before shooting is not required in the case of dark correction of combined image data.

If the pre-dark data usage flag (BDDU_Flg) is set to 1 in step S127, it is determined whether or not dark data can be used again (S131). Here, the system control section 105 judges that dark data is for reuse if the current settings are the same readout frame rate F1 for previous dark data, and that the image sensor temperature T and gain (ISO sensitivity) G are substantially the same.

It should be noted that at its simplest, judgment as to whether or not dark data is suitable for reuse may be comparison of acquisition time for the previous dark data, and judging that the dark data can be reused if a predetermined time has not yet elapsed (refer, for example, to FIG. 26A and FIG. 26B). Also, even if F1, T and G are the same, for reliability, the previous dark data acquisition time may be compared, and the dark data judged as unsuitable for reuse if a predetermined time has elapsed.

If the result of determination in step S131 is that the dark data can be reused, current dark data is replaced by the previous DD (dark data) for reuse (S133). If this DD replacement has been performed, or if the pre-dark data usage flag (BDDU_Flg) has been set to 0 in step S129, next, a live composite start permitted flag (LCPSA_Flg) is set to 1 (S139). If the live composite start permitted flag is 1, commencement of live composite shooting in response to 2nd release is permitted.

If the result of determination in step S131 is the reuse of the dark data is inappropriate, then next the pre-dark data acquisition shooting instruction flag (BDASI_Flg) is set to 1 (S135). The dark data acquisition before shooting instruction flag is a flag for instructing shooting for dark data acquisition before shooting. If this flag is 1, then at the time of live view display, display urging shooting for the purpose of dark data acquisition before shooting is performed in previously described steps S105 and S107 (refer to FIG. 6). Also, in the case of live composite shooting, before dark acquisition shooting processing is performed in steps S141 and S143, which will be described later.

Next, the live composite start permitted flag (LCPSA_Flg) is set to 0 (S137). If the live composite start permitted flag is 0, commencement of live composite shooting in response to 2nd release is permitted.

If the live composite start permitted flag (LCPSA_Flg) has been set to 1 or 0 in steps S137 or S139, the flow for dark data acquisition before shooting determination processing is terminated and the originating flow is returned to.

In this way, the need for dark data acquisition before shooting depends on the "live composite type". Normally, in the case of "additive combination type" or "additive averaging combination type", it is sufficient to have dark data after shooting, and so dark data before shooting is not necessary. On the other hand, the case of "relatively bright combination" or "relatively dark combination", dark data before shooting is required together with dark data after shooting. Therefore, in the event that it has been judged that the composite type is additive combination or additive averaging combination, the before dark data usage flag is set to 0 (refer to S129), while in the case of relatively bright combination or relatively dark combination, if specified conditions have been satisfied in steps S123 and after, the before dark data usage flag is set to 1 (refer to S127).

Further, the need for dark data acquisition before shooting is dependent on "dark image data acquisition mode" (refer to S123). In this flow, whether or not it is necessary to perform "dark processing" is checked from the "dark image data acquisition mode", and whether or not there is dark data before shooting that can be reused, and whether or not to perform "shooting for dark data acquisition before shooting" are judged. There are three types of "dark image data acquisition mode" (refer to S123). These three types are, specifically, (1) off mode (dark image data is never acquired), (2) on mode (dark image data is always acquired), and (3) auto mode (dark image data is acquired as required).

Further, "dark data acquisition before shooting determination processing" determines whether or not it is necessary to acquire dark data before shooting (refer to S125). If the result of this determination is that dark data acquisition is not required, the live composite shooting start permitted flag is set to 1, and this processing is escaped from (refer to S139). On the other hand, if dark data acquisition is required it is determined whether or not there is dark image data that can be reused (refer to S131), with this reusable dark image data being used if it exists, the live composite shooting start permitted flag set to 1, and then this processing escaped from (refer to S133 and S139). If there is not dark image data that can be reused, the dark data acquisition before shooting instruction flag is set to 1 and this processing is escaped from (refer to S135 and S137).

Next, operation of the live composite shooting processing in step S17 (refer to FIG. 3) will be described using the flowcharts shown in FIG. 8A and FIG. 8B. As was described previously the photographer observes the live view display, and if the composition and shutter timing are as the photographer intends the release button 113a is pressed down fully resulting in 2nd release. At this time, if live composite mode has been set the flow for this live composite shooting processing is executed.

If the flow for live composite shooting processing is commenced, first, determination of the pre-dark data acquisition shooting instruction flag (BDASI_Flg) is performed (S141). If the dark data acquisition before shooting instruction flag is set to 1, shooting for the purpose of acquiring dark data before shooting is instructed (refer to S105 in FIG. 6, and S135 in FIG. 7B). If it has been determined in the dark data acquisition before shooting determination during live view display that acquisition of dark data before shooting is necessary, this flag is set to 1, while if it is determined to be not necessary this flag is set to 0. Also, as will be described later, if dark data before shooting is acquired in the before dark acquisition shooting processing (refer to S143), this flag is set to 0 (refer to S209 in FIG. 9). In this step S141, the system control section 105 performs determination based on the dark data acquisition before shooting instruction flag.

If the result of determination in step S141 is that the dark data acquisition before shooting instruction flag is 1, shooting processing for acquisition of dark data before shooting is performed (S143). Here, the system control section 105 executes processing for the purpose of acquiring dark data before shooting before commencing live composite shooting. If before dark acquisition shooting processing has been performed, the dark data acquisition before shooting instruction flag becomes 0 (refer to S209 in FIG. 9), and then the next time step S143 will be skipped at the time of the determination in step S141. Also, if before dark acquisition shooting processing is performed the live composite start permitted flag becomes 0 (refer to S211 in FIG. 9), and the result of determination in step S145 will result in the live composite shooting processing being escaped from. That is, with the initial occurrence of 2nd release only before dark acquisition shooting processing is performed. Detailed operation of this before dark acquisition shooting processing will be described later using FIG. 9.

If before dark acquisition shooting processing has been performed in step S143, or if the result of determination in step S141 was that the dark data acquisition before shooting instruction flag was 0, the live composite shooting permitted flag (LCPSA_Flg) is next determined (S145). In the event that the live composite shooting permitted flag is set to 1, it is permitted to commence live composite shooting in response to a 2nd release. On the other hand, if the live composite shooting permitted flag is set to 0 the result of determination in step S145 is that this live composite shooting processing is escape from, and the live view display loop is returned to. This flag is set to 1 in previously described step S139, and set to 0 in S137. Also, this flag is set to 0 in step S211 during before dark acquisition shooting processing. Accordingly, if the result of determination in step S145 is that the flag 0 is, this live composite shooting processing is escaped from, and if flag is set to 1 in step S139 during dark data acquisition before shooting determination processing (refer to FIG. 7A and FIG. 7B) within the flow for live view display step S145 is returned to again, and the result of determination will be to advance to steps S147 and after, and the live composite shooting is commenced. That is, with the initial 2nd release only before dark acquisition shooting processing is performed, and at the time of the next 2nd release live composite shooting is commenced.

If the result of determination in step S145 is that the live composite shooting permitted flag (LCPSA_Flg) is 1, live composite exposure is commenced (S147). Here, the system control section 105 commences exposure for live composite using the image sensor 101*b*.

Next, the shooting in progress flag (SHD_Flg) is set to 1 (S147). This flag indicates that live composite shooting is in progress. Next, READ is reset to 0, and K is reset to 1 (S151). READ is a counter that counts the number of times that image data has been read out from the image sensor 101*b*, and K is an trace back combined image counter.

Next, operation member processing is performed (S153). Operation of this operation member processing is the same as the flowchart shown in FIG. 4. It should be noted that 2nd release is normally a shooting commencement trigger, but in this operation member processing a shooting completion trigger is output in response to shooting in progress flag=1 and 2nd=ON. Specifically, shooting completion instruction flag (SHI_Flg)=1 is set.

Next, detection processing for disturbance due to camera shake is performed (S155). Here, when outputs of camera shake sensors (angular velocity sensor, acceleration sensor, angle sensor etc.) that are mounted within the camera shake detection section 108 of the camera body 100 and the camera shake detection section 209 of the interchangeable lens 200 are greater than predetermined values, the system control section 105 determines that a disturbance has occurred and sets the automatic stop instruction flag (ASI_Flg) to 1. It should be noted that automatic stop is determined even within readout processing and during combination processing.

Next, determination processing for the first frame rate is performed (S157). With this embodiment combined images are stored in memory at predetermined time intervals (refer to trace back combined image data 1 to N in FIG. 12, and to FIG. 13C), and the photographer can browse combined image that have been stored in memory. The second frame rate is a predetermined time interval for storing reference images that have been generated by combination processing (refer to S261 in FIG. 13C). The second frame rate is lower than the first frame rate. Also, the second frame rate may be changed based on the first frame rate, and may be changed based on lapse of exposure time. Also, the second frame rate is restricted to an optimum frame range from the viewpoint of disturbance elimination responsiveness, in a time required for a single memory cycle for storage in the memory 103, and in a time between reference combined images. Determination of this second frame rate will described later using FIG. 10 to FIG. 11B.

Once the second frame rate has been determined, readout processing is next performed (S159). Here, the system control section 105 reads out image data of the image sensor 101*b* and performs image combination in accordance with the live composite mode that has been set. Automatic stop judgment is also performed during live composite shooting. Detailed operation of this readout processing will be described later using FIG. 13A.

If readout processing has been performed, next the automatic stop instruction flag (ASI_Flg) is determined (S161). The automatic stop instruction flag is only valid when the automatic stop effective flag is 1. The automatic stop effective flag is changed in the manner of a toggle switch by pressing down automatic stop effective button 113*j*. That is, every time the automatic stop effective button 113*j* is press down the automatic stop effective flag (ASI_Flg) is alternately switched between 1 and 0.

If the result of determination in step S161 is that the automatic stop instruction flag (ASI_Flg) is 1, automatic stop processing is performed (S163). If the automatic stop effective flag (ASE_Flg) is not valid (if ASE_Flg=0), this processing is escaped from without performing any of the automatic stop processing. On the other hand, if the automatic stop effective flag is valid (if ASE_Flg=1), automatic stop processing is performed in accordance with the automatic stop that was set using a menu. That is, if the automatic stop type is OFF automatic stop is not performed, if it is ON 1 type automatic temporary stop is performed, and if it is ON 2 type shooting is automatically terminated. In the case of performing flash shooting temporarily during live composite shooting, this flag may be left as invalid depending on the automatic stop effective button 113*j*.

If automatic stop processing has been performed in S163, or if the result of determination in step S161 is that the automatic stop instruction flag is 0, determination of the temporary stop instruction flag (TSI_Flg) is performed (S165). If the photographer wants to temporarily stop shooting while live composite shooting is in progress, the temporary stop button 113*k* is operated. At this time the temporary stop instruction flag (TSI_Flg) is set to 1 (refer to S47 and S49 in FIG. 4). The system control section 105 performs determination based on this flag. If the temporary stop instruction flag is 1, post processing for live composite shooting is performed, and if this flag is 0 the temporary stop processing is not performed.

If the result of determination in step S165 is that the temporary stop instruction flag (TSI_Flg) is 1, temporary stop processing is performed (S167). While temporarily stopped, imaging operation by the image sensor 101*b* continues, but a reference image at this time is not updated. Detailed operation of this temporary stop processing will be described later using FIG. 14.

If the temporary stop processing has been performed in step S167, next the stop flag (DIS_Flg) is determined (S169). If the stop icon 114*f* that has been displayed on the display screen during live composite shooting is touched, the stop flag (DIS_Flg) is set to 1 (refer to S81 and S83 in FIG. 5B, and to FIG. 5C). Here, the system control section 105 performs determination based on this flag.

If the result of determination in step S169 is that the stop flag (DIS_Flg) is set to 1, the stop flag (DIS_Flg) is set to 0 (S183).

If the result of determination in step S169 is that the stop flag (DIS_Flg) is 0, or if the result of determination in step S165 is that the temporary stop instruction flag (TSI_Flg) is 0, next, time lapse movie generation processing is performed (S171). A time lapse movie is a movie in which images that have been taken one frame at a time over the course of a few seconds (or sometimes a few minutes) are strung together and played back. Accordingly, here, images are acquired at predetermined time intervals, and a movie is created.

If creation processing for a time-lapse movie has been performed, next the shooting completion instruction flag (SHI_Flg) is determined (S173). The shooting completion instruction flag (SHI_Flg) is a flag for instructing completion of live composite shooting. This flag is set to 1 in the event that the save and complete icon of FIG. 5C has been touched (refer to S85 and S87 in FIG. 5B), and in processing such as automatic stop processing etc. If the result of this determination is that the flag is 0, processing returns to step S153.

On the other hand if the shooting completion instruction flag (SHI_Flg) is 1, live composite exposure is completed (S175). After that, the image sensor 101b does not perform readout of image data for the purpose of generating combined images, and post processing for creating combined images is performed.

Next, dark data acquisition after shooting determination processing is performed (S177). Dark data acquisition after shooting determination processing determines whether or not it is necessary to acquire dark data after shooting. Detailed operation of this dark data acquisition after shooting determination processing will be described later using FIG. 23A and FIG. 23B.

Next, shooting for dark data acquisition after shooting processing is performed (S179). The shooting for dark data acquisition after shooting processing is a shooting processing routine that is performed before completing live composite shooting. Detailed operation of this shooting for dark data acquisition after shooting processing will be described later using FIG. 24A and FIG. 24B.

Next, dark correction, and storage processing, are performed (S181). Dark correction is correction of combined image data that is performed using dark image data. Storage processing is processing to store this combined image data that has been corrected in the external memory 115. Detailed operation of this dark correction and storage processing will be described later using FIG. 25A and FIG. 25B.

If dark correction and shooting processing has been performed in step S181, or if the stop flag has been set to 0 in step S183, next, the shooting in progress flag (SHD_Flg) is set to 0 (S185), and the shooting completion instruction flag (SHI_Flg) is set to 0 (S187). As a result, live composite shooting processing is terminated and the originating flow is returned to.

In this way, with live composite shooting processing, either before dark acquisition shooting processing (S143), or processing for exposure commencement for live composite shooting, and after (S145 onwards), are performed. In the event that live composite shooting is relatively bright combination or relatively dark combination, normally, if 2nd=ON for the first time, the live composite start permitted flag (LCPSA_Flg)=0 (refer to S145), and the live view display loop is returned to again after the before dark acquisition shooting processing has been performed.

When 2nd=ON the second time, then if commencement conditions of (1) the live composite start permitted flag (LCPSA_Flg)=1 and (2) 2nd=ON the second time, even after "dark data acquisition before shooting" has been acquired, are complete, exposure of live composite shooting is commenced a first time (refer to S145).

If the live composite shooting is additive combination or additive averaging combination, then exposure for live composite shooting is commenced in response to 2nd=1 the first time.

Next, operation of the before dark acquisition shooting processing of step S143 (refer to FIG. 8A) will be described using the flowchart shown in FIG. 9. As was described previously, before dark acquisition shooting processing is a preparation processing routine at a step before commencing "live composite shooting". Here, after the image sensor 101b has been shielded, exposure data numbering the reciprocal of the readout frame rate are acquired, and stored as dark image data.

If the before dark acquisition shooting processing shown in FIG. 9 is commenced, first the fact that dark data acquisition before shooting has commenced is displayed (S191). Here, the system control section 105 displays the fact that dark data acquisition before shooting has commenced on the display screen of the display section 114. As this display, text display such as "Acquisition of images for noise reduction in progress. Please wait." etc. is performed. Suitable icons and pictographs etc. may also be used.

Next, the image sensor is shielded by the mechanical shutter (S193). Here, the system control section 105 performs control so that there is no subject light incident on the image sensor 101b, by closing the mechanical shutter 101a.

Next, exposure data DD (dark data) numbering 1/F1 are acquired (S195). As was described previously, F1 is frame rate, and 1/F1 is exposure time for one frame. The image sensor 101b is shielded for a time of 1/F by the mechanical shutter 101a, and data that has been accumulated in the image sensor 101b, namely dark data DD, while the image sensor 101b is being shielded is acquired.

Next, image sensor temperature T is acquired (S197). Here, similarly to S115 (refer to FIG. 7A), the system control section 105 acquires temperature of elements of the image sensor 101b or surrounding temperature. Next, gain (ISO sensitivity) G is acquired (S199). Here, similarly to step S114 (refer to FIG. 7A), the system control section 105 acquires gain (ISO sensitivity). Next, current time T1 is acquired (S201). Here, the system control section 105 acquires current time T1 using a clock section within the system control section 105.

Next, dark data DD is stored in ADR_DD1 of memory together with current time T1, image sensor temperature T, frame rate F1, gain G, and type of composite shooting (S203). Various image data is stored in the memory 103, as shown in FIG. 12. In step S203 data that was acquired in steps S195 to S201 is stored in the memory 103.

If data has been stored in memory in step S203, shielding by the mechanical shutter is released (S205). Here, the system control section 105 opens the mechanical shutter 101a that was closed in step S193, and releases shielding of the image sensor 101b.

Next, the fact that live composite shooting has become possible is displayed (S207). Since dark data etc. is acquired and live composite shooting becomes possible, the system control section 105 displays this fact on the display section 114. For example, "Preparation for composite shooting is complete." etc. is displayed.

Next, the pre-dark data acquisition shooting instruction flag (BDASI_Flg) is set to 0 (S209), and the live composite start permitted flag (LCPSA_Flg) is set to 0 (S211). Since it is the initial time that shooting for dark data acquisition before shooting has been executed, dark data acquisition before shooting instruction flag=0, live composite start permitted flag=0, and dark data before shooting usage flag=1 are set. If these flags have been set, the flow for before dark acquisition shooting processing is completed, and processing returns to the live view display loop.

It should be noted that before dark acquisition shooting processing (acquisition of (before) dark image data and first dark image data acquisition) is not limited to being performed during live composite shooting processing, and may also be performed at other times. For example, before shooting this data may be automatically acquired whenever possible in circumstances such as (1) during menu display, (2) during playback (Quickview), (3) during connection processing with an external unit (USB connection Wi-Fi connection etc.), (4) during card replacement, (5) during sleep etc.

Also, although the dark image data is normally stored in the buffer memory through the process of live composite shooting, shooting data may be stored on a card for each of the parameters of camera ID, ISO, temperature, shutter speed, and a database constructed. In this case, it is preferable to store the data in a protected region so as to prevent accidental deletion. Determination as to whether or not to reuse such a database may also be performed by the prohibition section, based on degree of coincidence of camera ID, temperature, and combinations of ISO and shutter speed. Permissible level for degree of coincidence may be changed to be a narrow range for higher temperature, and a wide range for lower temperature. Also, whether or not to reuse the database for the current settings may be displayed as guidance.

Next, a relationship between the first frame rate and the second frame rate will be described using FIG. 10. In FIG. 10, time T11 is the time at which an instruction to commence live composite shooting has been issued, and is a second release timing where before dark acquisition shooting processing (acquisition of (before) dark image data, first dark image data acquisition) is performed. For convenience of description, the next 2nd release is performed, and exposure for live composite shooting is commenced. Time T12 is the time at which the next 2nd release after that is performed, and an instruction to complete live composite shooting has been issued. If an instruction to commence live composite shooting is issued, acquisition of dark image data is performed (refer to S143 in FIG. 8A), and after that image data for live composite is read out, and combination processing is performed (refer to S147 and S159 in FIG. 8A).

In FIG. 10, "Dk1" represents readout of dark data 1, and "Dk2" represents readout of dark data 2, "Rd1, Rd2, . . . , RdN" represents readout of image data (refer to S223 in FIG. 13A), "Sy" represents combination processing (refer to S231 to S237 in FIG. 13A), and "-" represents dark correction processing (subtracting dark image data from combined image data). Also, "St1, St2, . . . , Stm" represent storage of trace back combined images (cyclic storage) (refer to S241 in FIG. 13A), and "Dp1, Dp2, . . . DpN" represent display on the display section 114 (refer to S239 in FIG. 13A). Here, dark correction processing (calculation of dark image data from combined image data) is performed in "St1, St2, . . . , Stm" and "Dp1, Dp2, . . . , DpN" during live composite shooting, but dark correction processing may be omitted. In particular, only storage of "Sy" before dark correction processing may be performed in "St1, St2, . . . , Stm" during live composite shooting.

Readout of image data from the image sensor 101*b* is performed at the first frame rate, as shown in FIG. 10. Storage of trace back combined images is performed at a second frame rate that is smaller than the first frame rate, that is, the relationship "second frame rate"≤"first frame rate" exists. In other words, the second frame rate is lower than the first frame rate.

Next, a first example of determination of the second frame rate in step S157 will be described using FIG. 11A. With this example, there is multiple integer relationship between the second frame rate and the first frame rate. The first frame rate is a frame rate for reading out image data from the image sensor 101*b* at the time of live composite shooting. This frame rate can be set by the photographer on a menu screen.

The second frame rate is a time interval for storing combined images, in order to perform trace back combined image storage. There is a limit on the memory capacity for storing trace back combined images. For this reason, if a specified interval is made short, a time tracing back to trace back combination storage becomes short, and if the specified interval becomes long, trace back combination storage will become irregular and cases will arise where combined images the photographer wants cannot be stored immediately before the occurrence of a disturbance. The second frame rate for performing trace back combination storage may therefore be set to take into consideration the circumstances.

With the first example of second frame rate determination, the second frame rate is determined based on the first frame rate. With this determination processing, the readout frame rate F1 is acquired, and the second frame rate F2 is acquired from table data based on this readout frame rate F1.

Figure 11A:
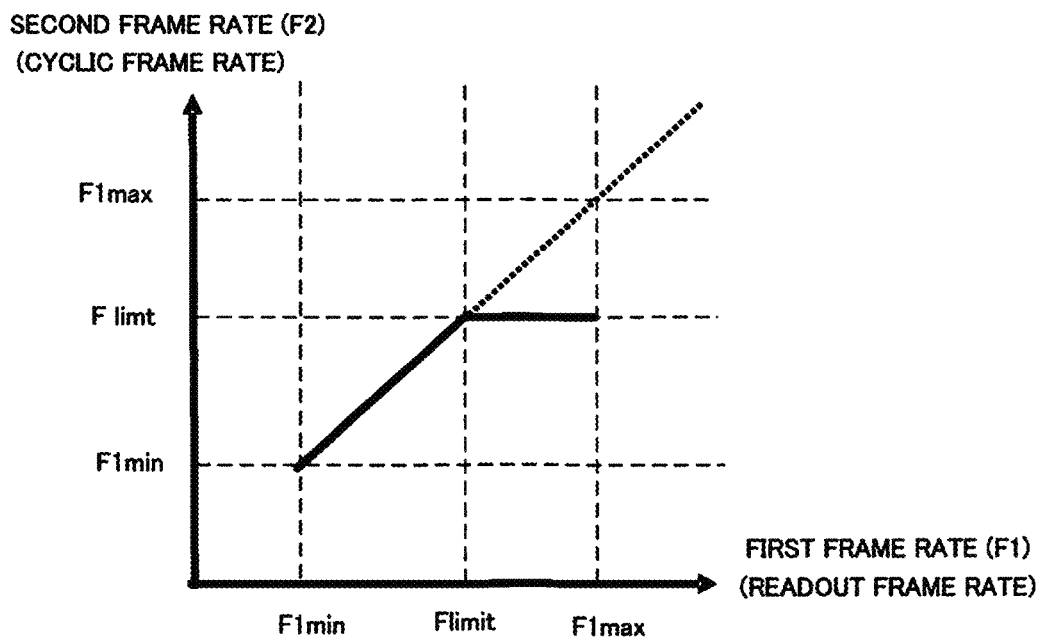
FIG. 11A and FIG. 11B are graphs showing a relationship between the first frame rate and the second frame rate, in the camera of one embodiment of the present invention.

A graph of the above described table data is shown in FIG. 11A. With this table data, if the second frame rate is fast then "number of buffers for tracing back"×(1/F2) is the optimum time that can be traced back. It is shown that the second frame rate is best clipped to several seconds such as 2 to 5 seconds. With the example shown in FIG. 11A for a first frame rate of Flimit the second frame rate becomes Flimit, and for a first frame rate of Flimit or greater also the second frame rate is made a constant value of Flimit. That is, in a case where the first frame rate is Flimit or less, the second frame rate is the same as the first frame rate, and so all combined images are stored as trace back combined images without thinning. However, if the first frame rate becomes greater than Flimit thinning is performed and those images that remain are stored as trace back combined images so that the second frame rate becomes Flimit.

Next, a second example of determination of the second frame rate in step S157 will be described using FIG. 11B. With this second example, the second frame rate is determined from exposure elapsed time of the live composite shooting. With this example, there is multiple integer relationship between the second frame rate and the first frame rate.

With this determination processing, first an exposure elapsed time ET is acquired, and second frame rate F2 is acquired from table data based on this exposure elapsed time ET. A graph based on the above described table data is shown in FIG. 11B. With this table data, if exposure elapsed time is within five seconds (the illustrated example), the second frame rate can take a value that is less than the first frame rate. If the exposure elapsed time exceeds five seconds then the second frame rate is restricted to a frame rate that is less than Flimit. Generally, as exposure time elapses retaking a picture becomes difficult. As a result, after exposure time has elapsed to a certain extent the second frame rate is restricted such that (number of buffers×value of second frame rate) can ensure trace back of about 2 to 5 seconds. On the other hand, if exposure time is a short time, fine trace back is more desirable. For this reason, up to a traceback time of 5 seconds, as elapsed time becomes shorter the second frame rate becomes a value closer to that of the first frame rate. In this way, the second frame rate is restricted so as to take a value in a range shown by the diagonal line section in FIG. 11B, as exposure time elapses.

In this manner, the second frame rate is restricted to an optimum frame rate range from the point of view of disturbance elimination responsiveness, in a time that is required for one cycle of a combining and saving section, and a time between each reference combined image. That is, the second frame rate is restricted to an optimal frame rate range from the view point of disturbance elimination responsiveness (optimum balance between trace back time and trace back time interval).

Next, a memory map of image data that is stored in the memory 103 at the time of readout processing (refer to S159 in FIG. 8A) is shown using FIG. 12. In FIG. 12, addresses within memory are shown on the left side, the image data in question is shown in the center, and supplementary description of the image data is given on the right side. As shown in FIG. 12, dark image data 1 is stored at address ADR_DD1. This dark image data 1 is image data of a dark image before shooting, and is image data that is acquired before live composite shooting (refer to S195 and S203 in FIG. 9). Dark image data 2 is stored at address ADR_DD2. This dark image data 2 is image data of a dark image after shooting, and is image data that is acquired after completion of live composite shooting (refer to S399 in FIG. 24B).

Dark image data 3 is stored at address ADR_DD3. This dark image data 3 is image data of a dark image immediately after temporary stop, and is image data that is acquired when there has been a temporary stop in live composite shooting (refer to S255 in FIG. 13B). Dark image data 4 is stored at address ADR_DD4. This dark image data 4 is image data of a temporarily stopped dark image after shooting, and is image data that is acquired, after there has been a temporary stop in live composite shooting, immediately before releasing this temporary stop (refer to S259 in FIG. 13B).

Read out image data is stored at address ADR_READ. This read out image data is image data that has been read out from the image sensor 101b every time a time corresponding to the first frame rate elapses at the time of live composite shooting (refer to S223 in FIG. 13A). Data is updated each time image data is read out from the image sensor 101b.

Reference combined image data is stored at address ADR_KIJUN. If the image processing section 104 performs image combination for live composite (refer to S233, S235, and S237 in FIG. 13A), this combined image data is stored as reference combined image data. As image combination for live composite, there are relatively bright combination, relatively dark combination, additive combination, and additive averaging combination.

Trace back combined image data 1 to N are stored in addresses ADR_KIJUN+DV, ADR_KIJUN+DV×2, ADR_KIJUN+DV×3, . . . , ADR_KIJUN+DV×N. Every time new reference combined image data is generated, the previous reference combined image data is moved to the trace back combined image data. By storing the previous reference combined image data, it is possible for the photographer to confirm trace back combined images. As trace back combined image data, in normal storage processing, N items of trace back combined image data are stored in buffer memory, because storage processing (read write processing) takes time. Provided storage processing does not take up much time, storage may be to external memory, without using buffer memory.

Next, operation of the readout processing of step S159 (refer to FIG. 8A) will be described using the flowchart shown in FIG. 13A. As was described previously, in the readout processing image data is read out from the image sensor 101b, and image combination is performed in accordance with a live composite mode that has been set.

If the flow for readout processing commences operation, it is first determined whether or not a predetermined time has elapsed based on the first frame rate (S221). The first frame rate is a readout period at the time of reading out image data from the image sensor 101b when performing live composite shooting. The system control section 105 escapes from the readout processing and returns to the originating flow in the event that a predetermined time based on the first frame rate has not elapsed.

On the other hand, if the result of determination in step S221 is that the predetermined time based on the first frame rate has elapsed, image readout is performed (S223). Here, the imaging drive control section 106 performs readout of image data from the image sensor 101b.

Next, the temporary stop instruction flag (TSI_Flg) is determined (S225). The temporary stop instruction flag is a flag for instructing to temporary stop the live composite shooting, and the temporary stop instruction flag is set to 1 if the photographer operates the temporary stop button 113k (refer to S47 and S49 in FIG. 4). Here, the system control section 105 performs determination based on the temporary stop instruction flag (TSI_Flg).

If the result of determination in step S225 is that the temporary stop instruction flag (TSI_Flg) was 1, namely that temporary stop has been instructed, while temporarily stopped storage processing is performed (S227). If a temporary stop instruction has been issued, the live composite shooting is temporarily stopped. At this time the system control section 105 stores dark data DD for immediately after temporary stop etc., and also acquires dark data DD etc. after that. Detailed operation of this while temporarily stopped storage processing will be described later using FIG. 13B. If the while temporarily stopped storage processing has been performed, the readout processing is terminated and the originating flow is returned to.

If the result of determination in step S225 is that the temporary stop instruction flag (TSI_Flg) was 0, namely that temporary stop has not been instructed, calculation of READN=READN+1 is performed (S229). READN is a counter for counting the number of times image readout has been performed, and is reset to 0 in step S151 (refer to FIG. 8A). In this step READN is incremented.

The composition type is then determined (S231). As was described previously, with this embodiment four types of image combination are available, namely relatively bright combination, relatively dark combination, additive combination, and additive averaging combination, and the photographer can set any of these types of image combination on a menu screen. In this step the system control section 105 performs determination based on the type of image combination that has been set on the menu screen.

If the result of determination in step S231 is relatively bright combination, relatively bright combination processing is performed (S233). Relatively bright combination involves comparison of associated pixel data for corresponding pixel positions in image data that has been newly read out and image data of a reference image, and replacing with the brighter pixel data. This processing is sequentially repeated for every pixel, and once processing has been performed for all pixels relatively bright combination image data is generated.

If the result of determination in step S231 is relatively dark combination, relatively dark combination processing is performed (S235). Relatively dark combination involves comparison of associated pixel data for corresponding pixel positions in image data that has been newly read out and image data of a reference image, and replacing with the darker pixel data. This processing is sequentially repeated for every pixel, and once processing has been performed for all pixels relatively dark combination image data is generated.

It should be noted that for relatively dark combination also, the number of cases where pixel data of a reference combined image has been replaced is counted, and if this count value exceeds a predetermined value the automatic stop instruction flag (ASI_Flg) is set to 1. If the number of replacements is high it can be considered that a disturbance has occurred, and so live composite shooting may be stopped.

If the result of determination in step S231 is additive combination or additive averaging combination, additive and additive averaging combination processing is performed (S237). Here, it is first determined whether the type of image combination is additive combination or additive averaging combination. If the result of this determination is additive combination, associated pixel data for corresponding pixel positions in image data of a reference image and a newly read out image are added, and image data of the reference image is replaced with this added value. This processing is sequentially repeated for every pixel, and once processing has been performed for all pixels additively combined image data is generated.

In the event that the image combination type is additive averaging combination, the reference combined image is multiplied by READN, and newly read out image data is added to this reference image. Once additive combination has been performed for all pixels, 1 is added to READN and additive averaging image data is generated by dividing the reference combined image data by READN to which 1 has been added. It should be noted that these sequences of processes are performed for every pixel.

It should be noted that in a case where a disturbance (for example, lights of a vehicle etc.) occurs during live composite shooting and the photographer does not want to use this image at the time of image combination, live composite shooting is temporarily stopped, as was described previously (refer, for example, to S47 and S49 in FIG. 4). In this case, since an trace back image is displayed on a sub screen of the display section 114, the photographer resolves the disturbance and designates an image that has returned to normal by means of a touch operation (refer to S69 and S71 in FIG. 5A), to change this image that has been designated to the reference image (refer to S283 in FIG. 14). If the reference image has been changed, combination processing is performed in steps S233 to S237 using this changed reference image.

Once the combination processing has been performed in steps S233, S235 and S237, next a reference combined image is displayed (S239). Here, the system control section 105 displays the reference combination image that was generated in steps S233, S235, or S237, on the display section 144 (refer to 114a in FIG. 5C).

Next, trace back combined image storage processing is performed (S241). Every time image data for a reference image is generated, image data for the previous reference image is stored in memory (refer to trace back combined image data 1 to N in FIG. 12). If the number of trace back combined images exceeds N, the oldest image is deleted, and the newest image is stored. That is, combined images are stored cyclically. Details of the operation of the trace back combined image storage processing will be described later using FIG. 13C. Once trace back combined image storage processing has been performed, the flow for readout processing is terminated and the originating flow is returned to.

Figure 13B:
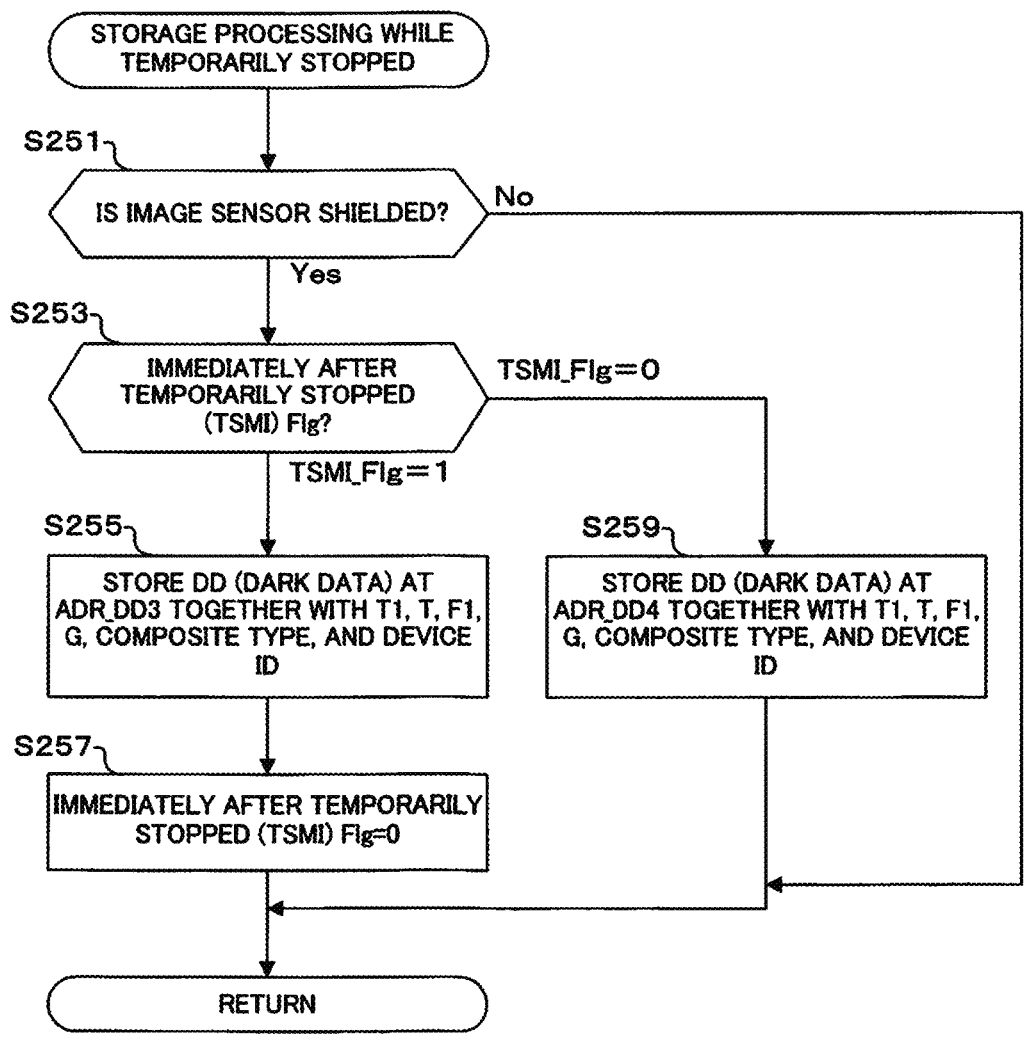
FIG. 13B is a flowchart showing operation of while temporarily stopped storage processing of the camera of one embodiment of the present invention.

Next, operation of the while temporarily stopped storage processing of step S227 (refer to FIG. 13A) will be described using the flowchart shown in FIG. 13B. As was described previously, if a temporary stop instruction is issued, the live composite shooting is temporarily stopped, and dark data DD for immediately after temporary stop, and dark data DD after that etc., are stored and held.

If the flow for while temporarily stopped storage processing commences operation, it is first determined whether or not there is shielding of the image sensor (S251). Shielding of the image sensor 101b is performed by the mechanical shutter 101a. In this step the system control section 105 performs determination based on whether or not the mechanical shutter 101a is closed. If the result of this determination is that the image sensor is not being shielded, then dark data cannot be acquired, and so the flow for while temporarily stopped storage processing is terminated and the originating flow is returned to.

On the other hand, if the result of determination in step S251 is that the image sensor is being shielded, next the immediately after temporarily stopped flag (TSMI_Flg) is determined (S253). The immediately after temporary stop flag is a flag for instructing storage and save of dark image data immediately after temporary stop, and is set to 0 in step S257, which will be described later. Accordingly, the image sensor is shielded, and immediately after initial acquisition of dark data DD this flag is set to 1.

If the result of determination in step S253 is that the immediately after temporary stop flag (TSMI_Flg) is 1, namely that it is immediately after temporary stop, next, dark data DD is stored and held at ADR_DD3 together with T1, T, F1 and G (S255). Here, the system control section 105 acquires dark data DD that has been acquired from the image sensor 101b, current time T1, image sensor temperature T, readout (first) frame rate F1, and gain (ISO sensitivity) G, and stores at address ADR_DD3 in memory (refer to FIG. 12). The immediately after temporary stop flag (TSMI_Flg) is then set to 0 (S257).

On the other hand, if the result of determination in step S253 is that the immediately after temporary stop flag (TSMI_Flg) is 0, namely that it is not immediately after temporary stop, next, dark data DD is stored and held at ADR_DD4 together with T1, T, F1 and G (S259). Here, the system control section 105 acquires dark data DD that has been acquired from the image sensor 101b, current time T1, image sensor temperature T readout (first) frame rate F1, and gain (ISO sensitivity) G, and stores at address ADR_DD4 in memory (refer to FIG. 12). While being temporarily stopped data such as dark data DD etc. is updated at a specified timing every time step S259 is executed. When temporary stop has been released, data such as dark data DD that has been stored at address ADR_DD4 becomes data immediately before release of temporary stop.

Opening closing operations of the mechanical shutter 101a while temporarily stopped will be described using FIG. 13D. In FIG. 13D, in the period from time T1 to T2, the mechanical shutter 101a is closed, and dark data Dk1 is acquired. In the period from time T1 to T3, the mechanical shutter 101a is open and image data for live composite shooting is acquired. A temporary stop instruction is issued at time T3, and the mechanical shutter 101a is closed. Dark data that has been acquired immediately after this is stored as dark image data Dk3 (refer to S255 in FIG. 13B). If temporary stop is released at time T4 and a resume instruction is issued, the mechanical shutter 101a is opened. Dark data that has been acquired immediately before this is stored as dark image data Dk4 (refer to S259 in FIG. 13B). In this way, with the camera of this embodiment, a dark image data acquisition section saves dark image data immediately after temporary stop, and dark image data before resuming.

Next, operation of the trace back combined image storage processing of step S241 (refer to FIG. 13A) will be described using the flowchart shown in FIG. 13C. As was described previously, with the trace back combined image storage processing, image data for a reference image is stored in the memory 103 every time image data for a reference image is generated.

If the flow for trace back combined image storage processing commences operation, it is first determined whether or not a predetermined time based on the second frame rate has elapsed (S261). The second frame rate is a predetermined time interval for storing reference images that have been generated by the combination processing, as was described previously (for determination of the second frame rate refer to FIG. 11A and FIG. 11B). Here, the system control section 105 determines whether or not a time that is determined by the second frame rate has elapsed. If the result of this determination is that a predetermined time based on the second frame rate has not elapsed, the trace back combined image storage processing is escaped from and the originating flow is returned to.

On the other hand, if the result of determination in step S261 is that the predetermined time has elapsed, ADR=ADR_KIJUN+DV×K is calculated (S263). Here, ADR is an address for storing image data of a reference image that has been generated by the image combination of steps S233 to S237. K is a count value of an trace back combined image counter, and is reset to 1 in advance in step S151 (refer to FIG. 8A) (incremented in step S268 which will be described later). Also, DV is an address value corresponding to size of combined image data, and a buffer memory having a DV×K head address from ADR_KIJUN is secured in order to hold trace back combined images (refer to FIG. 12).

Next, reference combined image data from head address ADR is stored (S265). Here, image data of a reference image that was generated in steps S233 to S237 is stored at address ADR that was calculated in step S263.

It is then determined whether or not X<N+1 (S267). N is maximum memory address for trace back combined image storage. If K<N+1, reference combined image data is stored at all addresses for trace back combined image storage.

If the result of determination in step S267 is that K<N+1, K=K+1 is performed (S268) to increment K. The next time, if a predetermined time based on second frame rate elapses, trace back combined image data is stored at an address determined by this new K. On the other hand, if K≥N+1, K=1 is performed (S269). In this case, since K=1, the next time, if a predetermined time based on the second frame rate elapses, trace back combined image data will again be stored at head address ADR. Once the processing of steps S268 and S269 has been performed, the originating flow is returned to.

Next, operation of the temporary stop processing of step S167 (refer to FIG. 8B) will be described using the flowchart shown in FIG. 14. As was described previously, at the time of being temporarily stopped, readout of image data from the image sensor 101b continues, but updating of image combination is stopped.

If operation of the flow for temporary stop processing is commenced, first, image sensor temperature Tstop is acquired (S271). Here, the system control section 105, similarly to step S115, acquired image sensor temperature Tstop at the time of being temporarily stopped based on a measurement values which has temperature dependency, such as dark current inside the image sensor 101b or of semiconductor elements nearby.

Next, temporarily stopped imaging control processing is performed (S273). Image sensor temperature T of the image sensor 101b rises if live view display commences, and during live composite shooting a readout period for image data becomes longer (first frame rate), and so normally temperature is reduced. Further, image sensor temperature change differs depending on operation of the image sensor when temporarily stopped. Since image sensor temperature T has an impact on dark image data (dark data DD), imaging control while temporarily stopped has an impact on dark data DD. Detailed operation of the imaging control while temporarily stopped will be described later using FIG. 15 to FIG. 22.

Next, display processing while temporarily stopped is performed (S275). Before temporary stop, every time a new combined image is generated, that image is displayed (refer to S239 in FIG. 13A). However, combined images based on live composite shooting are not generated while temporarily stopped. Therefore, with this embodiment display is switched in accordance with a temporarily stopped live view flag (TSL_Flg). This temporarily stopped live view flag is set to 1 or 0 as a result of selection of a display method while temporarily stopped by the photographer on a menu screen.

With the display processing while temporarily stopped, since, when the temporarily stopped live view flag (TSL_Flg) is 1, live view is permitted, live view display is performed on the display section 114 based on image data that has been read out by the image sensor 101b. On the other hand, if the temporarily stopped live view flag (TSL_Flg) is 0, then since live view is prohibited, a reference image that has been selected on a subscreen displayed on the side of the display section 114 (refer to FIG. 5C) (with the example in FIG. 5C, the frame 114ba) is displayed as a background image 114a.

If the temporarily stopped display processing has been performed in step S275, next, operation member processing is performed (S277). Here, similarly to step S11, processing is performed in accordance with operating state of an operation member such as a button, dial, lever etc. Operation of this operation member processing is as was described using FIG. 4, and so detailed description is omitted.

Figure 24A:
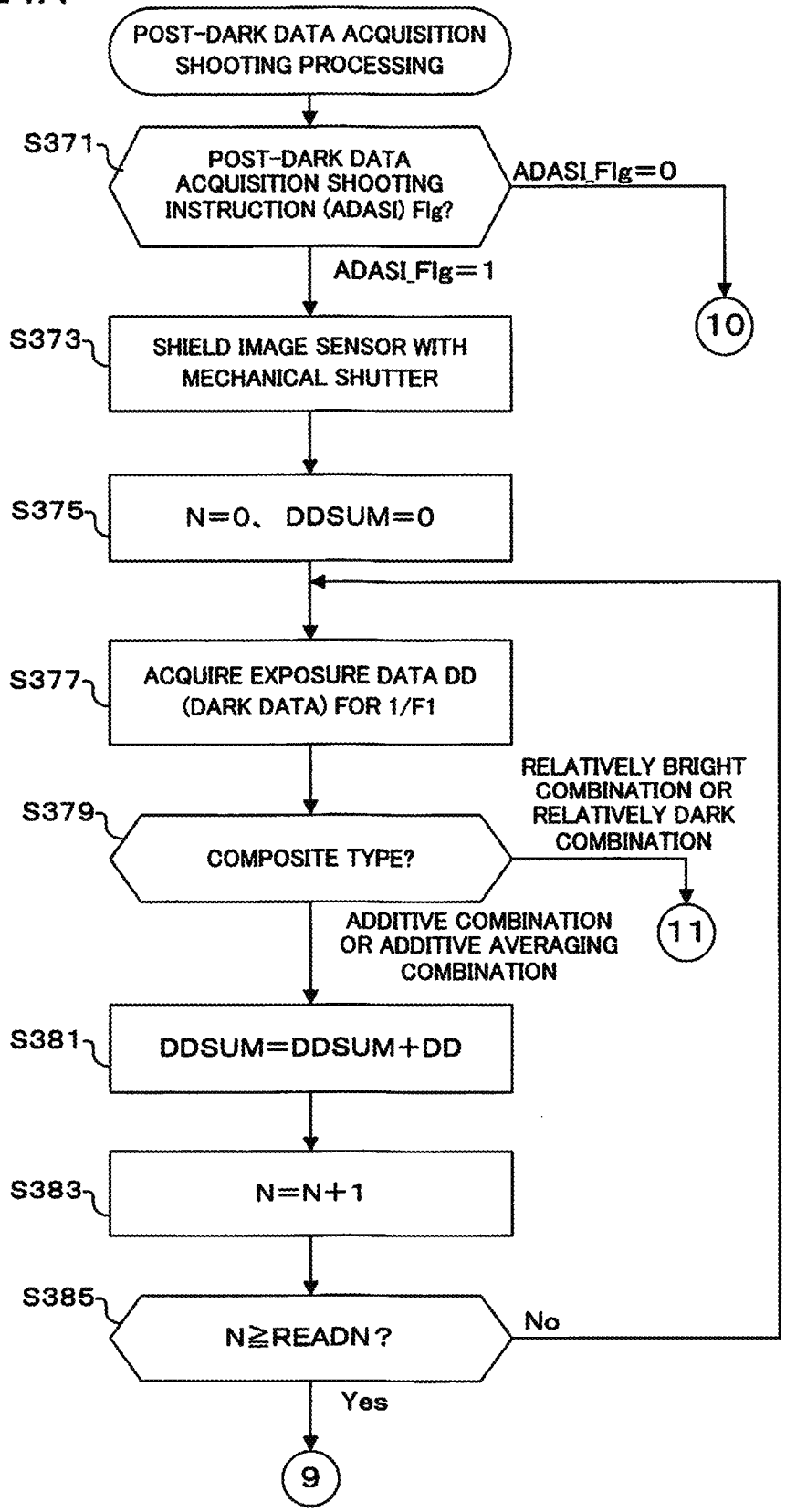
FIG. 24A and FIG. 24B are flowcharts showing operation of shooting for dark data acquisition after shooting processing of the camera of one embodiment of the present invention.
Figure 24B:
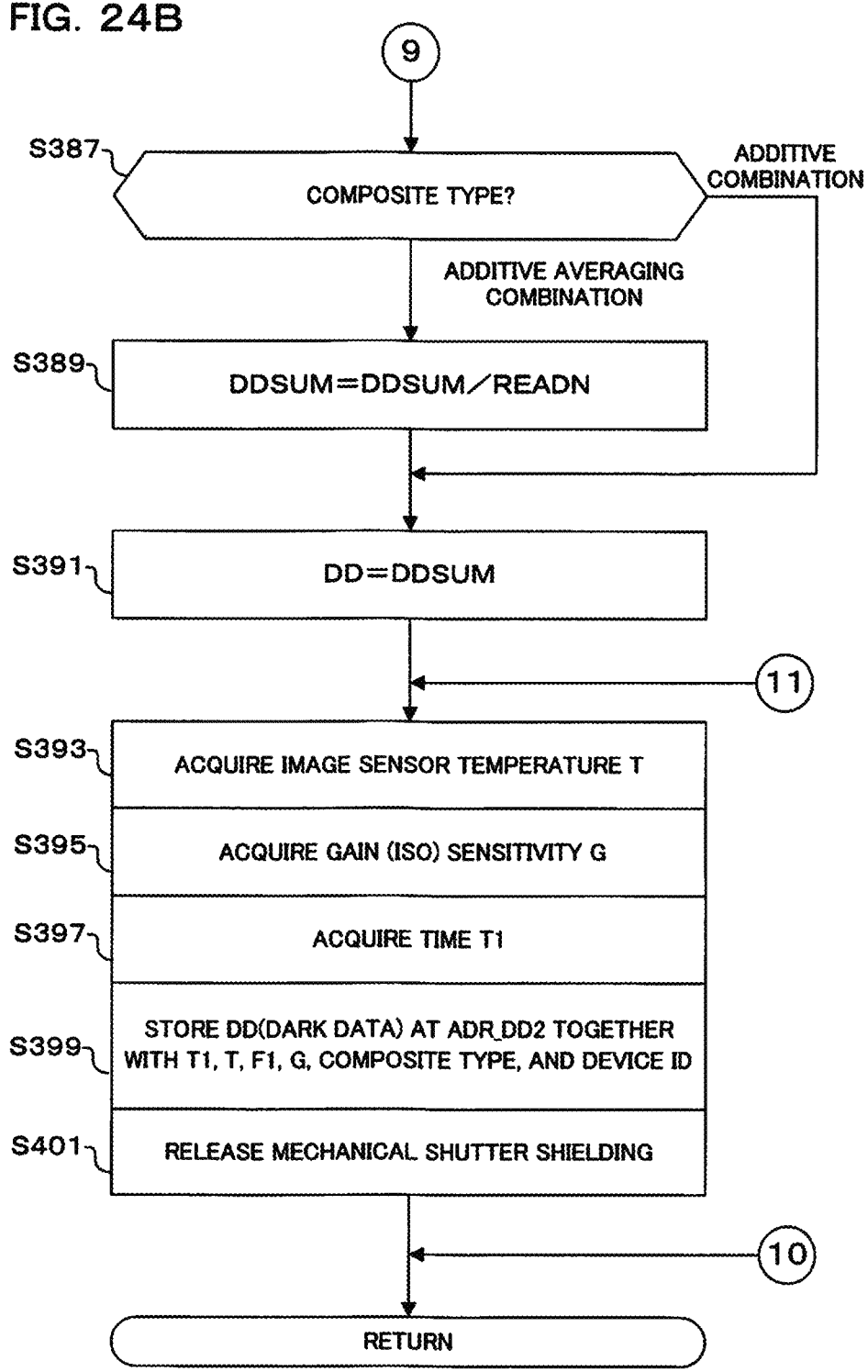

If the operation member processing has been performed, next, while temporarily stopped storage processing is performed (S279). Here, while temporarily stopped, dark data and reference image data that has been subjected to dark correction is stored. In this while temporarily stopped storage processing, processing is performed in accordance with the save flag (MI_Flg) instructing whether or not data while temporarily stopped is saved. If the save flag (MI_Flg) is 0, then since save is not instructed, this flow is terminated without anything being stored. On the other hand, if the save flag (MI_Flg) is 1, then since save is instructed (refer to S91 and S93 in FIG. 5B) dark data acquisition after shooting determination processing that will be described later using FIG. 23A is executed, shooting for dark data acquisition after shooting processing that will be described later using FIG. 24A and FIG. 24B is executed, and dark correction processing and storage processing that will be described later using FIG. 25A and FIG. 25B is executed. If these processes have been executed, the save flag (MI_Flg) is set to 0 and the while temporarily stopped storage processing is terminated. It should be noted that after storage processing has been performed, it is possible to stop, or resume storage.

Next, the temporary stop instruction flag (TSI_Flg) is determined (S281). The temporary stop instruction flag is alternately switched between 0 and 1 every time the temporary stop button 113$k$ (refer to FIG. 2) is pressed down, and if the resume icon is touched this flag is set to 0 (refer to S89 and S95 in FIG. 5B). This flag is therefore switched during temporary stop processing. In this step the system control section 105 performs determination of the temporary stop flag. If the result of this determination is that the temporary stop instruction flag (TSI_Flg) is 1, namely that there is a temporary stop instruction, processing returns to step S273 and temporary stop continues.

On the other hand, if the result of determination in step S281 is that the temporary stop instruction flag (TSI_Flg) is 0, namely that instruction for temporary stop has been released, next, a combined image that has been designated by the photographer is changed to a reference combined image (S283). As was described in step S71, if the photographer performs designation by touching a subscreen, there is a change to display with which identification of the "subscreen" that has been touched is possible. Here, a combined image corresponding to the subscreen that the photographer designated is changed to a reference image. It should be noted that with this embodiment content of address ADR_KIJUN within memory is changed, but this is not limiting and changing of reference image may also be performed by designating a pointer of a reference combined image, for example.

Next, the shielding of the image sensor is removed (S285). Since the temporary stop instruction flag (TSI_Flg) has become 0 and the temporary stop instruction has been removed, shielding of the image sensor 101$b$ is removed and live composite shooting is resumed.

Next, a first example of temporarily stopped imaging control processing in step S273 (refer to FIG. 14) will be described using FIG. 15 and FIG. 16. With this first example, when temporarily stopped, either drive of the image sensor is not stopped, or drive of the image sensor continues, but in live view recovery is made not available.

Operation of this first example will be described using the flowchart shown in FIG. 15. If the flow for temporarily stopped imaging control processing is commenced, first, change of first frame rate is prohibited (S287). Next, readout processing is performed (S289). Here, the imaging drive control section 106 performs readout of image data from the image sensor 101$b$ at a first frame rate (refer to FIG. 13A). However, although image data is read out, image combination such as relatively bright combination, relatively dark combination, additive combination or additive averaging combination is not performed. Once readout processing has been performed, the originating flow is returned to.

Figure 16:
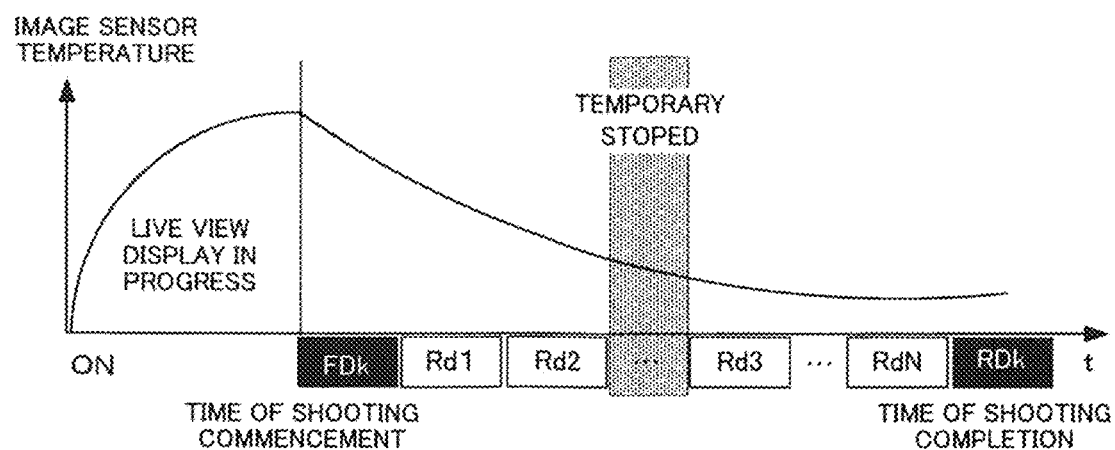
FIG. 16 is a graph showing temperature change of an image sensor, while temporarily stopped, in the camera of one embodiment of the present invention.

FIG. 16 shows temperature change of the image sensor in the case of the first example of temporarily stopped imaging control. In FIG. 16 (the same also applies to FIG. 18 and FIG. 20 which will be described later), FDk is readout of dark data before shooting, Rd1 represents readout of image data 1, Rd2 represents readout of image data 2, Rd 3 represents readout of image data 3, RdN represents readout of image data N, and Rd 3 represents readout of dark data after shooting. With the first example, exposure is control is not stopped while temporarily stopped either, and since readout frame rate is also not changed it results incompliant temperature change. In this way, with the first example of temporarily stopped imaging control a shooting temporary stop instruction section is provided to instruct pausing of shooting, and change of the first frame rate while temporarily stopped is prohibited.

Next, a second example of temporarily stopped imaging control processing in step S273 (refer to FIG. 14) will be described using FIG. 17 and FIG. 18. With this second example, while being temporarily stopped, control is performed so that the temperature of the image sensor is kept positively stable.

Operation of this second example will be described using the flowchart shown in FIG. 17. If the flow for temporarily stopped imaging control processing is commenced, first, image sensor temperature T is acquired (S291). Here, similarly to S115 (refer to FIG. 7A), the system control section 105 acquires temperature around the image sensor 101$b$.

Next, a comparison test is performed for T and Tstop (S293). T is the most recent temperature of the image sensor that was acquired in step S291. Also, T stop is temperature of the image sensor immediately after commencement of temporary stop, which was acquired in step S27 (refer to FIG. 14).

If the result of determination in step S293 is that T>Tstop, namely that the most recent image sensor temperature T became higher than image sensor temperature Tstop immediately after commencement of temporary stop, the first frame rate is changed to a low speed side (S295). By changing the first frame rate to the low speed side the temperature of the image sensor is lowered.

On the other hand, if the result of determination in step S293 is that T<Tstop, namely that the most recent image sensor temperature T became lower than image sensor temperature Tstop immediately after commencement of temporary stop, the first frame rate is changed to a high speed side (S297). By changing the first frame rate to the high speed side the temperature of the image sensor is raised.

If the first frame rate has been changed in step S295 or S297, readout processing is next performed (S299). Here, the imaging drive control section 106 performs readout of image data from the image sensor 101$b$ at the first frame rate that was changed in step S295 or S297, and at the first frame rate that is the same as previously (refer to S223 in FIG. 13A). However, although image data is readout, image combination such as relatively bright combination, relatively dark combination, additive combination or additive averaging combination is not performed. Once readout processing has been performed, the originating flow is returned to. As mentioned above, since imaging readout is performed while increasing or reducing the first frame rate, it is possible to maintain T=Tstop, and even if live composite shooting is temporarily stopped a relationship between combined images and dark images is maintained, similarly to the previous first example.

Figure 18:
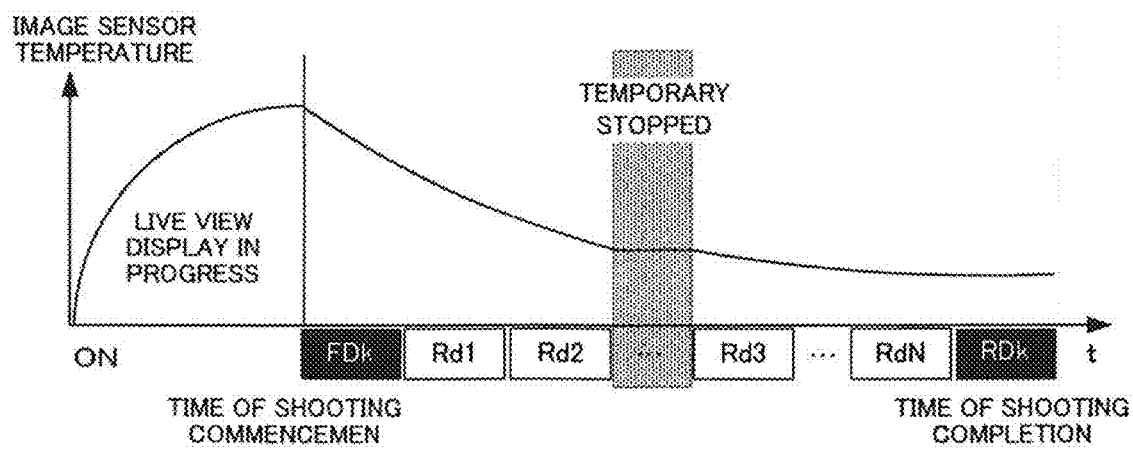
FIG. 18 is a graph showing temperature change of an image sensor, while temporarily stopped, in the camera of one embodiment of the present invention.

FIG. 18 shows temperature change of the image sensor in the case of the second example of temporarily stopped imaging control. With the second example, control is performed so that image sensor temperature becomes constant while temporarily stopped. In this way, with the second example of temporarily stopped imaging control a shooting temporary stop instruction section is provided for instructing pausing of shooting, and the first frame rate is controlled based on temperature of the image sensor while temporarily stopped. Also, the first frame rate is changed so that temperature of the image sensor while temporarily stopped becomes substantially constant.

Next, a third example of temporarily stopped imaging control processing in step S273 (refer to FIG. 14) will be described using FIG. 19 and FIG. 20. With this third example, control is performed while being temporarily stopped so that the temperature of the image sensor is kept within a predetermined range.

Operation of this third example will be described using the flowchart shown in FIG. 19. If the flow for temporarily stopped imaging control processing is commenced, first, an image sensor temperature upper limit Tupper is set (S301). Then, an image sensor temperature lower limit Tlower is set (S303). These upper limit and lower limit image sensor temperatures may be predetermined values that are set in advance, and may be appropriately determined based on a most recent image sensor temperature, or image sensor temperature immediately after temporary stop has been commenced. Fluctuation range may also be appropriately determined. Next, image sensor temperature T is acquired (S305). Here, similarly to S115 (refer to FIG. 7A), the system control section 105 acquires temperature of elements of the image sensor 101b or surrounding temperature.

T determination is next performed (S307). Here, the system control section 105 performs comparison of temperatures Tupper and Tlower that were acquired in steps S301 and S303 with the most recent image sensor temperature T that was acquired in step S305.

If the result of determination in step S307 is that T>Tupper, namely that the most recent image sensor temperature T became higher than the upper limit image sensor temperature Tupper, the first frame rate is changed to a low speed side (S309). By changing the first frame rate to the low speed side the temperature of the image sensor is lowered.

On the other hand, if the result of determination in step S307 is that T<Tlower, namely that the most recent image sensor temperature T became lower than the lower limit image sensor temperature Tlower, the first frame rate is changed to a high speed side (S311). By changing the first frame rate to the high speed side the temperature of the image sensor is raised.

If the first frame rate has been changed in step S309 or S311, readout processing is next performed (S313). Here, the imaging drive control section 106 performs readout of image data from the image sensor 101b at the first frame rate that was changed in step S309 or S311, and at the first frame rate that is the same as previously. However, although image data is read out, image combination such as relatively bright combination, relatively dark combination, additive combination or additive averaging combination is not performed. Once readout processing has been performed, the originating flow is returned to. Here, Tupper may be set to a temperature greater than at the time of commencing live composite shooting, and Tlower may be set to a temperature that is greater than at a time when it has been estimated from temperature change curve during live composite shooting that temperature will be stable. If temperature can be controlled within this range, then even if there is a temporary stop in live composite shooting a relationship between a combined image and a dark image is maintained, similarly to the previous first example.

Figure 20:
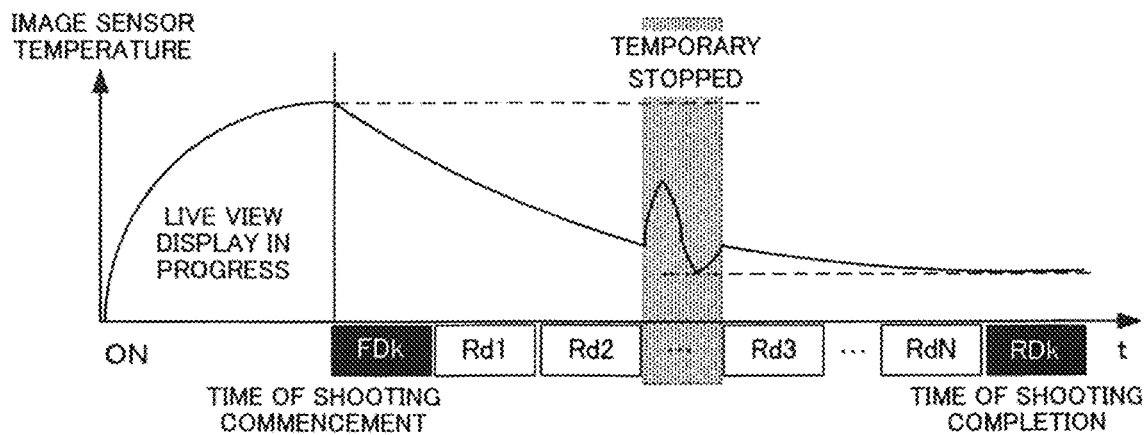
FIG. 20 is a graph showing temperature change of an image sensor, while temporarily stopped, in the camera of one embodiment of the present invention.

FIG. 20 shows temperature change of the image sensor in the case of the third example of temporarily stopped imaging control. With the third example, control is performed so that image sensor temperature is confined within a specified range while temporarily stopped. If it is possible to trace temperature change during shooting, control of temperature to within the specified range is possible. With this example, live view display may either be performed, or not performed. In this way, with the third example of temporarily stopped imaging control a shooting temporary stop instruction section is provided for instructing pausing of shooting, and the first frame rate is controlled so that temperature of the image sensor while temporarily stopped is confined within a temperature range of the image sensor at the time of shooting commencement and at the time of shooting completion.

Figure 21:
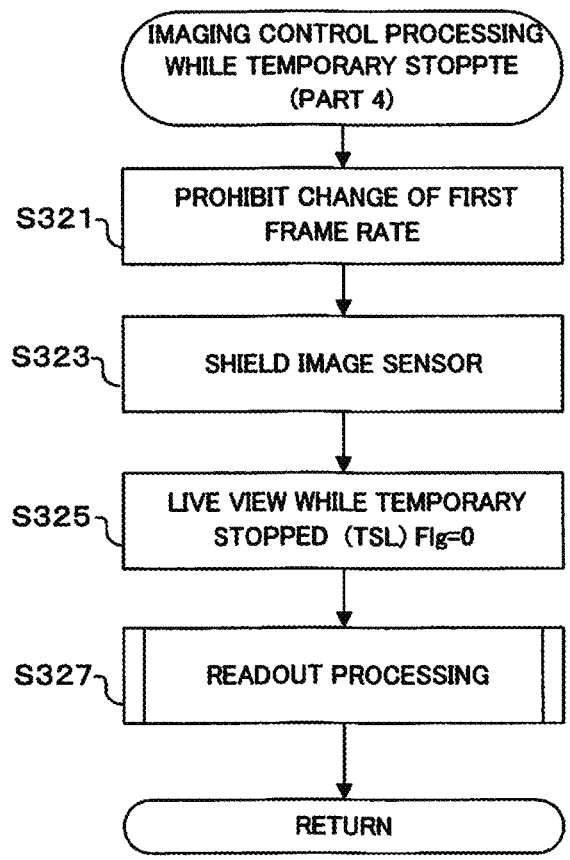
FIG. 21 is a flowchart showing temporarily stopped imaging control processing operation (part 4) of the camera of one embodiment of the present invention.

Next, a fourth example of temporarily stopped imaging control processing in step S273 (refer to FIG. 14) will be described using FIG. 21 and FIG. 22. With this fourth example, the image sensor is shielded while temporarily stopped, and acquisition of dark image data continues.

Operation of this fourth example will be described using the flowchart shown in FIG. 21. If the flow for temporarily stopped imaging control processing is commenced, first, change of first frame rate is prohibited (S321), similarly to step S287 (refer to FIG. 15). The image sensor is then shielded (S323). With the fourth example, since acquisition of dark image data continues while shooting is temporarily stopped, shielding of the image sensor 101b is performed by closing the mechanical shutter 101a.

Next, the temporarily stopped live view flag (TSL_Flg) is set to 0 (S325). With the fourth example, because the image sensor is being shielded live view display is not performed while temporarily stopped. Next, readout processing is performed (S327). Once readout processing has been performed, the originating flow is returned to.

Figure 22:
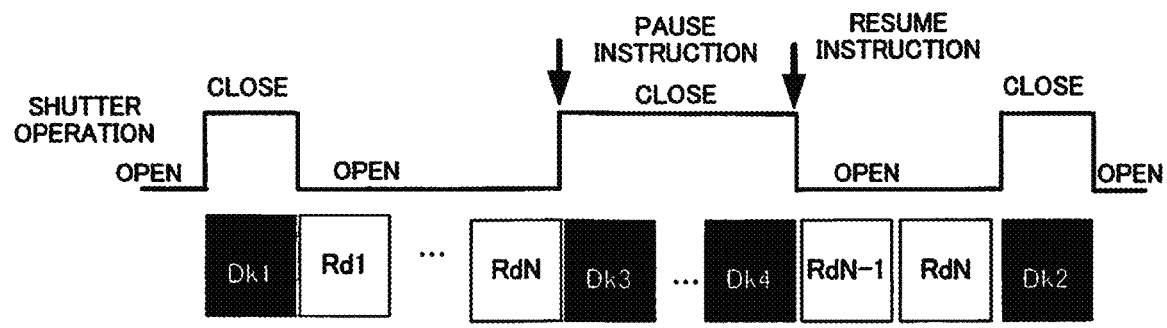
FIG. 22 is a timing chart showing shielding of the image sensor while temporarily stopped, and acquisition of dark image data, in the camera of one embodiment of the present invention.

FIG. 22 shows opening and closing operation of the mechanical shutter 101a, and image readout, in the case of the fourth example of temporarily stopped imaging control. With the fourth example, before pausing, when acquiring dark image data 1 (Dkd1) the mechanical shutter 101a is closed, and when acquiring subject image data (Rd1 to RdN) the mechanical shutter 101a is opened. However, from issuing a temporary stop instruction until a resume instruction is issued the mechanical shutter 101a remains closed, and during this time dark image data (Dk) is repeatedly acquired. Dark image data that was acquired immediately after temporary stop is stored as dark image data 3, and a dark image that was stored immediately before resume is stored as dark image data 4 (refer to S255 and S259 in FIG. 12 and FIG. 13B), and in this way, with the fourth example of the temporarily stopped imaging control, a shooting temporary stop instructing section for instructing pausing of shooting is provided, and dark image data 3 is acquired immediately after temporary stop and dark image data 4 is acquired immediately before resume.

Next, operation of the dark data acquisition after shooting determination processing of step S177 (refer to FIG. 8B) will be described using the flowcharts shown in FIG. 23A and FIG. 23B. As was described previously, dark data acquisition after shooting determination processing determines whether or not it is necessary to acquire dark data after shooting. In the case of additive combination and additive averaging combination, dark data before shooting was not acquired (refer to S117 in FIG. 7A), but for all composites, including the cases of additive combination and additive averaging combination, the necessity for acquisition of dark data after shooting after shooting completion is determined.

If the flow for dark data acquisition after shooting determination processing commences operation, first, readout frame rate F1 is acquired (S331). As was described previously, the readout frame rate F1 is the reciprocal of a time interval for the reading out image data for one frame from the image sensor 101b by the imaging drive control section 106. Similarly to step S113, the system control section 105 acquires a frame rate F1 that has been set, from the imaging drive control section 106. Next, gain (ISO sensitivity) G is acquired (S333). Gain (ISO sensitivity) G is the sum of sensitivity of the image sensor 101b at the time of exposure control, multiplication factor of an amplifier, and digital multiplication factor. Similarly to step S114, the system control section 105 acquires gain G that has been set from the exposure control section 109.

Next, image sensor temperature T is acquired (S335). Here, the system control section 105, similarly to step S115, acquires image sensor temperature T based on a measurement value which has temperature dependency, such as dark current inside the image sensor 101b or of semiconductor elements nearby. It should be noted that a temperature measurement sensor may be arranged in the vicinity of the image sensor 101b and image sensor temperature T measured in this way.

If image sensor temperature T has been acquired, then next a composite type is determined (S337). As was described previously, with this embodiment there are four types of live composite shooting, namely "relatively bright combination", "relatively dark combination", "additive combination", and "additive averaging combination". These composite types can be set by the photographer on menu screens. Similarly to step S117, the system control section 105 performs determination based on a composite type that has been set by the photographer.

If the result of determination in step S337 is that the composite type is relatively bright combination or relatively dark combination, next TIME=1/F1 is set (S345). As was described previously, F1 is frame rate, and the system control section 105 sets a reciprocal of the frame rate in TIME.

Next, DD_TIME=Fn1 (G,T) is set (S347). A determined reference time DD_TIME is the time required for dark data acquisition, and is the readout frame rate time of the image sensor 101b. Frame rate time DD_TIME is calculated from gain (ISO sensitivity) G and image sensor temperature T. A function Fn1(G,T) results in DD_TIME being a small value as gain (ISO sensitivity) G becomes high and as image sensor temperature T becomes high.

If the result of determination in step S337 is that the composite type is additive combination or additive averaging combination, next, a number of readouts READN is acquired (S339). As was described previously, the number of readouts READN is a counter that is incremented every time image data is read out from the image sensor 101b (refer to S151 in FIG. 8A, and S223 and S229 in FIG. 13A).

Next, TIME=READN/F1 is calculated (S341). 1/F is equivalent to a frame interval time, and total time for exposure using additive combination or additive averaging combination is calculated by multiplying this time by the number of readouts.

Next, DD_TIME=Fn2 (G,T) is set (S343). A determined reference time DD_TIME is the time required for dark data acquisition, and is the readout frame rate time of the image sensor 101b. Frame rate time DD_TIME is calculated from gain (ISO sensitivity) G and image sensor temperature T. Similarly to the function Fn1, function Fn2(G,T) results in DD_TIME being a small value as gain (ISO sensitivity) G becomes high and as image sensor temperature T becomes high.

If determination reference time DD_TIME has been calculated in step S343 or S347, next, determination is performed based on dark image data correction mode (S349). Dark image data correction mode is set by the photographer on a menu screen of the display section 114. There are three of these dark image correction modes, namely on mode, off mode and auto mode. On mode is a mode in which dark image data correction is always performed, off mode is a mode in which dark image data correction is not performed, and auto mode is a mode in which dark image data correction is performed if necessary. The system control section 105 performs determination based on setting conditions on a menu screen.

If the result of determination in step S349 is that it is auto mode, is next determined whether or not it is necessary to acquire dark image data (S351). Here, the system control section 105 compares frame rate time (exposure time) at the time of live composite shooting that was calculated in step S341 or S345, and determination reference time DD_TIME for determining necessity of dark data after shooting, and if TIME<DD_TIME, determines that acquisition is necessary. The system control section 105 functions as a dark image data correction prohibition section for prohibiting acquisition operations for first and second dark image data based on shooting conditions. It should be noted that with this embodiment acquisition operations for dark image data are prohibited depending on shooting conditions, but this is not limiting and fixed pattern noise correction operations may also be prohibited. For example, when performing dark correction processing (refer, for example, FIG. 25B), correction processing for fixed pattern noise may be prohibited based on shooting conditions.

If the result of determination in step S351 is that it has been judged that acquisition of dark data is not necessary, or if the result of determination in step S349 is that the dark image data correction mode is off mode, next the post-dark data usage flag (ADDU_Flg) is set to 0 (S355). If the result of determination in step S349 or S351 is that it dark data after shooting is not necessary, the dark data after shooting usage flag is set to 0. If this flag has been set, the flow for dark data acquisition after shooting determination processing is terminated and the originating flow is returned to.

If the result of determination in step S351 is that acquisition of dark data is necessary, or if the result of determination in step S349 is that the dark image data correction mode is on mode, next the post-dark data usage flag (ADDU_Flg) is set to 1 (S353). Since the result of determination in step S349 or S351 is that dark data after shooting has become necessary when performing dark correction processing (refer to S435 and S437 in FIG. 25B), the dark data after shooting usage flag is set to 1.

Next, it is determined whether or not reuse of the dark data is possible (S357). In a case where the readout frame rate F1 for the current and the previous dark data is the same, and the image sensor temperature T and gain (ISO sensitivity) G are substantially the same, the system control section 105 judges that reuse of dark data is possible. Put more simply, previous and current dark data acquisition times are compared, and if they do not differ by a predetermined time or more it may be judged that the dark data are reusable. Also, even if F1, T and G are the same, for reliability, the current and previous dark data acquisition times may be compared, and the dark data judged as unsuitable for reuse if these two times differ by a predetermined time or more. In a case where dark image data is loaded from external memory 115, which is removable memory, a device ID associated with the dark image data is also checked. If the device ID is different to the device ID of the camera 100, it is judged that dark data cannot be reused.

If the result of determination in step S357 is that the dark data can be reused, previous dark data DD (dark data) is reused and replaced (S359). In this case, as dark data after shooting, previously measured dark data is reused, and this dark data replaces the current dark data after shooting. In this case, shooting for dark data acquisition after shooting is not performed.

On the other hand, if the result of determination in step S357 is that reuse is inappropriate, next, the shooting for post-dark data acquisition shooting instruction flag (ADAS-I_Flg) is set to 1 (S361). If this flag is 1, then in the flow for shooting for dark data acquisition after shooting processing, shooting for the purpose of dark data acquisition after shooting is performed (refer to S371 in FIG. 24A). If the processing in steps S359 or S361 has been performed, the flow for dark data acquisition after shooting determination processing is terminated and the originating flow is returned to.

In this way, in the dark data acquisition after shooting determination processing, determination as to whether dark data acquisition after shooting is necessary (refer to FIG. S351) is dependent on type of live composite shooting (refer to S337). In the case of relatively bright combination and relatively dark combination, determination is dependent on magnitude of frame rate time of the readout frame rate F1 (refer to S345). On the other hand, in the case of additive combination and additive averaging combination determination is dependent on magnitude of overall exposure time (refer to S341). Determination reference time DD_TIME takes a large value as ISO value and gain (ISO sensitivity) become high, and as image sensor temperature T becomes high.

If dark data after shooting is necessary, it is determined whether or not there is dark image data that can be reused (refer to S357). If the result of this determination is that there is dark image data that can be reused, this data is reused (refer to S359), and processing is escaped from. On the other hand, if there is not dark image data that can be reused the shooting instruction for post-dark data acquisition shooting flag (ADASI_Flg) is set to 1 and the processing is escaped from.

Next, operation of the shooting for dark data acquisition after shooting processing of step S179 (refer to FIG. 8B) will be described using the flowcharts shown in FIG. 24A and FIG. 24B. The shooting for dark data acquisition after shooting processing is a shooting processing routine that is performed before completing live composite shooting, and acquires dark data after shooting.

If operation of the flow for dark data acquisition after shooting determination processing is commenced, first the post-dark data shooting instruction flag (ADASI_Flg) is determined (S371). If acquisition of dark data after shooting is necessary, then in previously described step S361 the post-dark data shooting instruction flag (ADASI_Flg) will have been set to 1. In this step, determination by the system control section 105 is based this flag. If the result of this determination is that the shooting for dark data after shooting instruction flag has been set to 0, flow for shooting for dark data acquisition after shooting processing is terminated and the originating flow is returned to.

If the result of determination in step S371 is that the shooting for dark data after shooting instruction flag has been set to 1, next the image sensor is shielded by the mechanical shutter (S373). Acquisition of dark data after shooting is performed in a state where the image sensor 101b has been shielded, and in this step the system control section 105 closes the mechanical shutter 101a.

Next, N=0 and DDSUM=0 are performed (S375). N is the total number of times that dark data has been added in the case of additive combination pr additive averaging combination (refer to S383), and DDSUM holds a cumulative value for dark data (refer to S381). In this step N and DDSUM are initialized.

Next, exposure data DD (dark data) for (1/F1) is acquired (S377). Here, dark pixel signals are accumulated in the image sensor 101b during the time (1/F1), that is, the time determined by the frame rate, At the point in time where the time (1/F1) has elapsed, the imaging drive control section 106 reads out image data from the image sensor 101b, and the system control section 105 acquires this image data as exposure data DD.

Next, the composite type is determined (S379). The composite type can be set by the photographer on a menu screen. Similarly to steps S117 and S337, the system control section 105 performs determination based on a composite type that has been set by the photographer.

If the result of determination in step S379 is that the composite type is additive combination or additive averaging combination, next, DDSUM=DDSUM+DD is calculated (S381). In the case of additive combination or additive averaging combination, for dark data after shooting, dark data is only acquired the same number of times as the number of times shooting is performed READN at the time of live composite shooting, and dark correction is performed using these accumulated values of DDSUM. In this step, accumulated values for this dark data are calculated using dark data that was acquired in step S377.

Next, N=N+1 is calculated (S383). Here, a counter N is incremented in order to count the number of times dark data has been acquired in the shooting for dark data acquisition after shooting.

It is next determined whether or not N≥READN (S385). As was described previously, READN is a number of time shooting is performed at the time of live composite shooting (refer to S229 in FIG. 13A), and N is a number of times dark data has been acquired in shooting for dark data acquisition after shooting. In this step it is determined whether or not, in the shooting for dark data acquisition after shooting, dark data has been acquired a number of times that is the same as the number of times shooting is performed at the time of live composite shooting. If the result of this determination is that N<READN processing returns to step S377 and dark data is acquired.

If the result of determination in step S385 is that N≥READN, it is next determined whether composite type is additive combination or is additive averaging combination (S387). In the case of additive combination, dark correction processing is performed using added values DDSUM for dark data as they are, but in the case of additive averaging combination the dark correction processing is performed using average values of dark data added values DDSUM.

If the result of determination in step S387 is additive averaging combination, DDSUM=DDSUM/READN is calculated (S389). Here, a cumulative value for dark data that has been read out in step S381 is divided by the number of time shooting is performed READN at the time of live composite shooting. As a result it is possible to obtain an average value of dark data that has been acquired the shooting for dark data acquisition after shooting.

If an average value for dark data has been calculated in step S389, or if the result of determination in step S387 is that composite type is additive combination, next, setting of DD=DDSUM is performed (S391) As a result of this processing, dark data DD at the time of additive averaging combination becomes an average value of dark data that has been acquired the same number of times as the number of times shooting is performed at the time of live composite shooting, and dark data at the time of additive combination becomes a cumulative value of dark data that has been acquired the same number of times as the number of times shooting is performed at the time of live composite shooting. Also, in the case of relatively bright combination and relatively dark combination, dark data DD that has been acquired only once in step S377 is treated as is as the dark data DD.

If DD=DDSUM has been performed in step S391, or if the result of determination in step S379 is relatively bright combination or relatively dark combination, next, image sensor temperature T is acquired (S393). Here, similarly to S115 (refer to FIG. 7A) and S197 (refer to FIG. 9), the system control section 105 acquires temperature of elements of the image sensor 101b or surrounding temperature. Next, gain (ISO sensitivity) G is acquired (S395). Here, similarly to step S114 (refer to FIG. 7A) and S199 (refer to FIG. 9), the system control section 105 acquires gain (ISO sensitivity). Next, current time T1 is acquired (S397). Here, the system control section 105 acquires current time T1 using a clock section within the system control section 105.

Next, dark data DD is stored in ADR_DD2 of memory together with current time T1, image sensor temperature T, frame rate F1, gain G, device ID, and type of composite shooting (S399). Various image data is stored in the memory 103, as shown in FIG. 12. In step S399 data that was acquired in steps S377 to S397 is stored in the memory 103.

If data has been stored in memory in step S399, shielding by the mechanical shutter is removed (S401). Here, the system control section 105 opens the shutter 101a that was closed in step S373, and removes shielding of the image sensor 101b. Once the shielding by the mechanical shutter has been removed the flow for shooting for dark data acquisition after shooting processing is terminated and the originating flow is returned to.

In order to perform dark correction processing (refer to FIG. 25A and FIG. 25B), in the case of additive combination and additive averaging combination it is sufficient to have dark data after shooting. On the other hand, in case of relatively bright combination or relatively dark combination, dark data before shooting is required together with dark data after shooting. Therefore, in the shooting for dark data acquisition after shooting processing, whether or not it is necessary to perform dark processing is checked in dark data acquisition after shooting determination processing, whether or not shooting for dark data acquisition after shooting is performed is judged based on whether or not there is dark data before shooting that can be reused, and shooting for dark data acquisition after shooting is performed based on the result of this judgment (refer to S371).

Also, in the shooting for dark data acquisition after shooting processing, in the case of relatively bright combination or relatively dark combination, dark data after shooting is only acquired once (refer to S377), but in the case of additive combination or additive averaging combination dark data after shooting is acquired the same number of times as the number of times READN that shooting has been performed in live composite shooting. In the case of additive combination there is an additive value of subject image data resulting from shooting READN times, which means that dark correction is also similarly performed using the dark data numbering READN. Also, in the case of additive averaging combination there is an average value of subject image data resulting from shooting READN times, which means that dark correction is also similarly performed using the dark data numbering READN. In the case of additive combination and additive averaging combination noise is superimposed on individual data, and shooting is performed READN times at the time of shooting for dark data acquisition after shooting also, in order to make the effect of this noise small. In the case of relatively bright combination and relatively dark combination, since there is only replacement of bright pixel values or dark pixel values, the effect due to noise being superimposed for the total exposure time does not need to be considered.

Next, operation of the dark correction and storage processing of step S181 (refer to FIG. 8B) will be described using the flowchart shown in FIG. 25A. As was described previously, dark correction and storage processing is processing to perform correction of combined image data using dark image data, and store this combined image data that has been corrected in external memory 115.

If operation of the flow for dark correction processing and storage processing is commenced, first K=0 is set (S411). K is an trace back combined image counter, and is used in addresses for storing trace back combined image data in the storage region memory map image data shown in FIG. 12. In this step, the system control section 105 resets K to 0.

Next, combined image data for ADR_KIJUN+DV×K is read out (S413). Here, the system control section 105 sequentially reads out trace back combined image data that has been stored at ADR_KIJUN+DV, ADR_KIJUN+DV×2, . . . , in the memory map shown in a FIG. 12.

If trace back combined images have been read out, it is next determined whether or not an image has a check mark (S415). Combined images that have been combined during live composite shooting are displayed on subscreens 114b1 to 114b4 of the display section 114 (refer to FIG. 5C). Checkboxes 114c1 to 114c4 are provided on the subscreens, and if the photographer touches a checkbox the fact that a check box has been touched is stored (refer to S65 and S67 in FIG. 5A). In this step the system control section 105 determines whether or not a check mark is stored, for combined images corresponding to K.

If the result of determination in step S415 is that the check mark has been stored, dark correction processing is performed (S417). Here, the image processing section 104 performs dark correction on combined images for which a check mark was stored. In this case, depending on the composite type, the image processing section 104 subtracts dark data before shooting and/or dark data after shooting from combined image data, and generates image data that has been subjected to dark correction. Detailed operation of this dark correction processing will be described later using FIG. 25B.

If dark correction has been performed, next, image quality mode processing is performed (S419). Here, the image processing section 104 performs processing in accordance with image quality mode on image data that has been subjected to dark correction processing. Processing differs depending on whether image data is RAW image data or JPEG image data.

Next, storage processing is performed (S421). Here, the system control section 105 stores image data that has been subjected to image quality mode processing in step S419 in the external memory 115.

Once the storage processing in step S421 has been performed, or if the result of determination in step S415 is that there is no check mark, setting of K=K+1 is performed (S423). Here, the system control section 105 increments the trace back combined image counter K. Reference images are traced back, and in order to perform dark correction for trace back images also, the counter K is incremented.

It is next determined whether or not K≥N (S425). Trace back image data is stored in memory from trace back combined image data 1 to trace back combined image data N, as shown in FIG. 12. Here, it is determined whether or not processing has been completed for all trace back combined image data stored in memory.

If the result of determination in step S425 is that K≥N, processing returns to step S413, the next trace back combined image is read out, and processing is performed. On the other hand, if the result of determination in step S425 is that K>N, flow for dark correction processing and storage processing is terminated, and the originating flow is returned to.

Next, operation of the dark correction processing of step S417 (refer to FIG. 25A) will be described using the flowchart shown in FIG. 25B. As was described previously, dark correction processing is correction of combined image data that is performed using dark image data. This dark correction processing is performed using dark data before shooting and/or dark data after shooting, depending on the composite type.

If the flow for dark correction processing commences operation, the composite type is first determined (S431). Here, the system control section 105 performs determination based on the composite type data has been set by the photographer on a menu screen.

If the result of determination in step S431 is that the composite type is relatively bright combination or relatively dark combination, the pre-dark data usage flag (BDDU_Flg) is determined (S433). The pre-dark data usage flag is set to 1 in a case where dark data before shooting is used when performing dark correction processing (refer to S127 and S129 in FIG. 7B), and is set to 0 when not required. In this step the system control section 105 determines the pre-dark data usage flag (BDDU_Flg).

If the result of determination in step S433 is that the pre-dark data usage flag (BDDU_Flg) is 1, namely that dark data before shooting will be used, next, the post-dark data usage flag (ADDU_Flg) is determined (S435). In a case where dark data after shooting is used in dark correction processing, this flag is set to 1 (refer to S353 in FIG. 23B), and if the dark data after shooting is not used this flag is set to 0 (refer to S355 in FIG. 23B).

If the result of determination in step S435 is that the post-dark data usage flag (ADDU_Flg)=0, namely that the dark data after shooting is not used, correction data=dark image data 1 is set (S443). Since the result of determination in steps S443 and S435 is that only dark data before shooting need be used, dark image data 1 is used as correction data (refer to FIG. 12).

If the result of determination in step S435 is that the post-dark data usage flag (ADDU_Flg)=1, namely that it is necessary to use the dark data after shooting, correction data is calculated from dark image data 1 and dark image data 2 (S441). Since the result of determination in steps S433 and S435 is that it is necessary to use both dark data before shooting and dark data after shooting, for correction data, dark image data 1 and dark image data 2 are calculated and used (refer to FIG. 12).

If the result of determination in step S431 is additive combination or additive averaging combination, or if the result of determination in step S433 that the pre-dark data usage flag (BDDU_Flg) is 0, namely that it is not necessary to use dark data before shooting, next, the post-dark data usage flag (ADDU_Flg) is determined (S437). Here, similarly to step S435, this flag is determined.

If the result of determination in step S437 is that the post-dark data usage flag (ADDU_Flg)=0, namely that the dark data after shooting is not used, the flow for this dark correction processing is processed. In this case, since neither dark data before shooting or dark data after shooting need be used, dark correction processing is not performed for combined images and the previous flow is returned to.

If the result of determination in step S437 is that the post-dark data usage flag (ADDU_Flg)=1, namely that it is the dark data after shooting will be used, correction data=dark image data 2 is performed (S439). Since the result of determination in steps S431, S433 and S437 is that only dark data after shooting need be used, dark image data 2 is used as correction data (refer to FIG. 12).

If correction data has been determined in steps S439, S441 and S443, next, combined image=combined image–correction data is calculated (S445). Here, correction data that was determined in steps S439, S441 and S443 is subtracted from reference combined image data of ADR_KI-JUN, to generated a combined image. As a result correction processing that used a dark image is performed. Accordingly, it is possible to correct fixed pattern noise within image data using dark image data.

In this way, the flow for dark correction and storage processing serves the functions of sequentially reading out combined images from a combined images holding section (refer to FIG. 12) that cyclically stores and holds reference combined image data that has been combined, for a specified number of images at a second frame rate (refer to S413), a fixed pattern noise correction section that corrects fixed pattern noise of combined image data based on first and/or second dark image data (refer to S445), a dark image data correction prohibition section that prohibits acquisition operations of first and second data and/or fixed pattern noise correction operations, based on shooting conditions (refer to S123 to S129 in FIG. 7B, S141 in FIG. 8A, and S349 to S355 in FIG. 23B, S371 in FIG. 24A, and S433 to S445 in FIG. 25B), and a storage section that stores combined image data that has been subjected to processing by the dark image data correction prohibition section and the fixed pattern noise correction section (S421).

It should be noted that in the flowchart shown in FIG. 25B, description has been given for a case where dark image data 1 and dark image data 2 are used. However, in a case where there has been a temporary stop during live composite shooting, there may be cases where dark image data 3 for immediately after temporary stop, and dark image data 4 for immediately before temporary stop is removed, are saved (refer to FIG. 12, and to S255 and S259 in FIG. 13B). In this case, correction may be performed using these dark image data 3 and 4 when performing dark correction processing.

Next, reuse of dark image data when continuing execution of live composite shooting will be described using FIG. 26A and FIG. 26B.

First, an example where second live composite shooting continues after having performed first live composite shooting will be described using FIG. 26A. The first live composite shooting is commenced by the photographer performing 2nd release at time T11. At this time, dark image data is first acquired, and this dark image data that has been acquired is stored in memory 103 as dark image data 1 (Dk1) (refer to S143 in FIG. 8A, S203 in FIG. 9, and to FIG. 12).

After that, image data for live composite is acquired a plurality of times until a shooting completion instruction is issued at time T12, and image combination for live composite is performed every time image data is acquired (refer to S159 in FIG. 8A, and to FIG. 13A).

If a shooting completion instruction has been issued at time T12, dark image data is acquired, and this dark image data that has been acquired is stored in external memory 115 as dark image data 2 (Dk2) (refer to S179 in FIG. 8A, S399 in FIG. 24B, and to FIG. 12). If shooting is terminated, a combined image after having performed dark correction processing is stored in memory 103 (refer to S181 in FIG. 8B, and S417 and S421 in FIG. 25A).

After the first live composite shooting has been completed, if the photographer again performs a 2nd release immediately (at time T13) then second live composite shooting commences. At time T13, instead of acquiring dark image data for time T13, since the image sensor temperature T of the image sensor 101b will have barely changed even though time T13 is reached, the most recent dark image data 2 (Dk2) that was acquired at time T12 and stored can be used as dark image data 1 (Dk1) at the time of the second live composite shooting.

With the example shown in FIG. 26B first live composite shooting commencing at time T11, and completion of the first live composite shooting being instructed at time T12 are the same as in the example shown in FIG. 26A. With the example shown in FIG. 26B commencement of second live composite shooting is instructed at time when T15 after acquisition of dark image data 2 (Dk2) after shooting completion has been completed. In this case, since acquisition of the first dark image data has been completed (T14), time until an instruction for the second live composite shooting (time T15) is short, and there is a high possibility that there will be hardly any change in the image sensor temperature T of the image sensor 101b. There may therefore be cases where it is possible to use the most recent dark image data 2 (Dk2) that was acquired at time T12 and stored as dark image data 1 (Dk1) at the time of the second live composite shooting.

In FIG. 26B, if time from time T14 to time T15 is long, there may be cases where live view is resumed, and image sensor temperature T of the image sensor 101b becomes a temperature approaching that when the dark image data 1 (Dk1) was acquired with the first live composite shooting. In this type of situation, it is determined that dark image data that was acquired at a temperature that is closer to the current temperature is more suitable for reuse. This determination is performed within dark data acquisition before shooting determination processing (refer to FIG. 6) within live view display processing (refer to S3 in FIG. 3) after live composite shooting (refer to 17 in FIG. 3). Specifically, better reusable dark data is determined from among already acquired data in step S131 within the dark data before shooting determination processing (refer to FIG. 7B), and if reuse is possible dark image data 1 (Dk1) for the second live composite shooting is replaced with dark image data 1 (Dk1) or dark image data 2 (Dk2) that was acquired in first live composite shooting (refer to S133 in FIG. 7B). On the other hand, if reuse is not possible, acquisition of dark image data 1 (Dk1) is performed (refer to S135 in FIG. 7B and S143 in FIG. 8A).

In this way, the camera of this embodiment has a function of a dark image correction prohibition section that prohibits shooting for acquisition of first dark image data in a case where there is extremely recent dark image data, and makes data based on most recent first and/or second dark image data into first dark image data.

As has been described above, the camera of one embodiment of the present invention is provided with a dark image data correction prohibition section that prohibits acquisition operations for dark image data before and after shooting, based on shooting conditions (refer, for example, to S125 in FIG. 7B, and S251 in FIG. 23B). This means that it is possible to make the time required for processing related to fixed pattern noise correction processing the minimum required, and it is possible to avoid the loss of shooting opportunities with live composite shooting. This is particularly effective in shooting such as when shooting opportunities arise an extremely short time apart, such as when shooting fireworks etc. It should be noted that with this embodiment acquisition operations for dark image data are prohibited depending on shooting conditions, but this is not limiting and fixed pattern noise correction operations may also be prohibited. For example, when performing dark correction processing (refer, for example, FIG. 25B), correction processing for fixed pattern noise may be prohibited based on shooting conditions.

Figure 13C:
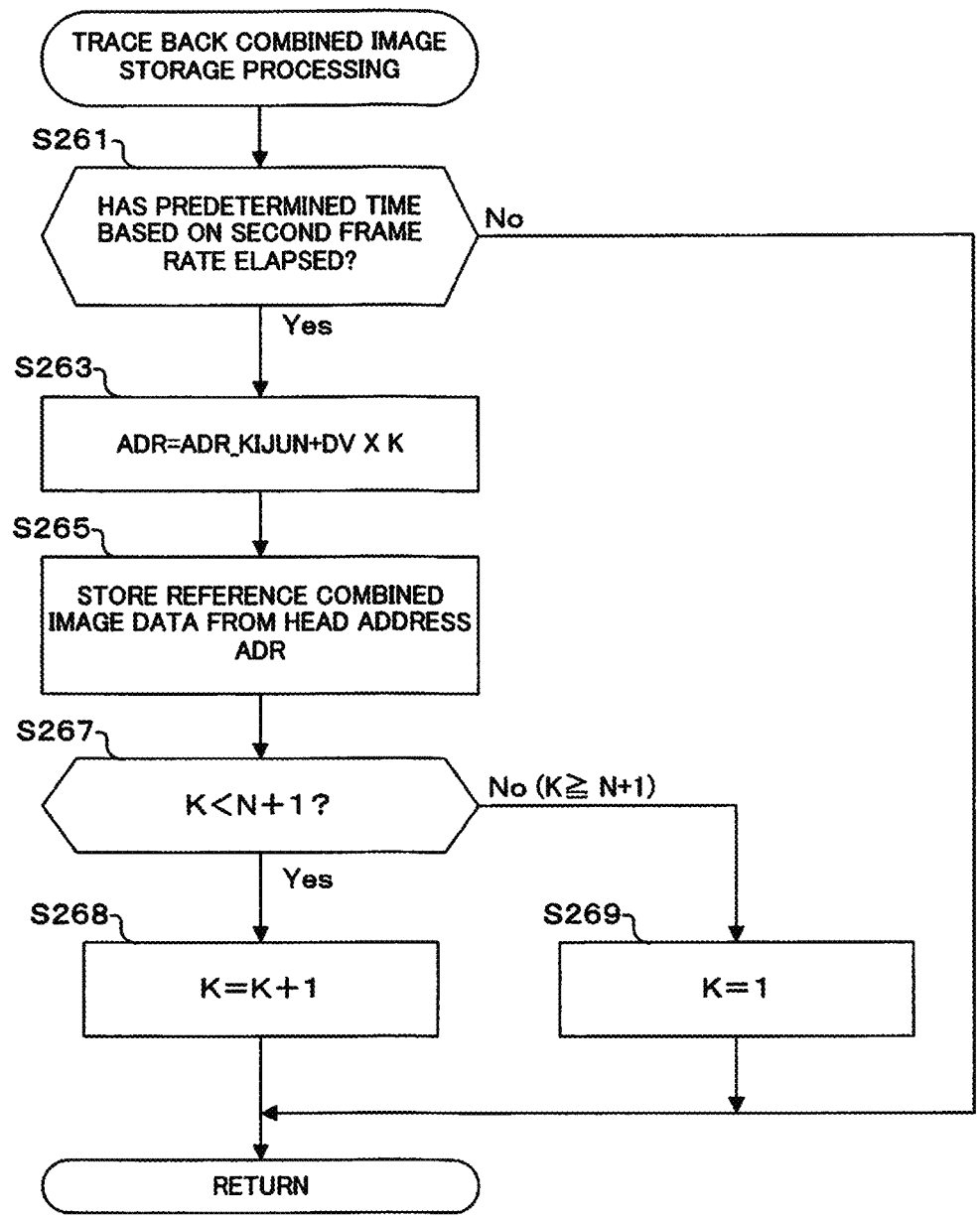
FIG. 13C is a flowchart showing operation of trace back combined image storage processing of the camera of one embodiment of the present invention.
Figure 13D:
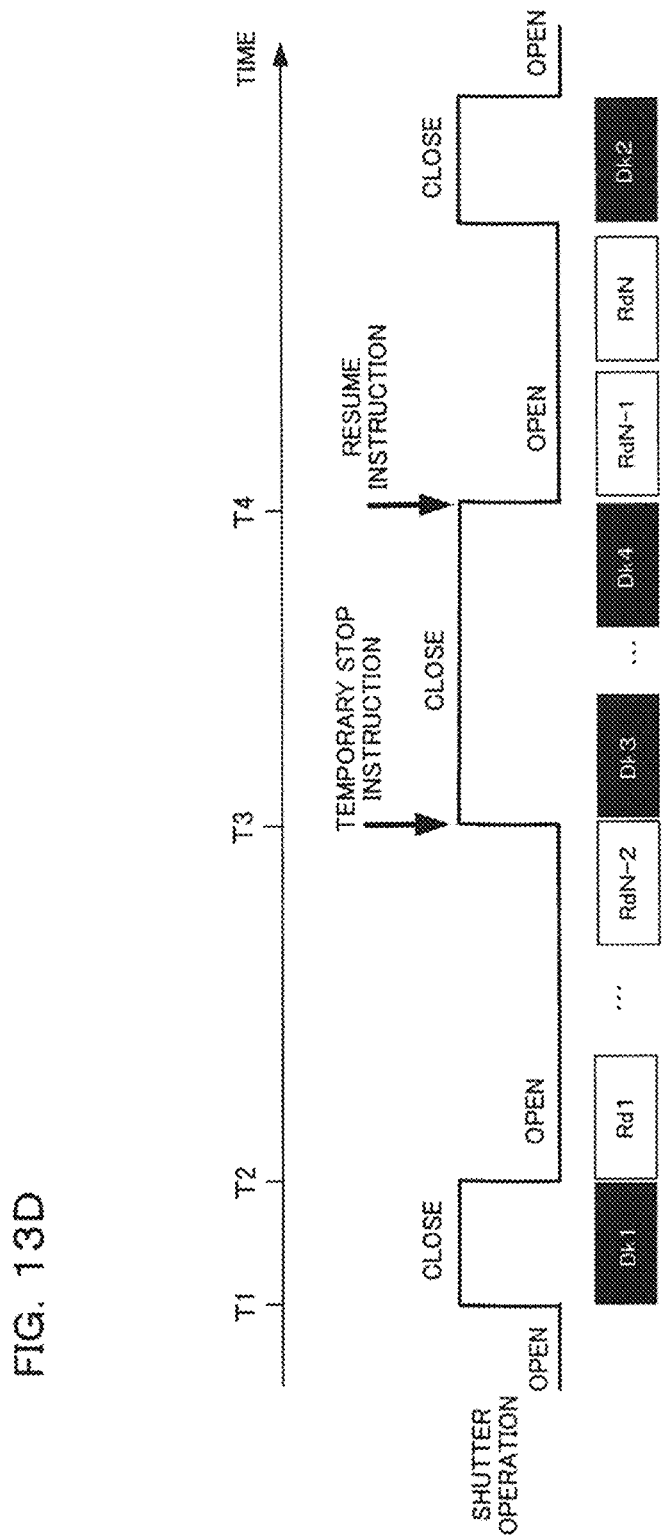
FIG. 13D is a timing chart showing operation in the camera of one embodiment of the present invention from receipt of a temporary stop instruction until a resume instruction.

Also, the camera of one embodiment of the present invention is also provided with a (cyclic) combined images holding section that stores and holds combined images for a plurality of points in time, or is provided with memory for reading out a specified number of reference combined image data at a second frame rate and cyclically storing and holding this image data (refer, for example, to the memory 103, and to FIG. 12, S241 in FIG. 13A, and FIG. 13C). This means that even in the case where a disturbance has occurred, such as the lights of a vehicle, it is possible to save data before the disturbance at a plurality of points in time, and it is possible to prevent instantaneous and complete imperfections by subjecting long time exposure data up to before the disturbance occurred to combination processing. After the photographer has looked at combined images on the display section and confirmed that shooting has failed due to a disturbance, it becomes possible to restore a combined state to before the disturbance, even if shooting stopped.

Figure 11B:
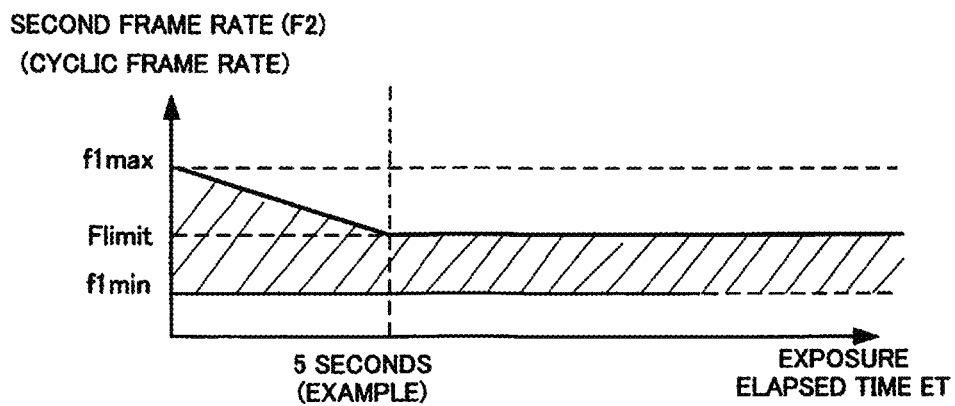

Also, with the camera of one embodiment of the present invention a cyclic combined image holding section stores and saves at a second frame rate that is different to a readout frame rate, or an image sensor repeatedly reads out image data at a first frame rate during exposure, and reads out reference combined image data at a second frame rate and stores and saves a predetermined number of images cyclically (refer, for example, to FIG. 10, FIG. 11A, and FIG. 11B). This means that even if the readout frame rate is fast, it is possible to store and save combined images so as to trace back by a sufficiently required time, including the photographer's shooting stop lag, without increasing a number of buffers required in the cyclic combined image holding section to an extreme extent. As a result of suppressing increase in memory capacity installed in the camera, this also leads to a cost reduction, reduction in size of the camera due to reduction in mounting area, and reduction in heat generation which would have a detrimental effect on image quality. It should be noted that as a sufficiently required time for tracing back combine images, taking into consideration photographer operation lag, about 5 images at 2 second intervals, or, if it is a beginners camera, 2 images in at 3 second intervals, is conceivable, but this can also be appropriately set by the photographer. In FIG. 10 dark image data (dark 1) is removed from a combined image, and the combined image is displayed and stored, but this does not need to be limiting, and an image may be displayed and stored without removing dark image data.

Figure 5A:
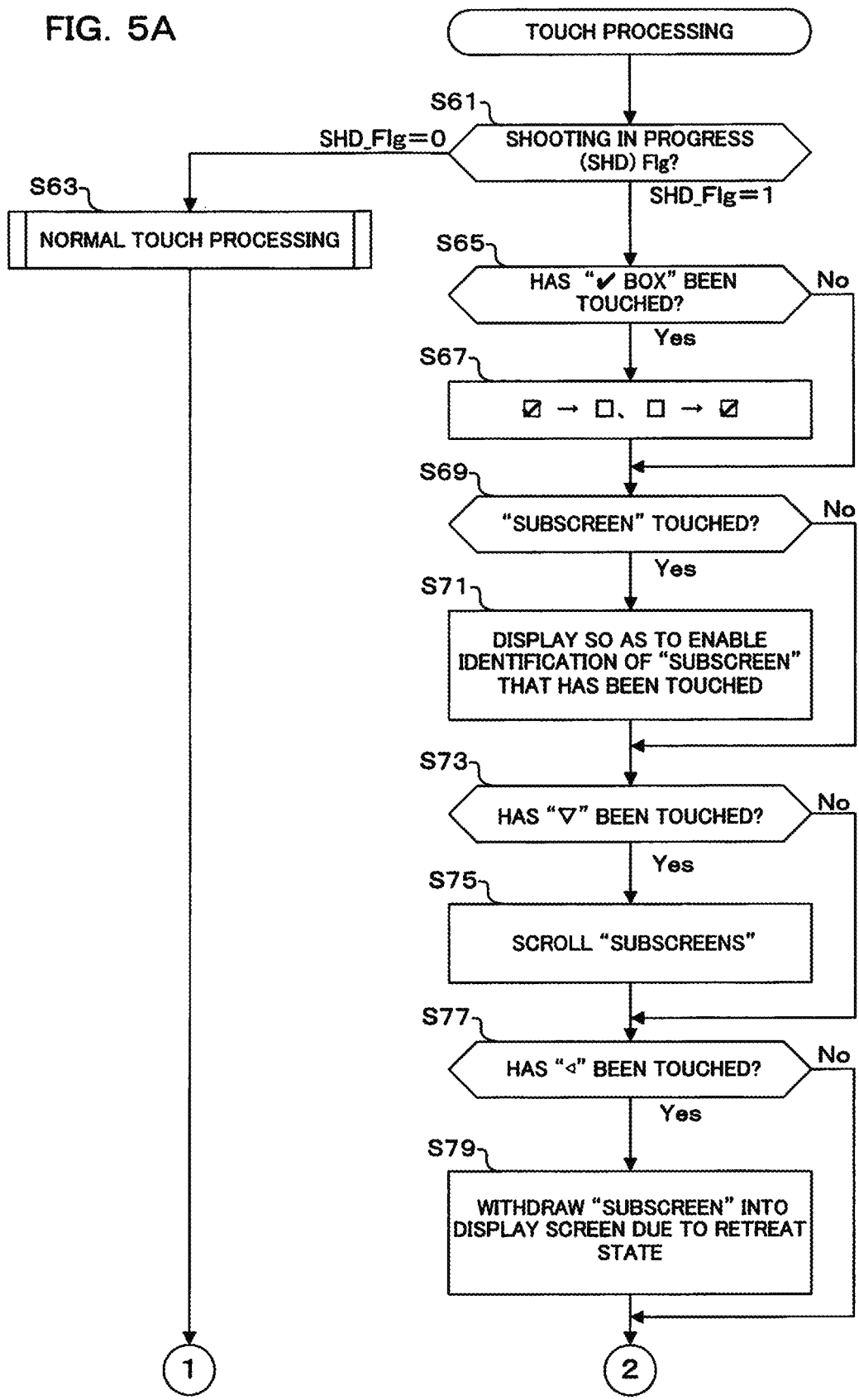
Figure 5C:
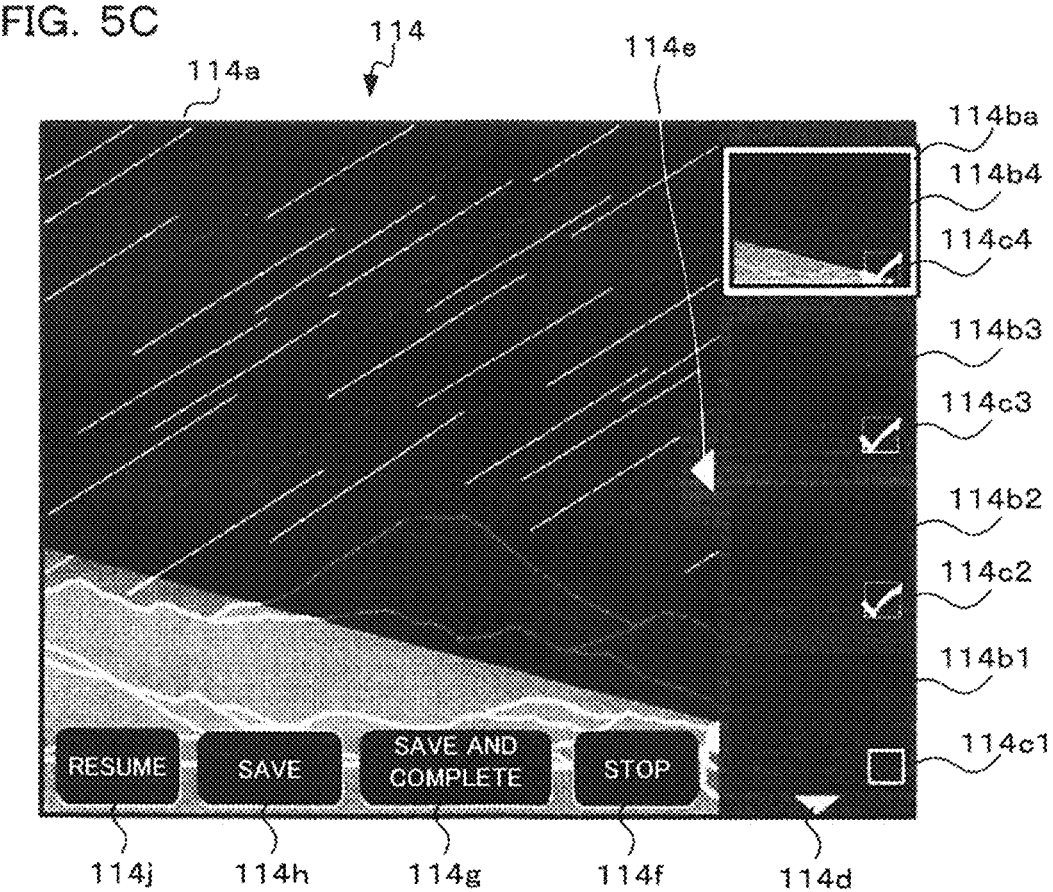
FIG. 5C is a drawing showing a display screen when touch processing of the camera of one embodiment of the present invention has been performed.
Figure 5D:
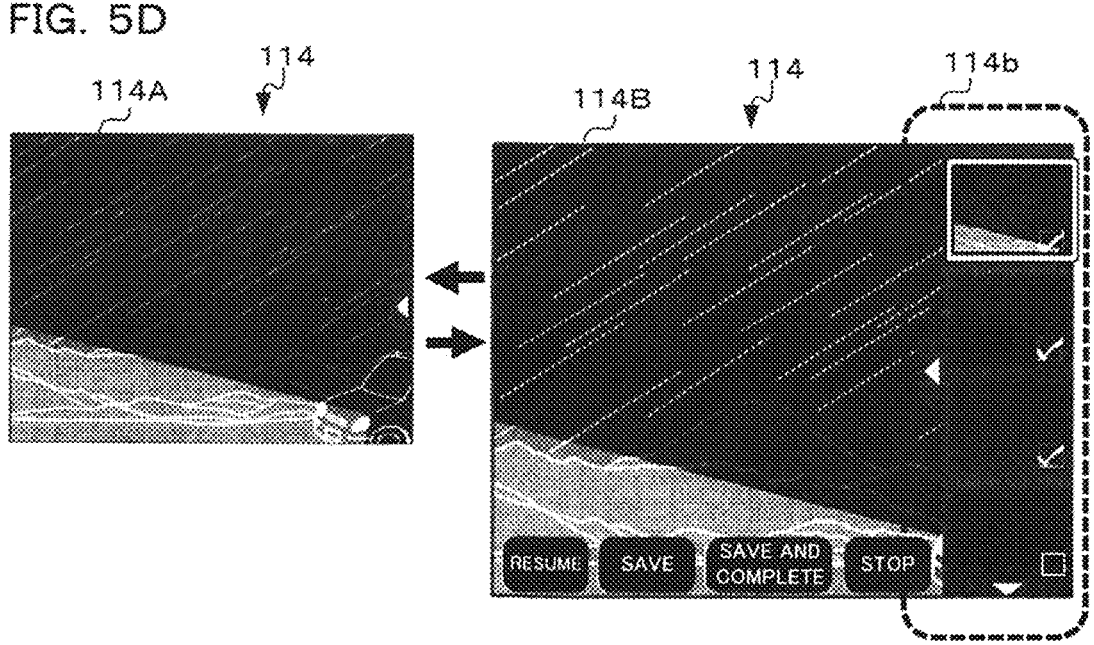
FIG. 5D is a drawing showing an example of displaying a plurality of reference combined images on a display section, in the camera of one embodiment of the present invention.

Also, with the camera of one embodiment of the present invention, it is possible to display and select saved content of the cyclic combined image holding section, and, in addition to reference combined image data, memory also stores and holds image data other than reference combined image data, and the display displays image data besides reference combined image data (refer, for example, to S65 and S67 in FIG. 5A, FIG. 5C, FIG. 5D, and S415 and S421 in FIG. 25A). As a result, it is possible to arbitrarily select and store necessary data from among data that has been acquired before the occurrence of a disturbance.

Also, with the camera of one embodiment of the present invention, saved content of the cyclic combined image holding section is displayed, a reference combined image is selected and changed, and there is a reference combined image data changing circuit that replaces image data other than reference combined image data that has been stored and held in memory with reference combined image data (refer to S283 in FIG. 14). This means that it is possible to resume image combination from a point in time that has been arbitrarily selected by the photographer before the disturbance.

Figure 15:
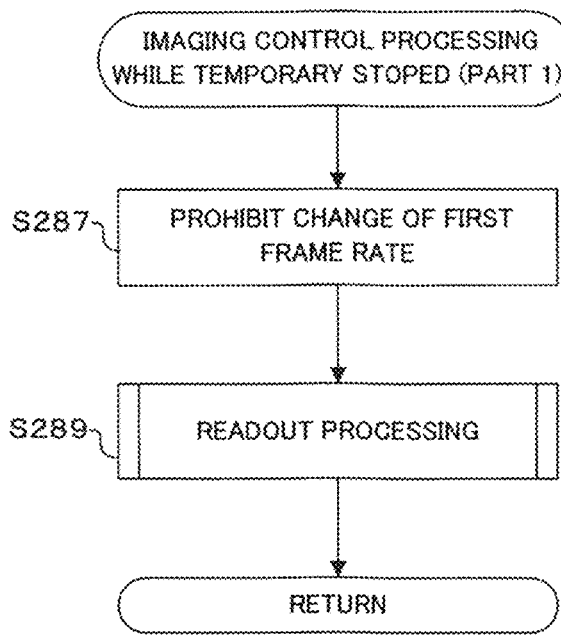
FIG. 15 is a flowchart showing temporarily stopped imaging control processing operation (part 1) of the camera of one embodiment of the present invention.

Also, the camera of one embodiment of the present invention has a shooting temporary stop instruction section for instruction temporary stop in shooting (refer, for example to the temporary stop button 113k in FIG. 2, and to S47 and S49 in FIG. 4), and change to the first frame rate is prohibited while temporarily stopped (refer, for example, to S287 in FIG. 15). This means that even if shooting is temporarily stopped, it is possible to perform control so that change in temperature of the image sensor is the same as in a state where shooting continued. That is, if a relationship between dark image data before shooting data, dark image data after shooting data, and a combined image is no longer maintained in the case of being temporarily stopped fixed pattern noise correction will fail, but with the camera of this embodiment there is no such failure.

Figure 17:
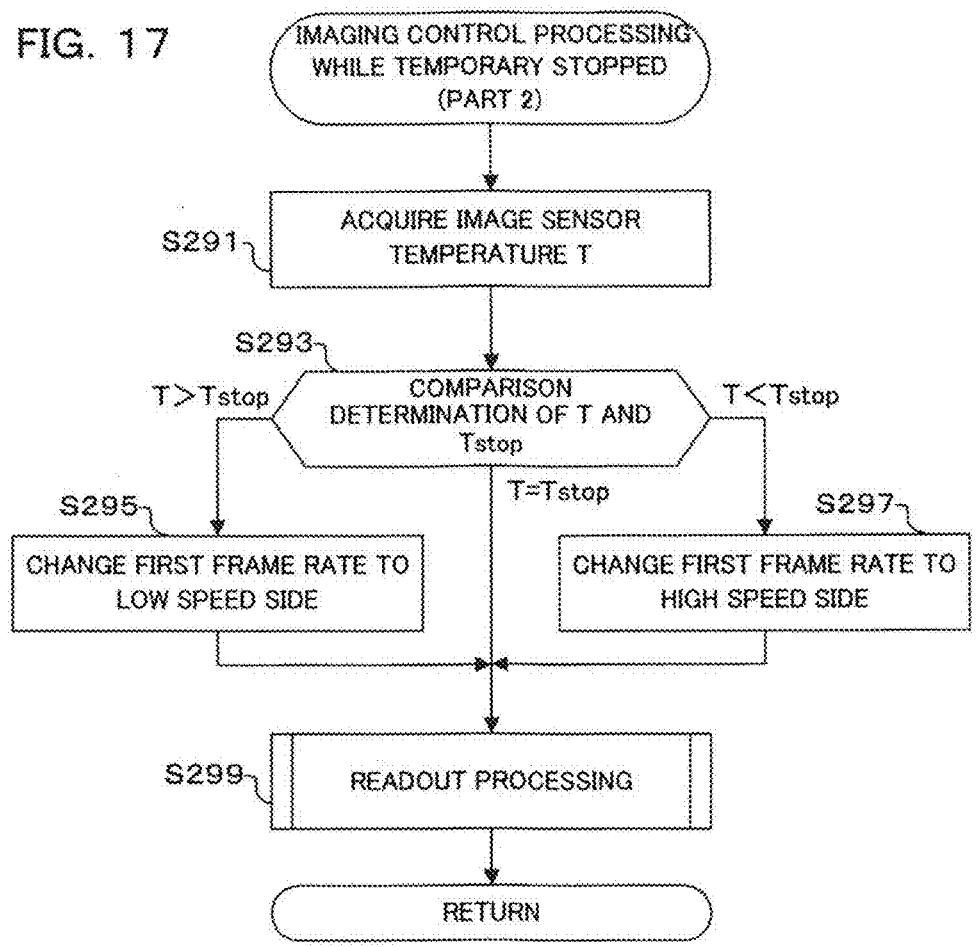
FIG. 17 is a flowchart showing temporarily stopped imaging control processing operation (part 2) of the camera of one embodiment of the present invention.

Also, with the camera of one embodiment of the present invention, in a case where temporary stop has been instructed, the first frame rate is changed based on temperature of the image sensor (refer, for example, to FIG. 17 and FIG. 18). This means that it is possible to control image sensor temperature so that a relationship between dark image data before shooting data, dark image data after shooting data, and a combined images does not break down, and there is no failure of fixed pattern noise correction with a relationship between dark image data before shooting data, dark image data after shooting data, and a combined image breaking down due to being temporarily stopped.

Also, with the camera of one embodiment of the present invention, the first frame rate is changed so that image sensor temperature while temporarily stopped becomes substantially constant (refer, for example, to FIG. 17 and FIG. 18). After a little time has elapsed from the time of pausing, it is possible, at any time, to acquire dark data that is the same as at the time of stop. This means that it is possible to perform fixed pattern noise correction processing without any problem a short time after pausing.

Figure 19:
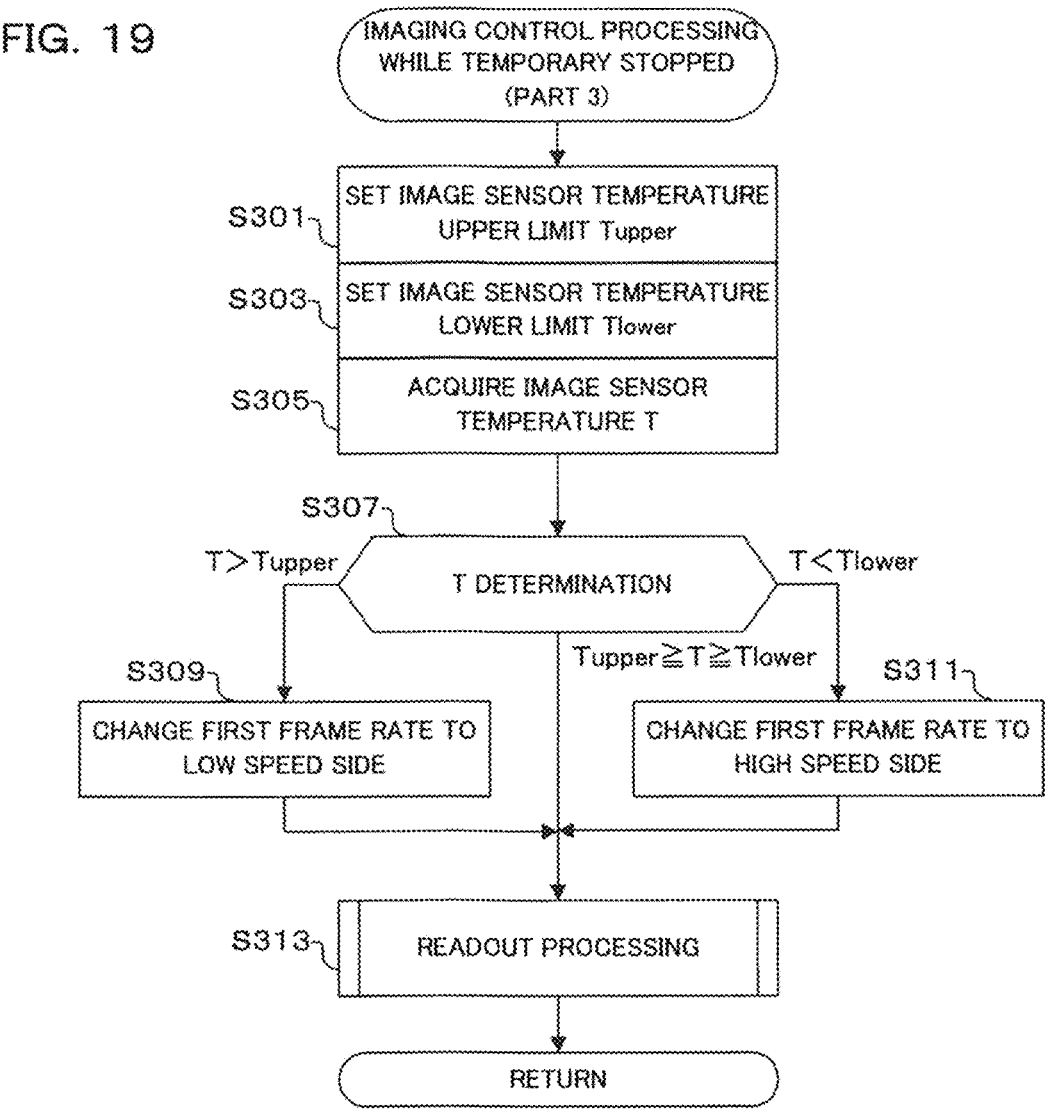
FIG. 19 is a flowchart showing temporarily stopped imaging control processing operation (part 3) of the camera of one embodiment of the present invention.

Also, with the camera of one embodiment of the present invention, the first frame rate is controlled so that temperature of the image sensor when temporarily stopped is contained in a temperature range for the image sensor temperature for at the time of shooting commencement and at the time of shooting completion (refer, for example, to FIG. 19 and FIG. 20). This means that even if live view is displayed while temporarily stopped it is possible to perform live view display while temporarily stopped without there being any breakdown in the relationship between dark image data before shooting data, dark image data after shooting data, and a combined image, due to temperature change caused by live view display.

Also, the dark image data correction prohibiting circuit of the camera of one embodiment of the present invention prohibits acquisition operations for dark image data, or correction operations in the fixed pattern noise correction circuit, based on the first frame rate (readout time interval during exposure of the image sensor) (refer, for example, to S125 in FIG. 7B, S351 in FIG. 23B, and FIG. 25B). Also, the dark image data correction prohibiting circuit of the camera of one embodiment of the present invention prohibits acquisition operations for dark image data, or correction operations in the fixed pattern noise correction circuit, based on the first frame rate (readout time interval during exposure of the image sensor) and temperature and/or gain value of the image sensor (refer, for example, to S125 in FIG. 7B, S351 in FIG. 23B, and FIG. 25B). That is, acquisition operations for dark image data or correction operations of the fixed pattern noise correction section are prohibited based on at least the first frame rate. For example, when performing live composite shooting for photographing fireworks, the first frame rate is set to about 5 Hz to 2 Hz, for which fixed pattern noise correction processing is not required, and there are many cases where shooting will be performed within an overall exposure time of from 10 seconds to 20 seconds, which is a limit value for bulb exposure time, at which fixed pattern noise correction processing would be required. At the time of this type of shooting, it is possible to prevent acquisition operations for unnecessary dark image data, it is possible to handle the next shot in an extremely short time, and it is possible to avoid losing shooting opportunities with live composite shooting. Further, it becomes possible to precisely determining stop timing for long time exposure while looking at a live view image.

Also, in a case where there is most recent dark image data, the dark image data correction prohibiting circuit of the camera of one embodiment of the present invention prohibits acquisition and shooting operations for first dark image data, and makes data based on the most recent first and/or second dark image data the first dark image data (refer, for example, to FIG. 26A and FIG. 26B). That is, data based on the temporally closest first and/or second dark image data is made the first dark image data. This means that it is possible to omit the time required for dark image data acquisition, and it is possible to avoid missing shooting opportunities with live composite shooting. For example, this is particularly effective in shooting such as when shooting opportunities arise an extremely short time apart, such as when shooting fireworks etc.

Also, the dark image data correction prohibiting circuit of the camera of the one embodiment of the present invention prohibits acquisition shooting operations for dark image data in the event that there is reusable dark image data (refer, for example, to S131 and S133 in FIG. 7B, and to S357 and S259 in FIG. 23B). That is, in a case where there is reusable dark image data, for reasons of similar temperature, acquisition operations for dark image data are prohibited. This means that it is possible to omit the time required for dark image data acquisition, and it is possible to avoid missing shooting opportunities with live composite shooting. For example, this is particularly effective in shooting such as when shooting opportunities arise an extremely short time apart, such as when shooting fireworks etc.

Also, with the camera of one embodiment of the present invention, the second frame rate is less than or equal to the first frame rate (refer, for example, to FIG. 10). That is, a second frame rate condition is that second frame rate first frame rate. This means that even if the readout frame rate is fast, it is possible to store and save combined images so as to trace back by a sufficiently required time, including the photographer's shooting stop lag, without increasing a number of buffers required in the (cyclic) combined image holding section to an extreme extent. A time that can be traced back may be, for example, a time for about five images at two second intervals, taking into consideration photographer operation lag, and if the camera is a beginners camera may be a time for about two images at three second intervals.

Also, with the camera of one embodiment of the present invention, the second frame rate is changed based on the first frame rate (refer, for example, to FIG. 11A). That is, the second frame rate is not fixed, and is changed based on the first frame rate. This means that in a case where the first frame rate is too fast, it is possible to control "number of buffers×second frame rate" to gives an appropriate traceback possible time. Conversely, if the first frame rate is too fast it is possible to control "number of buffers×second frame rate" so that a traceback time does not become unnecessarily long.

Also, with the camera of one embodiment of the present invention, the second frame rate is changed based on elapsed exposure time (refer, for example, to FIG. 11B). That is, the second frame rate is changed based of lapse of exposure time. This means that it is possible to perform control so that in the case of short exposure, traceback is possible at tightly packed time intervals, and in the case of long exposure there is an appropriate traceback time at suitable time intervals. It is possible to perform control so as to enable trace back at appropriate time intervals, as required.

Also, with the camera of one embodiment of the present invention, the second frame rate is restricted to an optimum frame range from the viewpoint of disturbance elimination responsiveness, in a time required for a single memory cycle, and in a time between reference combined images (refer to S241 in FIG. 13A, and to S261 in FIG. 13C). This means that it is possible to trace back at appropriate time intervals, and it is possible to trace back by an appropriate length. Also, there is no failure in disturbance elimination due to tracing too far back, or traceback being insufficient.

Also, the camera of one embodiment of the present invention, is provided with a disturbance detection circuit for detecting disturbances that occur during shooting (refer, for example, to the camera shake detection section 209 in FIG. 1A, the camera shake detection section 108 in FIG. 1B, and S111 in FIG. 7A) and an automatic stop circuit that instructs temporary stop in response to a disturbance being detected by this disturbance detection circuit (refer to S51 and S53 in FIG. 4, and S161 and S163 in FIG. 8B). Because data before a disturbance is saved at a plurality of time points, it is possible to recover even if there has been an automatic stop due to determination after combination. It is also possible to speed up judgment processing by performing combination processing and judgment processing simultaneously. In judgment processing, whether or not combination is good or bad must be performed for all pixels, which means that with a method that performs judgment in advance before combination, combination processing takes twice as long at the time of image data acquisition. If combination time is doubled, then display update interval for live view is also doubled, and rapid stop determination by the photographer is no longer possible. For example, shooting opportunities will be lost in shooting fireworks etc. According to this embodiment, since there is a method for automatic stop in the course of combination processing, it is possible to provide live view that is very good at improving shooting opportunities, and to provide recovery from certain disturbances, without performing combination processing and judgment processing all over again.

Also, the automatic stop circuit of the camera of one embodiment of the present invention can switch between automatic stop being valid and invalid during shooting (refer, for example, to S51 and S53 in FIG. 4, and to S163 in FIG. 8B). As a result, it is possible to make flash shooting and automatic stop compatible. That is, if automatic stop is made valid, then in a case where flash shooting has been performed live composite shooting will be undesirably automatically stopped. However, by temporarily making automatic stop invalid before flash shooting, the live composite shooting will not be automatically stopped even if flash shooting is performed. With this embodiment, making automatic stop effective or invalid is performed by operating the automatic stop effective button 113*j*, but it is not necessary to limit to this operation, and it is also possible, for example, to make automatic stop effective or invalid with a pop up/pop down operation of a built in flash, a power supply ON/OFF operation for an external flash that is connected to and can be controlled by the camera, or in control sequences immediately before or immediately after flash firing.

Also, the camera of one embodiment of the present invention comprises a shooting commencement instruction section for instructing shooting commencement, a shooting completion instruction section for instructing shooting completion, a temporary stop instruction section for instructing temporary stop in shooting (refer, for example, to S47 and S49 in FIG. 4), a shooting resume instruction section for instructing resumption of shooting (refer, for example, to S89 in FIG. 5B), an exposure control section for commencing exposure of an image sensor based on a shooting commencement instruction, and completing exposure of the image sensor based on a shooting completion instruction, an image data readout section for repeatedly reading out image data based on a first frame rate while the image sensor is being exposed, an image data combining section for repeatedly combining a plurality of the image data that have been read out with reference combined image data, a combination lapsed display section for displaying the image data that has been combined (refer, for example, to FIG. 5C and FIG. 5D), a combined image holding section for cyclically retaining a specified number of the reference combined image data that have been combined, and read out at a second frame rate, a first dark image data acquisition section for acquiring dark image data in a state where the image sensor has been shielded, before commencement of the exposure, a second dark image data acquisition section for acquiring dark image data in a state where the image sensor has been shielded, based on completion of the exposure, a third dark image data acquisition section for acquiring dark image data in a state where the image sensor has been shielded, based on temporary stop (refer, for example, to S227 in FIG. 13A, and to FIG. 13B), a fixed pattern noise correction section that corrects fixed pattern noise within combined image data that has been saved in the reference or combined image holding section based on the first dark image data or the second dark image data or the third dark image data (refer, for example to FIG. 25B), a dark image data correction prohibition section for prohibiting operations to acquire first dark image data or second dark image data or third dark image data, or correction operations by the fixed pattern noise correction section (refer, for example, to FIG. 25B), and a storage section for storing combined image data that has been corrected by the fixed pattern noise correction section. Therefore, from receipt of a temporary stop instruction to receipt of a resume instruction the image sensor is held in a mechanically light shielded state (refer, for example, to FIG. 13D, S285 in FIG. 14, and S323 in FIG. 21).

As was described previously, with the camera of this embodiment the image sensor is held in a mechanically light shielded state from receipt of a temporary stop instruction until receipt of a resume instruction, and dark image data is repeatedly acquired, which means that at the time of resume there is no shutter release time lag relating to fixed pattern noise correction processing, and it is possible to perform fixed pattern noise correction processing. In a case where combined image data that has been corrected by the fixed pattern noise correction section after temporary stop is stored also, since the dark image data for after shooting data has already been acquired, it is possible to store and complete at high speed.

Also, the camera of one embodiment of the present invention comprises a shooting commencement instruction section for instructing shooting commencement, a shooting completion instruction section for instructing shooting completion, a temporary stop instruction section for instructing temporary stop in shooting (refer, for example, to S47 and S49 in FIG. 4), an exposure control section for commencing exposure of an image sensor based on a shooting commencement instruction, and completing exposure of the image sensor based on a shooting completion instruction, an image data readout section for repeatedly reading out image data while the image sensor is being exposed, an image data combining section for repeatedly combining a plurality of the image data that have been read out with reference combined image data, a combination lapsed display section for displaying the image data that has been combined (refer, for example, to FIG. 5C and FIG. 5D), a combined image holding section for cyclically retaining a specified number of the combined image data that have been combined, a first dark image data acquisition section for acquiring dark image data in a state where the image sensor has been shielded, before commencement of the exposure, a second dark image data acquisition section for acquiring dark image data in a state where the image sensor has been shielded, based on completion of the exposure or shooting automatic stop, a fixed pattern noise correction section that corrects fixed pattern noise of a plurality of combined image data that has been cyclically saved in the combined image holding section based on the first dark image data or the second dark image data (refer, for example to FIG. 25B), and a storage section for storing at least one combined image data that has been corrected by the fixed pattern noise correction section, based om shooting completion, or shooting automatic stop. Also, an instruction of the automatic stop instruction section is made invalid in accordance with a flash firing possible state, or flash firing.

As was described previously, the camera of this embodiment has a combined image holding section post cyclically storing and holding a plurality of combined image data that have been combined, with at least one combined image data that has been corrected by the fixed pattern noise correction section being stored of on shooting completion or shooting automatic stop are performed. This means that even if an automatic stop function has been added, it possible to perform automatic stop determination after combination processing. That is, it is possible to store and hold combined images for which there has been no disturbance, even if automatic stop is somewhat delayed. Further, since automatic stop determination time is not added to display update interval it is possible to maintain a fast readout frame rate, and there is no damage to composite shooting such as shooting fireworks that require high speed display update.

It should be noted that with the one embodiment of the present invention, the combined image holding section is provided to cyclically save and store a specified number of images at a second frame rate, but if trace back time is sufficiently long one image may be stored. Also, with the one embodiment of the present invention the dark image data correction prohibition section is provided to prohibit processing to acquire either first dark image data or second dark image data, or processing for correction of the fixed pattern noise correction section, but in the case where the photography does not mind losing shooting opportunities due to lowering of shooting speed at the time of live composite shooting after completion of live composite shooting, this dark image data correction prohibition section may be omitted.

Also, in the one embodiment of the present invention the display control section 105a is provided inside the system control section 105, but the display control section 105a may also be provided externally. Also, the AD conversion section 102, memory 103, image processing section 104, imaging drive control section 106, lens communication section 107, camera shake detection section 108, exposure control section 109, AF processing section 110, power supply control section 112 and flash control section 117 are arranged externally to the system control section 105, but each of these sections may also be provided inside the system control section 105. The system control section 105 may also be divided across a plurality of processors.

Each of the sections such as the image processing section 104 and imaging drive control section 106, and the functions of the system control section 105, may be realized by hardware circuits, may also be constructed in the form of software using a CPU and programs, or may be constructed in hardware such as gate circuitry generated based on a programming language described using Verilog, or may be constructed using a DSP (digital signal processor). These sections and functions may also be respective circuit sections of a processor constructed using integrated circuits such as an FPGA (Field Programmable Gate Array). Suitable combinations of these approaches may also be used. The use of a CPU is also not limiting as long as elements fulfill a function as a controller.

Also, with the one embodiment of the present invention, a device for taking pictures has been described using a digital camera, but as a camera it is also possible to use a digital single lens reflex camera, a mirrorless camera, or a compact digital camera, or a camera for movie use such as a video camera, and further to have a camera that is incorporated into a mobile phone, a smartphone a mobile information terminal, personal computer (PC), tablet type computer, game console etc., or a camera for a scientific instrument such as a medical camera (for example, a medical endoscope), or a microscope, an industrial endoscope, a camera for mounting on a vehicle, a surveillance camera etc. The present invention may be applied to any device for shooting capable of generating long time taken images by combining a plurality of image data.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they may be downloaded via the Internet.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device, comprising:
an image sensor for imaging a subject;
a shooting commencement signal generating circuit for instructing shooting commencement:
a shooting completion signal generating circuit for instructing shooting completion;
an exposure control circuit for commencing exposure of the image sensor based on instruction of the shooting commencement, and completion exposure of the image sensor based on instruction of the shooting completion;
an image data readout circuit for repeatedly reading out image data at a first frame rate while the image sensor is being exposed;
an image data combining circuit for repeatedly combining a plurality of the image data that have been readout and outputting reference combined image data;
a display for displaying an image based on the reference combined image data that has been combined;
a memory for cyclically retaining a specified number of the reference combined image data read out at a second frame rate;
a first dark image data acquisition circuit for acquiring first dark image data in a state where the image sensor has been shielded, before commencement of the exposure;
a second dark image data acquisition circuit for acquiring second dark image data in a state where the image sensor has been shielded, based on completion of the exposure;
a fixed pattern noise correction circuit that corrects fixed pattern noise of the reference combined image data based on at least one of the first dark image data and the second dark image data;
a dark image data correction prohibiting circuit for prohibiting processing to acquire first dark image data and/or second dark image data, or processing for correction by the fixed pattern noise correction circuit; and
storage media for storing reference combined image data that has been corrected by the fixed pattern noise correction circuit.

2. The imaging device of claim 1, wherein:
in addition to the reference combined image data, the memory also holds image data other that the reference combined image data; and
the display displays image data other than the reference combined image data.

3. The imaging device of claim 2, further comprising:
a reference combined image data change circuit for replacing image data other than the reference combined image data held in the memory with reference combined image data.

4. The imaging device of claim 1, wherein:
the display displays images based on image data other than the reference combined image data, that has been saved in the memory; and
the imaging device further comprises an image selection circuit for selecting an image that has been displayed on the display.

5. The imaging device of claim 4, comprising:
a reference combined image data change circuit for changing image data of an image that has been selected using the image selection circuit to reference combined image data.

6. The imaging device of claim 1, comprising:
a shooting temporary stop circuit for instructing temporary stop in shooting, and wherein
in the event that temporary stop has been instructed, change of a first frame rate is prohibited.

7. The imaging device of claim 1, comprising:
a shooting temporary stop circuit for instructing temporary stop in shooting, and wherein
in the event that temporary stop has been instructed, the first frame rate is changed based on temperature of the image sensor.

8. The imaging device of claim 7, wherein:
the first frame rate is changed so that temperature of the image sensor while temporarily stopped becomes substantially constant.

9. The imaging device of claim 7, wherein:
the first frame rate is controlled so that temperature of the image sensor while temporarily stopped is contained in a range from image sensor temperature at the time of shooting commencement to image sensor temperature at the time of shooting completion.

10. The imaging device of claim 1, wherein:
the dark image data correction prohibiting circuit prohibits acquisition operations for dark image data or correction operations in the fixed pattern noise correction circuit, based on the first frame rate.

11. The imaging device of claim 1, wherein:
the dark image data correction prohibiting circuit prohibits acquisition operations for dark image data or correction operations in the fixed pattern noise correction circuit, based on the first frame rate and temperature and/or gain of the image sensor.

12. The imaging device of claim 1, wherein:
in a case where there is most recent dark image data, the dark image data correction prohibiting circuit prohibits acquisition and shooting operations for first dark image data, and makes data based on the most recent first and/or second dark image data the first dark image data.

13. The imaging device of claim 1, wherein:
the dark image data correction prohibiting circuit prohibits acquisition and shooting operations for dark image data when there is dark image data that can be reused.

14. The imaging device of claim 1, wherein:
the second frame rate is lower than or equal to the first frame rate.

15. The imaging device of claim 1, wherein:
the second frame rate is changed based on the first frame rate or lapse of exposure time.

16. The imaging device of claim 1, wherein:
the second frame rate is restricted to an optimum frame range, from the viewpoint of disturbance elimination responsiveness, in a time required for a single cycle of the memory, and in a time between reference combined images.

17. The imaging device of claim 1, further comprising:
a disturbance detection circuit that detects disturbances occurring during shooting; and
an automatic stop circuit for instructing temporary stop in response to a disturbance having been detected by the disturbance detection circuit.

18. The imaging device of claim 17, wherein:
the automatic stop circuit can switch between valid or invalid during shooting.

19. An imaging method for an imaging device having an image sensor that forms an image of a subject, comprising:
instructing shooting commencement;
instructing shooting completion;
commencing exposure of the image sensor based on instruction of the shooting commencement, and completing exposure of the image sensor based on instruction of the shooting completion;
repeatedly reading out image data at a first frame rate while the image sensor is being exposed;
repeatedly combining a plurality of the image data that have been read out and outputting reference combined image data;
displaying an image on a display based on the reference combined image data that has been combined;
cyclically retaining a specified number of the reference combined image data read out at a second frame rate;
acquiring first dark image data in a state where the image sensor has been shielded, before commencement of the exposure;
acquiring second dark image data in a state where the image sensor has been shielded, based on completion of the exposure;
correcting fixed pattern noise of the reference combined image data based on the first dark image data and/or the second dark image data;
prohibiting processing to acquire at least one of the first dark image data and the second dark image data, or correction processing for the fixed pattern noise; and
storing reference combined image data that has been corrected by the fixed pattern noise correction circuit in storage media.

20. A non-transitory computer-readable medium, storing a processor executable code, which when executed by at least one processor that is provided in an imaging device having an image sensor for forming an image of a subject a subject, performs an imaging method, the imaging method comprising:
instructing shooting commencement;
instructing shooting completion;
commencing exposure of the image sensor based on instruction of the shooting commencement, and completing exposure of the image sensor based on instruction of the shooting completion;
repeatedly reading out image data at a first frame rate while the image sensor is being exposed;
repeatedly combining a plurality of the image data that have been read out and outputting reference combined image data;
displaying an image on a display based on the reference combined image data that has been combined;
cyclically retaining a specified number of the reference combined image data read out at a second frame rate;
acquiring first dark image data in a state where the image sensor has been shielded, before commencement of the exposure;
acquiring second dark image data in a state where the image sensor has been shielded, based on completion of the exposure;
correcting fixed pattern noise of the reference combined image data based on the first dark image data and/or the second dark image data;
prohibiting processing to acquire at least one of the first dark image data and the second dark image data, or correction processing for the fixed pattern noise; and
storing reference combined image data that has been corrected by the fixed pattern noise correction circuit in storage media.

* * * * *